United States Patent
Sato et al.

(10) Patent No.: US 10,048,485 B2
(45) Date of Patent: Aug. 14, 2018

(54) IMAGE OUTPUT DEVICE, IMAGE TRANSMISSION DEVICE, IMAGE RECEPTION DEVICE, IMAGE OUTPUT METHOD, AND NON-TRANSITORY RECORDING MEDIUM

(71) Applicant: Panasonic Intellectual Property Management Co., Ltd., Osaka (JP)

(72) Inventors: Taichi Sato, Kyoto (JP); Hideto Motomura, Kyoto (JP); Yoshihide Sawada, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 95 days.

(21) Appl. No.: 15/218,204

(22) Filed: Jul. 25, 2016

(65) Prior Publication Data

US 2017/0059844 A1 Mar. 2, 2017

(30) Foreign Application Priority Data

Aug. 28, 2015 (JP) .................................. 2015-169822
Mar. 14, 2016 (JP) .................................. 2016-049515

(51) Int. Cl.
*G02B 21/36* (2006.01)
*G06T 3/40* (2006.01)

(52) U.S. Cl.
CPC .......... *G02B 21/367* (2013.01); *G06T 3/4092* (2013.01); *G06T 2207/10056* (2013.01)

(58) Field of Classification Search
CPC ........ G02T 3/4092; G02T 2207/10056; G02B 21/367
See application file for complete search history.

(56) References Cited

U.S. PATENT DOCUMENTS

| | | | | |
|---|---|---|---|---|
| 2006/0159325 A1* | 7/2006 | Zeineh | ................ | G06F 19/3443 382/128 |
| 2013/0070075 A1* | 3/2013 | Kakemizu | ............ | G02B 21/365 348/79 |
| 2013/0120563 A1* | 5/2013 | Terada | ............... | G02B 21/0016 348/135 |
| 2013/0342901 A1* | 12/2013 | Moeller | ............... | G02B 21/025 359/380 |

FOREIGN PATENT DOCUMENTS

JP 62-137037 6/1987

* cited by examiner

*Primary Examiner* — Michelle L Sams
(74) *Attorney, Agent, or Firm* — Wenderoth, Lind & Ponack, L.L.P.

(57) ABSTRACT

An image output device according to the present disclosure includes: an image acquisition unit that acquires an image with a first resolution; a high-resolution image acquisition unit that acquires an image with a second resolution, being an image of higher resolution than the image with the first resolution; an enlargement input unit that accepts input of an enlargement ratio; a determination unit that determines whether or not an evaluation score determined based on the accepted enlargement ratio is higher than a certain value; and a transmission unit that transmits the image with the second resolution if the evaluation score is determined to be higher than the certain value, and does not transmit the image with the second resolution if the evaluation score is determined not to be higher than the certain value.

15 Claims, 32 Drawing Sheets

IMAGE OUTPUT DEVICE, IMAGE TRANSMISSION DEVICE, IMAGE RECEPTION DEVICE, IMAGE OUTPUT METHOD, AND NON-TRANSITORY RECORDING MEDIUM

BACKGROUND

1. Technical Field

The present disclosure relates to an image output device, an image transmission device, an image reception device, an image output method, and a non-transitory computer-readable medium.

2. Description of the Related Art

In the related art, optical microscopes have been used to observe microstructures in objects such as living tissue. An optical microscope utilizes light transmitted through, or reflected from, the target of observation. An observer observes an image enlarged by a lens. Also known are digital microscopes, which capture an image enlarged by the microscope lens and display the captured image on a display. The use of a digital microscope enables usage scenarios such as simultaneous observation by multiple people, and observation from a remote location.

Recently, attention has focused on technology for observing microstructures with contact image sensing (CIS) techniques. In the case of using CIS techniques, the target of observation is placed in close proximity to the imaging face of an image sensor. The image sensor used in this case is typically a two-dimensional image sensor in which a large number of photoelectric transducers are arrayed in rows and columns within the imaging face. The photoelectric transducers are typically photodiodes formed on a semiconductor layer or a semiconductor board, and generate an electric charge by receiving incident light.

An image acquired by the image sensor is prescribed by a large number of pixels. Each pixel is partitioned into a unit area that includes one photoelectric transducer. Consequently, the resolving power (resolution) of the two-dimensional image sensor normally depends on the dot pitch of the photoelectric transducers on the imaging face. In this specification, the resolving power determined by the dot pitch of the photoelectric transducers is designated the "native resolving power" of the image sensor. Since the dot pitch of individual photoelectric transducers has become as short as the approximate wavelength of visible light, further improving the native resolving power is difficult.

Technology that realizes a resolving power exceeding the native resolving power of the image sensor (in other words, a high resolution) has been proposed. Japanese Unexamined Patent Application Publication No. 62-137037 discloses technology that uses multiple images obtained by shifting the imaging position of the subject to thereby form an image of the subject (in other words, a high-resolution image).

SUMMARY

However, there is a problem in that the data size of high-resolution images is large, and handling such images, such as transmitting, receiving, or saving such images, is burdensome.

One non-limiting and exemplary embodiment provides an image output device, an image transmission device, and an image reception device that reduce the burden of handling high-resolution images, such as transmitting, receiving, or saving high-resolution images.

In one general aspect, the techniques disclosed here feature an image output device including at least one processor, and a non-transitory recording medium that stores one or more instructions, wherein the one or more instructions cause the at least one processor to acquire an image with a first resolution, being an image of a subject obtained based on imaging by a digital microscope, acquire an image with a second resolution, being an image of the subject obtained based on imaging by the digital microscope, the image with the second resolution being of a higher resolution than the image with the first resolution, accept an enlargement ratio for the image with the first resolution displayed on a display device, determine whether or not an evaluation score determined based on the accepted enlargement ratio is higher than a certain value, transmit the image with the second resolution to an external device if the evaluation score is determined to be higher than the certain value, and not transmit the image with the second resolution to the external device if the evaluation score is determined not to be higher than the certain value.

According to the present disclosure, the burden of handling high-resolution images, such as transmitting, receiving, or saving high-resolution images, may be reduced.

It should be noted that general or specific embodiments may be implemented as a system, a method, an integrated circuit, a computer program, a computer-readable recording medium, or any selective combination thereof. Computer-readable recording media include non-volatile recording media such as Compact Disc-Read-Only Memory (CD-ROM), for example.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
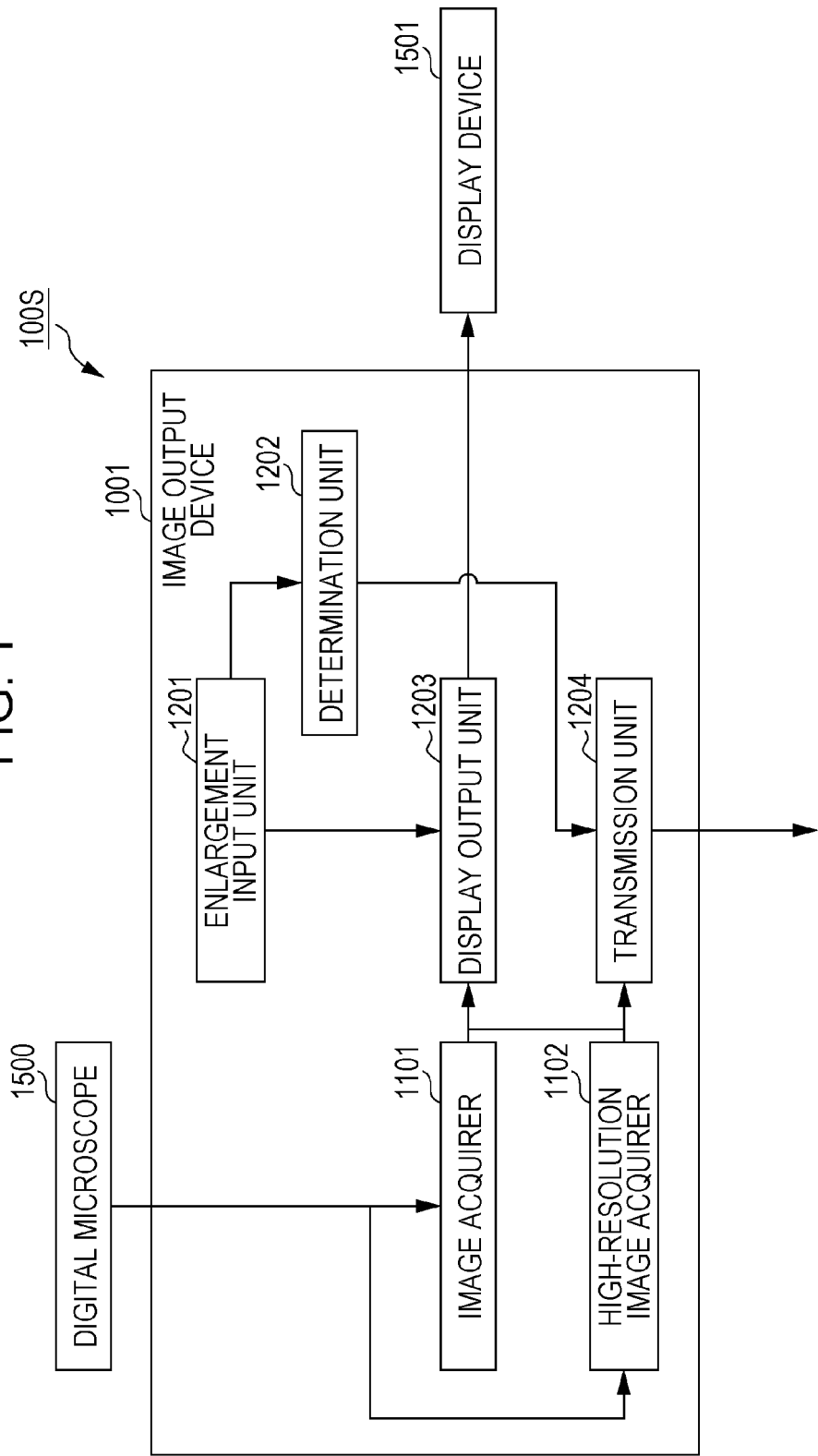
FIG. 1 is a configuration diagram illustrating an example of an image processing system including an image output device according to Embodiment 1.

Underlying Knowledge Forming Basis of the Present Disclosure

The inventor discovered that the following problem occurs with the resolution-increasing technology described in the Description of the Related Art.

In pathological examinations using a microscope, the magnification ratio of the lens to use is different depending on the condition of the individual specimen to be observed (also called a pathological specimen). For example, in a cancer examination, first, the specimen is observed with a 10× objective lens. For a specimen that does not have an region with a high likelihood of being cancer, observation ends after observing the specimen with the 10× objective lens only, but if the specimen has a region with a high likelihood of being cancer, the specimen is examined further by switching objective lens to a 40× lens. In this way, the magnification ratio of the lens is changed according to the specimen. Since it is difficult to determine whether or not a high magnification ratio is needed before performing the examination, the specimen is imaged at predetermined magnification ratios ranging from a high magnification ratio to a low magnification ratio.

In the case of capturing an image of a specimen with a digital microscope, the imaging time and the image size increase as the resolution of the image becomes higher. Provided that the image size corresponding to a 10× objective obtained with a digital microscope is 100 MB, the image size corresponding to a 40× objective is 1.6 GB.

Also, the number of pathological specimens that must be examined is only increasing, and increases in the number of pathologists is not keeping up. Consequently, in the future it is increasingly expected that a pathological image (that is, an image obtained with a digital microscope) will be transmitted to a remote location, and a pathological diagnosis will be performed by a pathologist at the remote location. In addition, as medical services in general become more sophisticated, it is becoming difficult for a single pathologist to make diagnoses for all organs or symptoms. For this reason, images of specimens that are difficult to diagnose for the local pathologist increasingly will be transmitted to a pathologist having specialized knowledge at a remote location, and a remote diagnosis will be performed. However, there is a problem in that the transmission of high-resolution pathological images is time-consuming.

To address such problems, an image output device according to an aspect of the present disclosure is provided with: an image acquisition unit that acquires an image with a first resolution, being an image of a subject obtained based on imaging by a digital microscope; a high-resolution image acquisition unit that acquires an image with a second resolution, being an image of the subject obtained based on imaging by the digital microscope, the image with the second resolution being of a higher resolution than the image with the first resolution; an enlargement input unit that accepts the input of an enlargement ratio for the image with the first resolution displayed on a display device; a determination unit that determines whether or not an evaluation score determined based on the enlargement ratio accepted by the enlargement input unit is higher than a certain value; and a transmission unit that transmits the image with the second resolution to an external device if the determination unit determines that the evaluation score is higher than the certain value, and does not transmit the image with the second resolution to the external device if the determination unit determines that the evaluation score is not higher than the certain value.

Consequently, the image with the second resolution is transmitted only if the evaluation score is high. In other words, a high-resolution image of a specimen may be transmitted to a remote location, for example, only if the specimen (subject) requires thorough diagnosis. Consequently, it is possible to minimize delays in the transmission of high-resolution images of specimens requiring thorough diagnosis due to the transmission of high-resolution images of specimens of low importance which can be diagnosed in a short time, for example. Also, since high-resolution images of specimens having a low evaluation score are not transmitted, the burden of handling high-resolution images may be reduced.

Additionally, the transmission unit may also transmit the image with the first resolution to the external device if the determination unit determines that the evaluation score is not higher than the certain value.

Consequently, for example, a pathologist at a remote location is able to perform a diagnosis on a specimen using a transmitted low-resolution image, that is, the image with the first resolution.

Additionally, the image output device additionally may be provided with a first output unit that outputs and saves the image with the second resolution to a recording medium if the determination unit determines that the evaluation score is higher than the certain value, and does not output the image with the second resolution to the recording medium if the determination unit determines that the evaluation score is not higher than the certain value.

The image size of a high-resolution image (image with the second resolution image) is large, and for pathological examinations, the images of specimens used in the examination are saved for decades. Furthermore, as the technology for acquiring specimens from the body continues to improve today, the number of imaged specimens is expected to rise in the future. Consequently, the saving of images captured with a digital microscope, particularly high-resolution images, is a major issue.

Accordingly, in one aspect of the present disclosure, the image with the second resolution is saved only if the evaluation score is high. In other words, a high-resolution image of a specimen may be saved only if the specimen (subject) requires thorough diagnosis. Consequently, it is possible to minimize limitations of free space in a recording medium due to the saving of high-resolution images of specimens of low importance which can be diagnosed in a short time, for example. Also, since high-resolution images of specimens having a low evaluation score are not saved, the burden of handling high-resolution images may be reduced.

Additionally, for example, the determination unit may derive, as the evaluation score, a maximum enlargement ratio from among one or a plurality of the enlargement ratio accepted by the enlargement input unit. Alternatively, the determination unit may derive a high evaluation score to the extent that a number of times that a high enlargement ratio has been accepted by the enlargement input unit is high, a high enlargement ratio being an enlargement ratio higher than a threshold value, or to the extent that a time of an image of the subject being displayed on the display device at the high enlargement ratio is long. Alternatively, the determination unit may derive a high evaluation score to the extent that a geometric area of the subject displayed on the display device at the high enlargement ratio higher than a threshold value is broad.

Consequently, an appropriate evaluation score may be derived according to the purpose of the image of the subject, and only an optimal high-resolution image (image with the second resolution) may be transmitted.

Additionally, an image output device according to another mode of the present disclosure is provided with: an image transmission device; and an image reception device connected to the image transmission device over a communication link, wherein the image transmission device includes at least one transmission processor, and a non-transitory transmission recording medium that stores one or more transmission instructions, wherein the one or more transmission instructions cause the at least one transmission processor to acquire, and transmit to the image reception device, an image with a first resolution, being an image of a subject obtained based on imaging by a digital microscope, acquire an image with a second resolution, being an image of the subject obtained based on imaging by the digital microscope, the image with the second resolution being of a higher resolution than the image with the first resolution, determine whether or not an evaluation score indicated by evaluation score-related information reported from the image reception device is higher than a certain value, and transmit the image with the second resolution to the image reception device if the evaluation score is determined to be higher than the certain value, the image reception device includes at least one reception processor, and a non-transitory reception recording medium that stores one or more reception instructions, wherein the one or more reception instructions cause the at least one reception processor to acquire, and display on a display device, the image with the first resolution from the image transmission device, accept an enlargement ratio for the image with the first resolution displayed on the display device, enlarge the image with the first resolution displayed on the display device, based on the accepted enlargement ratio, and transmit the evaluation score-related information determined based on the accepted enlargement ratio to the image transmission device.

Additionally, an image output device according to another mode of the present disclosure is provided with: an image transmission device; and an image reception device connected to the image transmission device over a communication link, wherein the image transmission device includes at least one transmission processor, and a non-transitory transmission recording medium that stores one or more transmission instructions, wherein the one or more transmission instructions cause the at least one transmission processor to acquire, and transmit to the image reception device, an image with a first resolution, being an image of a subject obtained based on imaging by a digital microscope, and acquire an image with a second resolution, being an image of the subject obtained based on imaging by the digital microscope, the image with the second resolution being of a higher resolution than the image with the first resolution, the image reception device includes at least one reception processor, and a non-transitory reception recording medium that stores one or more reception instructions, wherein the one or more reception instructions cause the at least one reception processor to acquire, and display on a display device, the image with the first resolution from the image transmission device, accept an enlargement ratio for the image with the first resolution displayed on a display device, enlarge the image with the first resolution displayed on the display device, based on the accepted enlargement ratio, and determine whether or not an evaluation score determined based on the accepted enlargement ratio is higher than a certain value, and report a determination result to the image transmission device, and the one or more transmission instructions of the image transmission device additionally cause the at least one transmission processor to transmit the image with the second resolution to the image reception device if the determination result reported from the image reception device indicates that the evaluation score is higher than the certain value. Note that the evaluation score-related information is information including factors such as the enlargement ratio accepted by the enlargement input unit, the number of times that an enlargement ratio has been accepted, the time that an image of the subject has been displayed, or the geometric area of the displayed subject.

Consequently, even if a pathologist is not present at the local location of the subject (that is, the specimen), for example, a pathologist at a remote location may use an image reception device to acquire an image of the specimen transmitted from an image transmission device installed at the local location, and perform a diagnosis on the specimen based on the image. Likewise in this case, since unnecessary high-resolution images are not transmitted to the image reception device, the burden of handling high-resolution images may be reduced.

Additionally, the image transmission device additionally may include a second output unit that outputs and saves the image with the second resolution to a recording medium if the determination unit determines that the evaluation score is not higher than the certain value.

Consequently, even if a high-resolution image (image with the second resolution) is not transmitted to a pathologist at a remote location because of a low evaluation score, the high-resolution image is still saved. Consequently, if the pathologist requires the high-resolution image, the high-resolution image may be read out from the recording medium and transmitted to the pathologist rapidly.

Additionally, the image output device may be configured so that the image with the first resolution is a first image with the first resolution, the one or more instructions cause the at least one processor to acquire a second image with the first resolution, being an image of the subject obtained based on imaging by the digital microscope, the image with the second resolution is generated based on the first image with the first resolution and the second image with the first resolution, the digital microscope emits a first illuminating light at a first angle to the subject and emits a second illuminating light at a second angle to the subject, the second illuminating light being emitted after the emission of the first illuminating light, the digital microscope generates the first image with the first resolution based on a first plurality of pixel values, and generates the second image with the first resolution determined based on a second plurality of pixel values, a number of pixel values in the image with the second resolution is greater than a number of the first plurality of pixel values, and the number of pixel values in the image with the second resolution is also greater than a number of the second plurality of pixel values, the subject includes a first portion and a second portion adjacent to the first portion, a plurality of photoelectric transducers outputs the first plurality of pixel values including a first pixel value, based on a first resulting light obtained by the first illuminating light passing through the subject, and outputs the second plurality of pixel values including a second pixel value, based on a second resulting light obtained by the second illuminating light passing through the subject, the plurality of photoelectric transducers includes a first photoelectric transducer and a second photoelectric transducer adjacent to the first photoelectric transducer, the first photoelectric transducer outputs the first pixel value determined based on a portion of the first resulting light obtained by a portion of the first illuminating light passing through the first portion, and the second photoelectric transducer outputs the second pixel value determined based on a portion of the second resulting light obtained by a portion of the second illuminating light passing through the second portion.

Note that each of the image output device, image transmission device, and image reception device according to an aspect of the present disclosure may be configured by providing at least one processor and a non-transitory recording medium that stores one or more instructions. In this case, the respective structural elements provided in each of the above devices are realized by the at least one processor executing the one or more instructions stored in the recording medium.

Hereinafter, exemplary embodiments will be described specifically with reference to the drawings.

Note that the exemplary embodiments described hereinafter all illustrate general or specific examples. Features such as numerical values, shapes, materials, structural elements, layout positions and connection states of structural elements, steps, and the ordering of steps indicated in the following exemplary embodiments are merely examples, and are not intended to limit the present disclosure. In addition, among the structural elements in the following exemplary embodiments, structural elements that are not described in the independent claim indicating the broadest concept are described as arbitrary or optional structural elements.

Embodiment 1

FIG. 1 is a configuration diagram illustrating an example of an image processing system including an image output device according to Embodiment 1.

The image processing system 100S includes a digital microscope 1500, an image output device 1001, and a display device 1501.

The digital microscope 1500 is the image acquisition device discussed later, and captures images with a pathological specimen as the subject. Herein, the term "digital microscope" in this specification refers to a device that creates a digital image of at least part of a prepared sample of pathological tissue. For example, the digital microscope is a device such as an image acquisition device discussed later that captures images of the sample with contact image sensing (CIS) techniques, or a virtual slide scanner. Herein, an image acquisition device that captures images with CIS techniques is a device that acquires images of the subject, namely an image with a first resolution and an image with a second resolution, by placing the subject directly on top of the image sensor and performing image capture. Specifically, the image acquisition device generates multiple images with the first resolution by capturing images of the subject while shining light onto the subject from multiple difference light source directions. Subsequently, the image acquisition device generates an image with the second resolution, which is higher in resolution than each of the images with the first resolution, by repositioning the respective pixels in the multiple images with the first resolution. Also, instead of the image acquisition device discussed later, the digital microscope 1500 may also be a digital microscope such as a virtual slide scanner that generates enlarged images at multiple resolutions. A virtual slide scanner is a device that captures images of a specimen through a microscope. An operation of shifting the relative position of the slide with respect to microscope and an operation of capturing an image are repeated, and the multiple obtained images are joined together to generate a wide-range image of the specimen. In a virtual slide scanner, the resolution of the images to acquire is selected by changing the objective lens loaded into the microscope. If an objective lens with a low magnification ratio is used, the resolution becomes lower, but the range of the specimen captured in a single image becomes wider, thereby reducing the number of imaging sites and shortening the imaging time. An image acquisition device will be described in detail in Embodiment 4.

The display device 1501 is a device that displays and presents, to an operator (for example, a pathologist), images obtained on the basis of imaging with a digital microscope. For example, the display device 1501 is a device such as a liquid crystal display or a projector.

The image output device 1001 acquires images obtained by imaging with the digital microscope 1500, and causes the display device 1501 to display the images. Furthermore, the image output device 1001 transmits the images over a communication link to a device handled by a pathologist at a remote location, for example.

The image output device 1001 is equipped with an image acquirer 1101, a high-resolution image acquirer 1102, an enlargement input unit 1201, a determination unit 1202, a display output unit 1203, and a transmission unit 1204.

The image acquirer 1101 acquires the image with the first resolution, which is an image of the subject obtained on the basis of imaging with the digital microscope 1500. Note that the image of the subject obtained on the basis of imaging with the digital microscope 1500 may be an image obtained directly by such imaging, or an image obtained by processing an image obtained directly. Herein, the image acquirer 1101 acquires sub-images obtained by imaging with a contact image sensor, for example, in the digital microscope 1500 as the image with the first resolution. Note that the resolution of the image with the first resolution is designated the first resolution.

The high-resolution image acquirer 1102 acquires the image with the second resolution, which is an image at a higher resolution than the image with the first resolution (in other words, a high-resolution image), and which is an image of the subject obtained on the basis of imaging with the digital microscope 1500. The high-resolution image acquirer 1102 may acquire the image with the second resolution by generating the image with the second resolution from multiple sub-images, or acquire the image with the second resolution from the digital microscope 1500. Note that the resolution of the image with the second resolution is designated the second resolution. Herein, the first resolution is taken to have a pixel pitch of 0.9 μm, while the second resolution is taken to have a pixel pitch of 0.3 μm. Also, the resolution ratio is 3, the resolution ratio herein being defined as the ratio of the pixel pitch of the first resolution versus the pixel pitch of the second resolution.

The enlargement input unit 1201 accepts the input of an enlargement ratio for the image with the first resolution displayed on the display device 1501. Specifically, the enlargement input unit 1201 acquires an enlargement ratio K as a numerical value via an operation on a keyboard, for example. Additionally, the enlargement input unit 1201 may also use a number of rotations in a mouse having a wheel as a value of change in the enlargement ratio, for example, and update the enlargement ratio K.

The display output unit 1203 outputs the image with the first resolution enlarged on the basis of the enlargement ratio accepted by the enlargement input unit 1201, or the image with the second resolution, to the display device 1501. Consequently, the enlarged image with the first resolution or the image with the second resolution is displayed on the display device 1501. Note that although the image output device 1001 according to the present embodiment is equipped with the display output unit 1203, the display output unit 1203 may also not be provided.

The determination unit 1202 determines whether or not an evaluation score based on the enlargement ratio accepted by the enlargement input unit 1201 is higher than a certain value. Herein, the certain value may be a value set arbitrarily by the pathologist or the operator, for example, or a predetermined value. Specifically, if the evaluation score is derived as the maximum enlargement ratio from among one or multiple enlargement ratios accepted by the enlargement input unit 1201, the certain value is a value equal to the resolution ratio (in other words, 3 in the case of the above example), for example.

Note that the certain value is a value greater than 1. However, if the certain value is set to a low value, the output discussed later will be performed frequently. To avoid such frequent output, the certain value may be the highest available value. The output discussed later is transmission by the transmission unit 1204, or alternatively, output by a first output unit 1205. Accordingly, a configuration may be used in which the certain value is changed depending on factors such as the bandwidth (that is, bit rate) of the communication link and link congestion conditions. For example, in the case of using a low-bandwidth mobile phone link, the certain value may be set to a high value of 10, whereas in the case of using a high-bandwidth optical link, the certain value may be set to a low value of 3. Also, when the link is congested, the certain value may be set to a high value of 10, whereas when the link is free of congestion, the certain value may be set to a low value of 3. In addition, a configuration may be used in which the certain value is changed depending on the size of the storage used for saving (for example, the recording medium 1502 in any of FIG. 8 and FIGS. 12 to 14 discussed later). For example, if the storage is a high-capacity hard disk drive (HDD), the certain value may be set to 3, whereas if the storage is a low-capacity solid-state drive (SSD), the certain value may be set to 10.

The transmission unit 1204 transmits the image with the second resolution in the case of the determination unit 1202 determining that the evaluation score is higher than the certain value. On the other hand, the transmission unit 1204 does not transmit the image with the second resolution in the case of the determination unit 1202 determining that the evaluation score is not higher than the certain value. In this case, or in other words, if the determination unit 1202 determines that the evaluation score is not high, the transmission unit 1204 transmits the image with the first resolution. The image with the first resolution or the image with the second resolution is transmitted over a communication link to a device handled by a pathologist at a remote location, for example.

Figure 2:
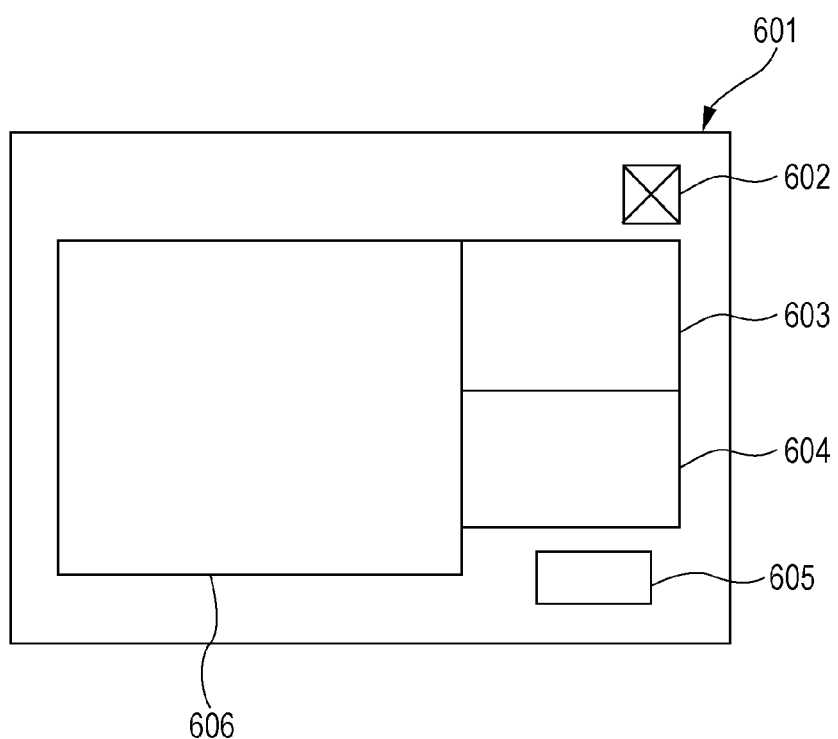
FIG. 2 is a diagram illustrating an example of a display screen displayed by a display device according to Embodiment 1.

FIG. 2 is a diagram illustrating an example of a display screen displayed by the display device 1501.

The display device 1501 displays a display screen 601 including a close button 602, an overhead image display section 603, a comments input field 604, a load button 605, and an enlarged image display section 606.

If the close button 602 is selected, the display device 1501 transmits a signal informing the image output device 1001 to end the display of the image. In the overhead image display section 603, an overall view of the image with the first resolution or the image with the second resolution is displayed. In the comments input field 604, comments from the pathologist are entered in, for example. If the load button 605 is selected, the display device 1501 transmits a signal instructing the image output device 1001 to end the display of the image with the first resolution, and load the image with the second resolution, for example. In the enlarged image display section 606, an enlarged view of the image with the first resolution or the image with the second resolution is displayed.

Figure 3:
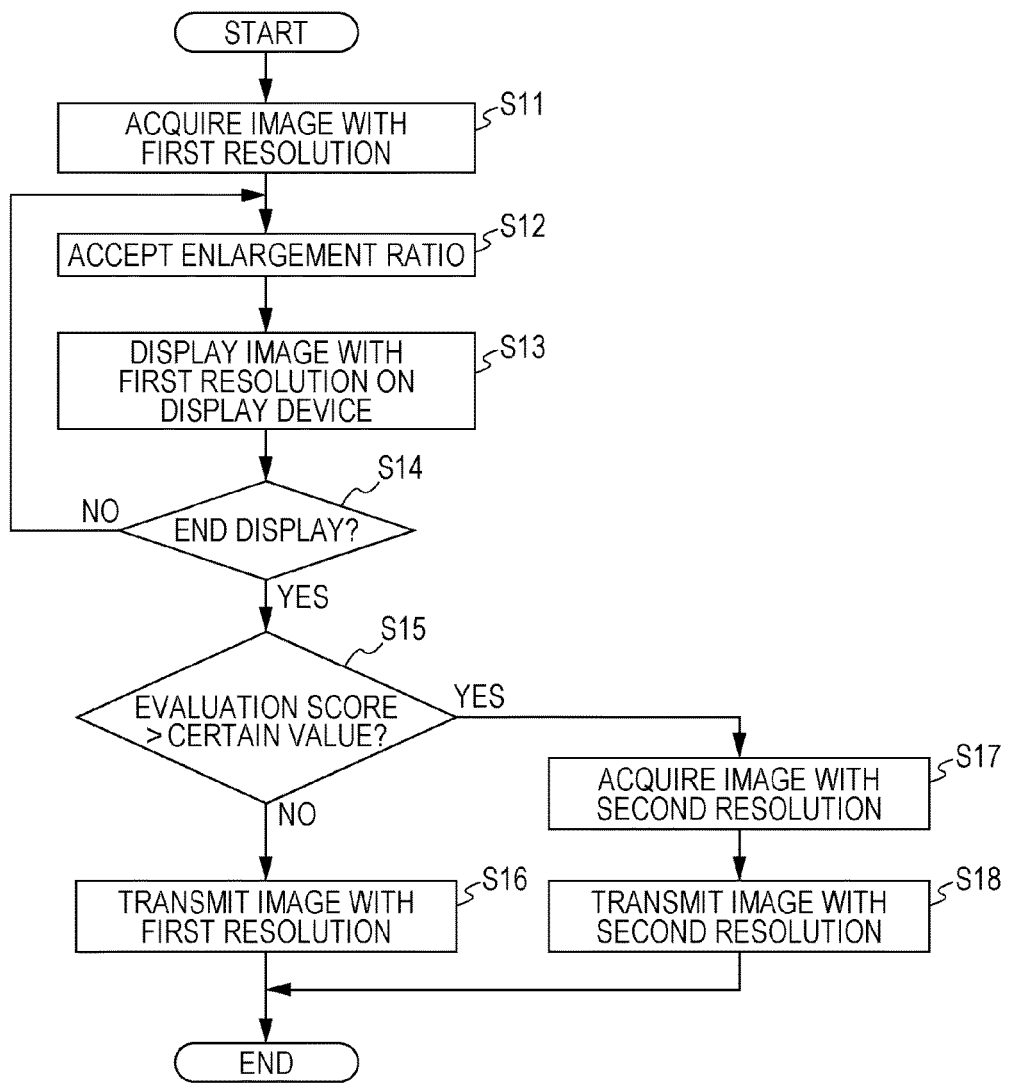
FIG. 3 is a flowchart illustrating an example of processing operations by an image output device according to Embodiment 1.

FIG. 3 is a flowchart illustrating an example of processing operations by the image output device 1001.

First, the image acquirer 1101 of the image output device 1001 acquires the image with the first resolution from the digital microscope 1500 (step S11). Next, the enlargement input unit 1201 accepts the input of an enlargement ratio for the image, according to an operation performed by the operator on an input device such as a keyboard, for example (step S12). Subsequently, the display output unit 1203 enlarges the image with the first resolution by the accepted enlargement ratio, and outputs to the display device 1501. With this output, the display output unit 1203 causes the display device 1501 to display the image with the first resolution enlarged by the accepted enlargement ratio (step S13).

Next, the display output unit 1203 determines whether or not to end the display of the image with the first resolution, based on a signal output from the display device 1501 as a result of the close button 602 or the load button 605 being selected (step S14). At this point, in the case of determining not to end the display (step S14, No), the enlargement input unit 1201 additionally accepts a new enlargement ratio. In other words, the operator observing the image displayed on the display device 1501 carries out observation while changing the enlargement ratio according to the specimen.

On the other hand, in the case of determining to end the display (step S14, Yes), the determination unit 1202 derives an evaluation score based on the enlargement ratio accepted by the enlargement input unit 1201, and determines whether or not the evaluation score is higher than a certain value (step S15).

The evaluation score is the enlargement ratio accepted previously (previous enlargement ratio) or the largest enlargement ratio (maximum enlargement ratio) from among the one or multiple enlargement ratios accepted in step S12, for example. In other words, the determination unit 1202 derives the previous enlargement ratio or the maximum enlargement ratio as the evaluation score. Alternatively, the determination unit 1202 may derive the evaluation score based on other factors. For example, the other factors may be at least one from among the number of times the input of an enlargement ratio was accepted in step S12 (input count), the time that an image has been displayed on the display device 1501 (display time), and the geometric area (surface area) of the image displayed on the display device 1501 (display area).

Additionally, the determination unit 1202 may also derive the evaluation score by multiplying the maximum enlargement ratio, the input count, the display time, and the display area by respective coefficients and adding up the result.

At this point, in the case of determining that the evaluation score is not higher than the certain value (step S15, No), the transmission unit 1204 transmits the image with the first resolution over the communication link, without transmitting the image with the second resolution (step S16). On the other hand, in the case of determining that the evaluation score is higher than the certain value (step S15, Yes), the high-resolution image acquirer 1102 acquires the image with the second resolution (step S17). Furthermore, the transmission unit 1204 transmits, over the communication link, the image with the second resolution acquired by the high-resolution image acquirer 1102 (step S18).

Figure 4:
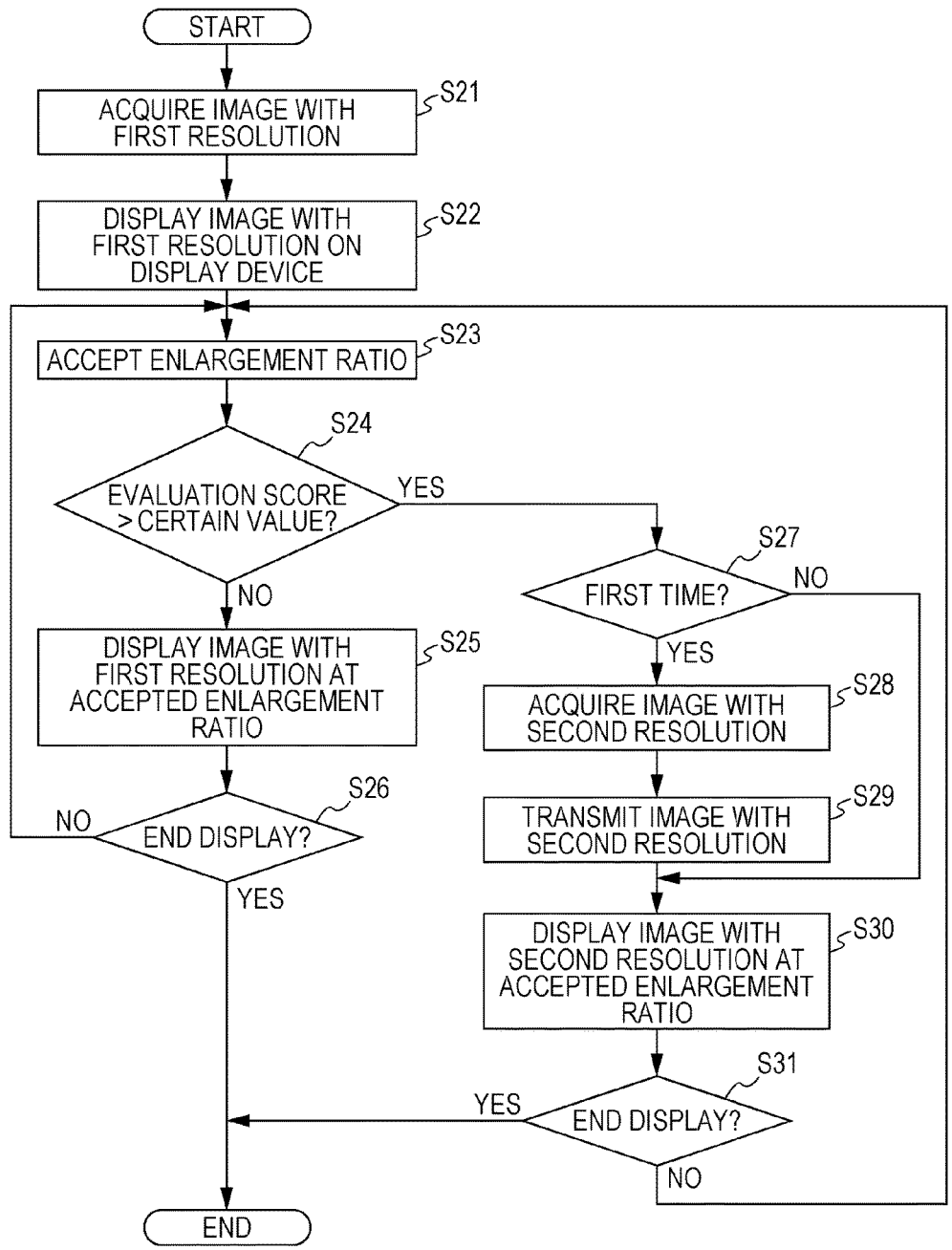
FIG. 4 is a flowchart illustrating another example of processing operations by an image output device according to Embodiment 1.

In the flowchart in FIG. 3, only the image with the first resolution is displayed enlarged by the accepted enlargement ratio, but as illustrated in the flowchart in FIG. 4, the image with the second resolution may also be displayed enlarged by the enlargement ratio.

FIG. 4 is a flowchart illustrating another example of processing operations by the image output device 1001.

First, the image acquirer 1101 of the image output device 1001 acquires the image with the first resolution from the digital microscope 1500 (step S21). Subsequently, the display output unit 1203 outputs the image with the first resolution to the display device 1501, thereby causing the display device 1501 to display the image with the first resolution (step S22).

Next, the enlargement input unit 1201 accepts the input of an enlargement ratio for the image, according to an operation performed by the operator on an input device such as a keyboard, for example (step S23). The determination unit 1202 derives an evaluation score based on the enlargement ratio accepted by the enlargement input unit 1201, and determines whether or not the evaluation score is higher than a certain value (step S24).

At this point, in the case of determining that the evaluation score is not higher than the certain value (step S24, No), the display output unit 1203 enlarges the image with the first resolution by the enlargement ratio accepted in step S23, and outputs to the display device 1501. With this output, the display output unit 1203 causes the display device 1501 to display the enlarged image with the first resolution (step S25). At this point, the image with the second resolution is not transmitted. Subsequently, the display output unit 1203 determines whether or not to end the display of the image with the first resolution, based on a signal output from the display device 1501 as a result of the close button 602 or the load button 605 being selected (step S26). At this point, in the case of determining to end the display (step S26, Yes), the image output device 1001 ends the process. On the other hand, in the case of determining not to end the display (step S26, No), the image output device 1001 repeats the process from step S23.

Also, in step S24, in the case of determining that the evaluation score is higher than the certain value (step S24, Yes), the determination unit 1202 determines whether or not that determination is the first for the specimen (step S27). At this point, in the case of determining that the determination is the first (step S27, Yes), the high-resolution image acquirer 1102 acquires the image with the second resolution (step S28). Furthermore, the transmission unit 1204 transmits, over the communication link, the image with the second resolution acquired by the high-resolution image acquirer 1102 (step S29).

After the image with the second resolution is transmitted in step S29, or in the case of determining that the determination is not the first in step S27 (step S27, No), the display output unit 1203 enlarges the image with the second resolution by the enlargement ratio accepted in step S23, and outputs to the display device 1501. With this output, the display output unit 1203 causes the display device 1501 to display the enlarged image with the second resolution (step S30). At this point, the image with the second resolution may also be enlarged not by the enlargement ratio accepted in step S23, but instead by a value obtained by dividing the enlargement ratio by the resolution ratio. For example, if the accepted enlargement ratio is 3 and the resolution ratio is 3, the image with the second resolution is enlarged by a factor of 1.

Next, the display output unit 1203 determines whether or not to end the display of the image with the second resolution, based on a signal output from the display device 1501 as a result of the close button 602 being selected (step S31). At this point, in the case of determining to end the display (step S31, Yes), the image output device 1001 ends the process. On the other hand, in the case of determining not to end the display (step S31, No), the image output device 1001 repeats the process from step S23.

Advantageous Effects

In this way, in the present embodiment, the image with the second resolution is transmitted only if the evaluation score is high. In other words, a high-resolution image of a specimen may be transmitted to a remote location, for example, only if the specimen (subject) requires thorough diagnosis. Consequently, it is possible to minimize delays in the transmission of high-resolution images of specimens requiring thorough diagnosis due to the transmission of high-resolution images of specimens of low importance which can be diagnosed in a short time, for example. Also, since high-resolution images of specimens having a low evaluation score are not transmitted, the burden of handling high-resolution images may be reduced.

Specifically, the image output device 1001 according to the present embodiment conceivably may be used in a local hospital where only an inexperienced pathologist is present, or where only surgeons are present. In such a case, the image with the second resolution of a hard-to-diagnose specimen may be transmitted by the transmission unit 1204 to a remote location where an experienced pathologist is present. First, the image with the first resolution, which is a low resolution, is transmitted to the pathologist. Subsequently, the image with the second resolution, which is a high resolution, may be transmitted only when a high evaluation score is obtained, or in other words, only if a more detailed diagnosis of the specimen is required. Provided that the image with the first resolution is 100 MB (equal to 800 Mb), the image with the second resolution is 1.6 GB, and the communication rate is 50 Mbps, the image with the first resolution may be transmitted in 16 seconds, but transmitting a high-resolution image takes 256 seconds. Transmitting all images at high resolution is time-consuming. However, most biopsies conducted in situations like a health checkup may be judged as normal using low-resolution images, and thus diagnosis may be made more efficient by transmitting high-resolution images only for specimens that require high-resolution images. In addition, the image output device 1001 may be placed in small hospitals where only a single pathologist is present, and may be used when selecting important images to transmit to a pathologist at a remote location for double-checking.

Details of Evaluation Score

The evaluation score discussed above will now be described in detail.

As discussed earlier, the determination unit 1202 may also derive the evaluation score based on at least one of the input count, the display time, and the display area.

An evaluation score based on the input count, the display time, or the display area is effective when determining whether a specimen was observed at a high magnification ratio even though a high magnification ratio was not necessary for diagnosis, or whether a specimen was observed at a high magnification ratio because a high magnification ratio was necessary for diagnosis. In other words, with diagnosis using an ordinary microscope, the burden of interchanging lenses is large, and thus if the specimen is understood to be normal at the stage of observation at a low magnification ratio, observation at a high magnification ratio is not carried out. Note that when judging whether or not a specimen is normal, the specimen is judged to be normal if the specimen contains no tumors, or if no more inspection items required for a diagnosis remain. On the other hand, for an image acquired by a digital microscope such as the digital microscope 1500 according to the present embodiment, enlargement at a high magnification ratio may be performed with a simple operation using only a mouse or a keyboard. Consequently, with the digital microscope 1500, specimens very often are observed at a high magnification ratio, even in the case of specimens that would only be observed at a low magnification ratio using an ordinary microscope.

Conceivably, this is because the person making a diagnosis, such as a pathologist, physician, or laboratory technician, is viewing images enlarged by a high magnification ratio to check whether or not the specimen was imaged appropriately. It is also conceivable that the person making a diagnosis wants to view an image of a small region included in the specimen enlarged by a high magnification ratio, even for a normal specimen.

Such parameters for observation at a high magnification ratio that is not required for diagnosis, such as the input count, the display time, and the display area, may be different depending on the preferences or the experience of the person making a diagnosis. However, the numerical values of these parameters are extremely small compared to the parameters for observation at a high magnification ratio that is required for diagnosis. Thus, in the present embodiment, by using an evaluation score based on the input count, the display time, or the display area, it is possible to determine whether or not observation at a high magnification ratio is required for diagnosis. To utilize limited communication bandwidth effectively, high-resolution images may not be transmitted when a specimen is observed at such a high magnification that is not required for diagnosis.

In addition, an evaluation score based on at least one of the input count, the display time, and the display area may be derived, and when a high-resolution image is transmitted, the transmission unit 1204 may attach a tag to the high-resolution image. In other words, the transmission unit 1204 attaches to the high-resolution image a tag indicating the parameter type used in the evaluation score (at least one of the input count, the display time, and the display area) and the evaluation score, and transmits the high-resolution image with the attached tag. Consequently, an image reception device that receives the high-resolution image is able to extract a high-resolution image having an attached tag indicating the input count, for example, as the parameter type from among multiple high-resolution images. Also, if there are multiple extracted high-resolution images, the image reception device is able to sort the extracted high-resolution images in ascending or descending order of evaluation score, based on the evaluation scores indicated by the respective tags. Consequently, the person making a diagnosis is able to easily select a high-resolution image to observe.

Details of Evaluation Score: Input Count

Specifically, the input count is the number of times that the enlargement input unit 1201 has accepted a high enlargement ratio, that is, an enlargement ratio higher than a threshold value. This threshold value is the resolution ratio discussed earlier (specifically 3), for example. The determination unit 1202 derives a high evaluation score to the extent that the input count is large. For example, the evaluation score may be the input count itself. In this case, the determination unit 1202 determines whether or not the evaluation score, or in other words the input count, is greater than one time (that is, the certain value is equal to 1). In other words, if the input count is one time, there is a high likelihood that a display of the image with the first resolution enlarged by a high enlargement ratio is not required for diagnosis. Stated differently, there is a high likelihood of the specimen being judged to be normal from the image with the first resolution at an enlargement ratio lower than a high enlargement ratio.

Conversely, if the input count is two times or more, there is a high likelihood that a display of the image with the first resolution enlarged by a high enlargement ratio is required for diagnosis. In other words, there is a high likelihood that the judgment of whether or not the specimen is normal is doubtful. Consequently, by determining whether or not the input count is greater than one time, and transmitting a high-resolution image when the input count is determined to be greater in this way, limited communication bandwidth may be utilized effectively.

Alternatively, the determination unit 1202 may also determine whether or not the evaluation score, or in other words the input count, is greater than two times (that is, the certain value is equal to 2). Specifically, in the case of diagnosing a malignant tumor, the diagnosis often is performed three or more times to confirm the state and size of the tumor. For example, in many cases a diagnosis is performed on each of the center, left edge, and right edge of the tumor. Consequently, by setting the certain value to "2" as above, high-resolution images may be transmitted only for specimens with a high suspicion of a malignant tumor.

In this way, in the case of deriving the evaluation score based on the input count, the transmission of high-resolution images may be minimized even though specimen observation at a high magnification ratio has been performed only one time or up to two times. In other words, the transmission of high-resolution images due to observing a specimen at a high magnification ratio that is not required for diagnosis may be minimized.

Details of Evaluation Score: Display Time

Specifically, the display time is the time that an image of a subject has been displayed on the display device 1501 at a high enlargement ratio. The determination unit 1202 derives a high evaluation score to the extent that the display time is long. For example, the evaluation score may be the display time that an image of a subject has been displayed on the display device 1501 at a high enlargement ratio equal to or greater than the resolution ratio discussed earlier (specifically 3). In this case, the determination unit 1202 determines whether or not the evaluation score, or in other words the display time, is longer than 10 seconds (that is, the certain value is equal to 10 seconds), for example. In other words, if the display time is 10 seconds or less, there is a high likelihood that a display of the image enlarged by a high enlargement ratio is not required for diagnosis. Consequently, the transmission of high-resolution images due to observing a specimen at a high magnification ratio that is not required for diagnosis may be minimized.

Additionally, the time taken to diagnose a malignant tumor is different depending on the person making the diagnosis or the site being observed. Consequently, the certain value (in the above example, 10 seconds) may also be modified according to the person making the diagnosis, the site being observed, or the method of acquiring and creating the specimen. For example, for a specimen created using an ordinary method, the certain value may be set to 10 seconds, whereas for a specimen created in a short time for use in intraoperative rapid diagnosis, the certain value may be set to 30 seconds.

Also, in the above example, the certain value is set to 10 seconds or 30 seconds, but a time such as the mth multiple (where m is a real number greater than 1) of an average display time in the observation of a normal specimen may also be set as the certain value.

In addition, the determination unit 1202 may also multiply a display time for each accepted enlargement ratio (that is, each high enlargement ratio equal to or greater than 3) by a weight, and derive the sum of the respectively weighted display times as the evaluation score. The weight is a value that is large to the extent that the enlargement ratio is high. Specifically, the determination unit 1202 treats the enlargement ratio itself as the weight, and derives the evaluation score according to the formula EvaluationScore=Σ[EnlargementRatio(k)×DisplayTime(k)]. Note that EnlargementRatio(k) is the kth accepted enlargement ratio equal to or greater than 3, while DisplayTime(k) is the display time of displaying an image with the first resolution enlarged by the kth enlargement ratio. In other words, if an enlargement ratio equal to or greater than the resolution ratio is accepted n times, the evaluation score is derived as the sum of EnlargementRatio(k)×DisplayTime(k) for values of k from 1 to n. For example, suppose that the accepted enlargement ratios Q and the corresponding display times T (in seconds) are (Q, T)=(3, 7), (4, 6), (5, 5), and (6, 4). In such a case, the determination unit 1202 derives the evaluation score according to EvaluationScore=(3×7)+(4×6)+(5×5)+(6×4). Note that in the computation of the evaluation score, the term "EnlargementRatio(k)−ResolutionRatio (specifically 3)+1" may also be used instead of EnlargementRatio(k). In this case, the determination unit 1202 derives the evaluation score according to EvaluationScore=(1×7)+(2×6)+(3×5)+(4×4). If such an evaluation score is used, a high evaluation score is derived to the extent that the observation time is long and also to the extent that the enlargement ratio (magnification ratio) during observation is high. Furthermore, in this case, the determination unit 1202 may also determine whether or not the evaluation score exceeds 30 (that is, the certain value is equal to 30), for example.

Note that the determination unit 1202 derives the evaluation score after calculating the display time for each enlargement ratio, but may also update the evaluation score continuously during observation. In other words, every time a fixed amount of time elapses, the determination unit 1202 may acquire the enlargement ratio during observation, add the result of multiplying the acquired enlargement ratio by the fixed amount of time to the previously derived evaluation score, and thereby update the evaluation score. Consequently, a new evaluation score is derived every time the fixed amount of time elapses.

In addition, instead of multiplying the display time by the enlargement ratio, the determination unit 1202 may also multiply the display time by a value that increases monotonically with respect to the enlargement ratio. The value that increases monotonically with respect to the enlargement ratio is a value obtained by a function, and is the logarithm of the enlargement ratio, for example. In other words, the determination unit 1202 derives the evaluation score according to the formula EvaluationScore=EΣ[log(EnlargementRatio(k))×DisplayTime(k)].

In addition, instead of deriving the evaluation score as a sum as discussed above, the determination unit 1202 may also derive, as the evaluation score, the value obtained by integrating the enlargement ratio or the logarithm of the enlargement ratio over the display time.

Details of Evaluation Score: Display Area

Specifically, the display area is the geometric area (surface area) of the subject displayed on the display device 1501 at a high enlargement ratio. For example, the determination unit 1202 uses edge detection to identify a region depicting the subject in a single frame, and computes the geometric area of the identified region as the area of the image of the subject. Also, if multiple regions are detected by edge detection in a single frame, the determination unit 1202 may also treat the geometric area of the region including a location (coordinates) indicated by the user with a mouse, for example, from among the multiple regions as the area of the image of the subject. At this point, if the displayed image is panned or scrolled, the display area becomes broader by the geometric area of the newly displayed image. In other words, if the region including the location (that is, coordinates) indicated by the user with a mouse is continuous (that is, does not have edges), and the user pans or scrolls the image, a new region continuous with the original region appears. Accordingly, the determination unit 1202 may add, to the area of the image of the subject, the geometric area of the newly appearing region, which is also a region continuous with the region including the location indicated by the user with a mouse. Note that the display area, that is, the area of the subject, is the value (quotient) obtained by dividing the area of the image of the subject computed as above by the actual enlargement ratio. The determination unit 1202 derives a high evaluation score to the extent that the display area is broad.

For example, the evaluation score is the display area of the subject displayed at a high enlargement ratio equal to or greater than the resolution ratio (specifically 3). In this case, the determination unit 1202 determines whether or not the evaluation score, or in other words the display area, is broader than 10,000 μm². Provided that the resolution ratio is 3 and the interval between positions of the specimen corresponding to two adjacent pixels is ⅓ μm (equal to 0.333 μm), the geometric area of the specimen imaged by a single pixel becomes ⅑ μm², and the size of the specimen corresponding to 10,000 μm² becomes 10,000 μm²/(⅑ μm²) =9×10⁴ pixels. In other words, the determination unit 1202 determines whether or not the display area is broader than 9×10⁴ pixels (that is, the certain value is equal to 9×10⁴ pixels). In other words, if the display area is 9×10⁴ pixels or less, there is a high likelihood that a display of the image with the first resolution enlarged by a high enlargement ratio is not required for diagnosis. Consequently, the transmission of high-resolution images due to observing a specimen at a high magnification ratio that is not required for diagnosis may be minimized.

Also, in the above example, the certain value is set to 10,000 μm² (that is, 9×10⁴ pixels), but an area such as the mth multiple (where m is a real number greater than 1) of an average display area in the observation of a normal specimen may also be set as the certain value.

In addition, the determination unit 1202 may also multiply a display area for each accepted enlargement ratio (that is, each high enlargement ratio equal to or greater than 3) by a weight, and derive the sum of the respectively weighted display areas as the evaluation score. The weight is a value that is large to the extent that the enlargement ratio is high. Specifically, the determination unit 1202 treats the square of the enlargement ratio as the weight, and derives the evaluation score according to the formula EvaluationScore=Σ[EnlargementRatio(k)^2×DisplayArea(k)]. Note that, similarly to the earlier discussion, EnlargementRatio(k) is the kth accepted enlargement ratio equal to or greater than 3, while DisplayArea(k) is the display area of the subject enlarged by the kth enlargement ratio. Note that the A^B denotes the calculation of raising A to the Bth power. In other words, if an enlargement ratio equal to or greater than the resolution ratio is accepted n times, the evaluation score is derived as the sum of EnlargementRatio(k)^2×DisplayArea(k) for values of k from 1 to n. For example, suppose that the accepted enlargement ratios Q and the corresponding display areas S (in units of 1×10$^4$ pixels) are (Q, S)=(3, 2), (4, 0.5), (5, 1.5), and (6, 1). In such a case, the determination unit 1202 derives the evaluation score according to EvaluationScore= [(3^2)×(2×10$^4$)]+[(4^2)×(0.5×10$^4$)]+[(5^2)×(1.5×10$^4$)]+ [(6^2)×(1×10$^4$)]. Note that in the computation of the evaluation score, the square of the term "EnlargementRatio(k)– ResolutionRatio (specifically 3)+1" may also be used as the weight, instead of the square of EnlargementRatio(k). In this case, the determination unit 1202 derives the evaluation score according to EvaluationScore=[(1^2)×(2×10$^4$)]+ [(2^2)×(0.5×10$^4$)]+[(3^2)×(1.5×10$^4$)]+[(4^2)×(1×10$^4$)]. If such an evaluation score is used, a high evaluation score is derived to the extent that the observed area of the subject is broad and also to the extent that the enlargement ratio (magnification ratio) during observation is high. Furthermore, in this case, the determination unit 1202 may also determine whether or not the evaluation score exceeds 8.1×10$^5$ (that is, the certain value is equal to 8.1×10$^5$), for example.

Note that it is sufficient for the weight to be a large value to the extent that the enlargement ratio is high, and the function used to obtain such a value is not limited to being the square of the enlargement ratio, insofar as the function computes a value like the above. For example, the determination unit 1202 may also derive the evaluation score according to the formula EvaluationScore=Σ[EnlargementRatio(k)^3×DisplayArea(k)].

In addition, instead of deriving the evaluation score as a sum as discussed above, the determination unit 1202 may also derive, as the evaluation score, the value obtained by integrating a power of the enlargement ratio over the display area.

Modification

A modification of the image output device according to Embodiment 1 will now be described. The image output device according to the present modification transmits and also saves the image with the second resolution if the evaluation score is high.

Figure 5:
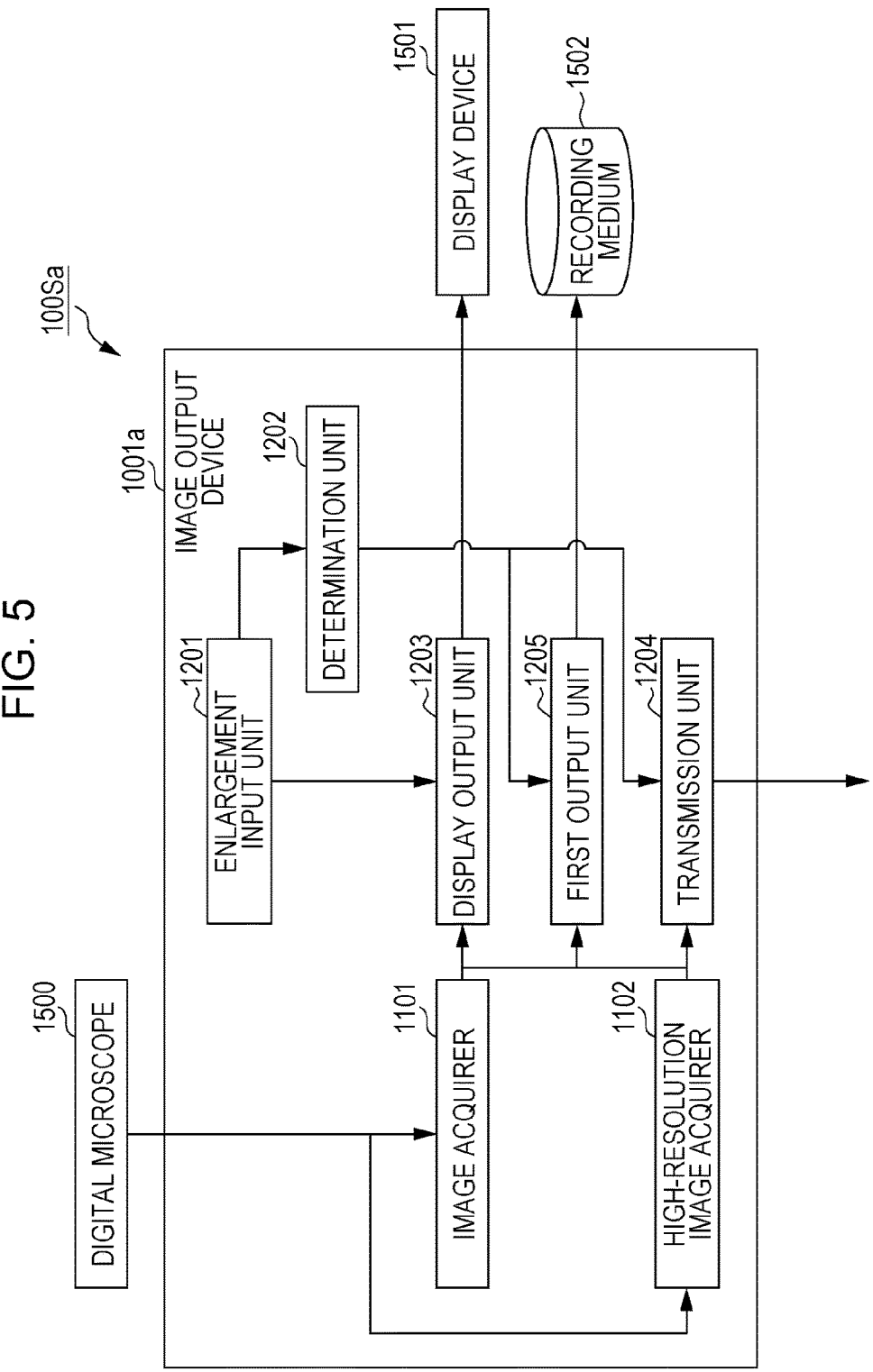
FIG. 5 is a configuration diagram illustrating an example of an image processing system including an image output device according to an exemplary modification of Embodiment 1.

FIG. 5 is a configuration diagram illustrating an example of an image processing system including the image output device according to the present modification.

The image processing system 100Sa according to the present modification includes a digital microscope 1500, an image output device 1001a, a display device 1501, and a recording medium 1502.

The recording medium 1502 stores images output from the image output device 1001a. The recording medium 1502 is realized by a storage device such as a hard disk, a Blu-ray (registered trademark) Disc (BD), a DVD, an SD card (registered trademark), random access memory (RAM), or a cache, for example.

The image output device 1001a includes a first output unit 1205 in addition to the structural elements provided in the image output device 1001 according to Embodiment 1 above.

The first output unit 1205 outputs and saves the image with the second resolution to the recording medium 1502 in the case of the determination unit 1202 determining that the evaluation score is higher than the certain value. On the other hand, the first output unit 1205 does not output the image with the second resolution to the recording medium 1502 in the case of the determination unit 1202 determining that the evaluation score is not higher than the certain value.

In other words, the first output unit 1205 outputs an image transmitted from the transmission unit 1204 to the recording medium 1502, thereby saving the image in the recording medium 1502. Namely, the first output unit 1205 saves, to the recording medium 1502, the image with the first resolution or the image with the second resolution transmitted in steps S16 and S18 of FIG. 3 or in step S29 of FIG. 4.

Advantageous Effects

With such an image output device 1001a according to the present modification, a high-resolution image (the image with the second resolution) may be saved automatically for a specimen requiring diagnosis at a high resolution. Providing a button to select whether or not to save a high-resolution image is also conceivable, but a pathologist may diagnose 60 or more specimens in an hour in some cases, and conceivably may forget to operate the button. However, if the image output device 1001a according to the present modification is used, forgetting such button operation may be prevented, and important high-resolution images may be saved reliably.

In addition, if the image output device 1001a according to the present modification is used, a high-resolution image is saved and transmitted for a specimen diagnosed using that high-resolution image, whereas a low-resolution image is saved and transmitted for a specimen diagnosed using that low-resolution image (image with the first resolution). Consequently, by setting the size of the image to be saved and transmitted to a size corresponding to the specimen, the size of the image to be saved, the size of the image to be transmitted (transferred), and the transfer time may be reduced.

Embodiment 2

An image output device according to the present embodiment includes an image transmission device and an image reception device, which are interconnected over a communication link. Note that among the devices and corresponding structural elements according to the present embodiment, the devices and corresponding structural elements which are the same as Embodiment 1 will be denoted using the same reference signs as Embodiment 1, and detailed description of such devices and structural elements will be reduced or omitted.

Figure 6:
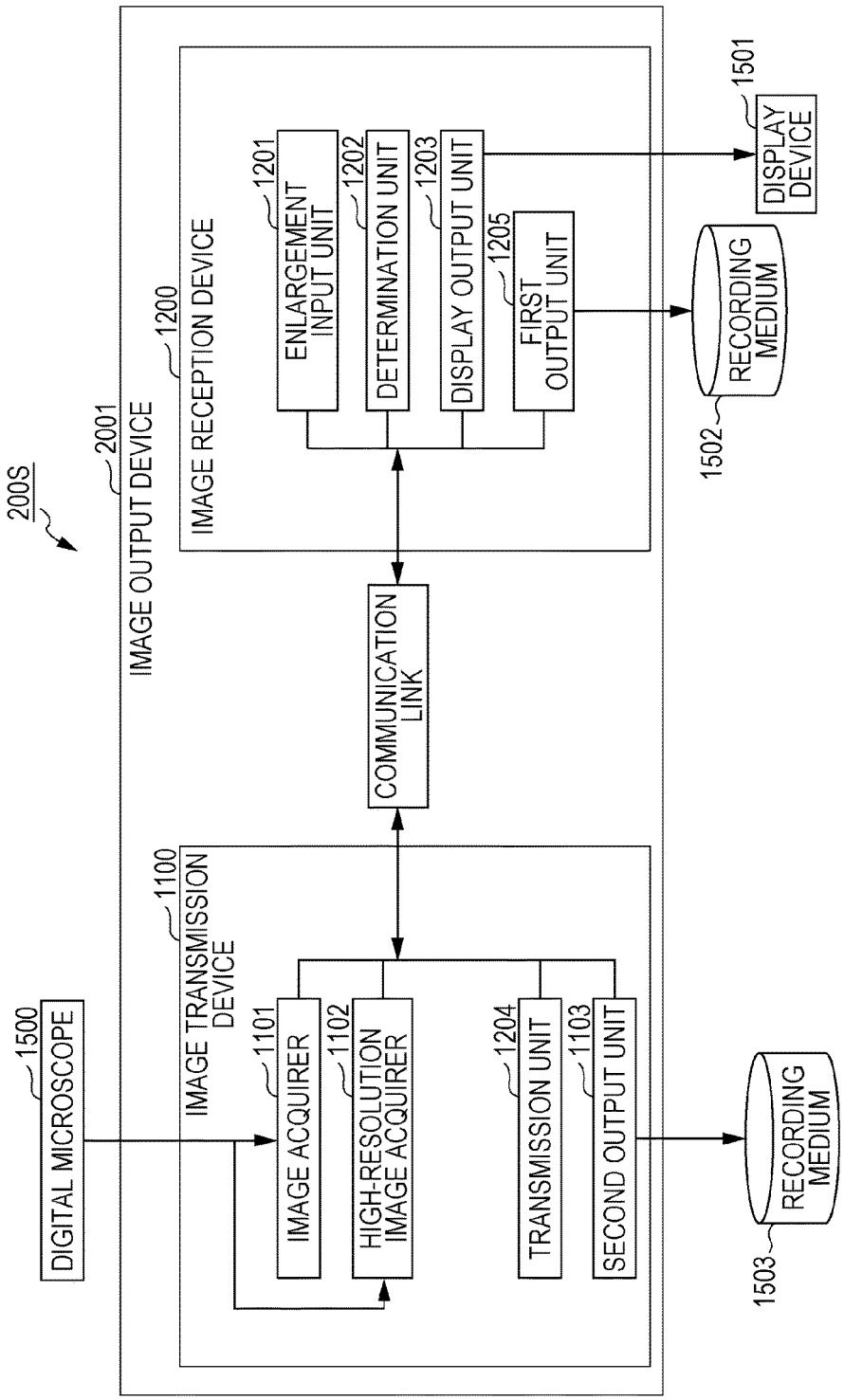
FIG. 6 is a configuration diagram illustrating an example of an image processing system including an image output device according to Embodiment 2.

FIG. 6 is a configuration diagram illustrating an example of an image processing system including an image output device according to Embodiment 2.

The image processing system 200S includes a digital microscope 1500, an image output device 2001, a display device 1501, a recording medium 1502, and a recording medium 1503.

The recording medium 1502 stores images output from an image reception device 1200 of the image output device 2001.

The recording medium 1503 stores images output from an image transmission device 1100 of the image output device 2001. Similarly to the recording medium 1502, the recording medium 1503 is realized by a storage device such as a hard disk, a Blu-ray (registered trademark) Disc (BD), a DVD, an SD card (registered trademark), RAM, or a cache, for example.

The image output device 2001 is equipped with an image transmission device 1100 and an image reception device 1200, which are interconnected over a communication link.

Note that overall, the image output device 2001 has functions similar to the image output device 1001 of Embodiment 1. In addition, for example, a set including the digital microscope 1500, the image transmission device 1100, and the recording medium 1503 is placed in a facility such as a hospital where a pathologist is not present. A set including the image reception device 1200, the display device 1501, and the recording medium 1502 is placed in a facility where a pathologist is present, distant from the hospital, for example.

The image transmission device 1100 is equipped with an image acquirer 1101, a high-resolution image acquirer 1102, a transmission unit 1204, and a second output unit 1103.

The second output unit 1103 outputs an image with the second resolution acquired by the high-resolution image acquirer 1102 to the recording medium 1503, thereby saving the image with the second resolution in the recording medium 1503. In other words, the second output unit 1103 outputs and saves the image with the second resolution to the recording medium 1503 in the case of the determination unit 1202 determining that the evaluation score is not higher than the certain value.

The image reception device 1200 is equipped with an enlargement input unit 1201, a determination unit 1202, a display output unit 1203, and a first output unit 1205.

The display output unit 1203 acquires the image with the first resolution or the image with the second resolution from the image transmission device 1100 over the communication link. Subsequently, and similarly to Embodiment 1, the display output unit 1203 outputs the image with the first resolution enlarged on the basis of the enlargement ratio accepted by the enlargement input unit 1201, or the image with the second resolution, to the display device 1501. Consequently, the display output unit 1203 causes the display device 1501 to display the enlarged image with the first resolution or the image with the second resolution.

Similarly to Embodiment 1, the determination unit 1202 determines whether or not the evaluation score is higher than the certain value. Subsequently, the determination unit 1202 notifies the image transmission device 1100 of the determination result over the communication link.

In the case of a determination result indicating an evaluation score that is high, the transmission unit 1204 of the image transmission device 1100 transmits the image with the second resolution to the image reception device 1200 over the communication link. On the other hand, in the case of a determination result indicating that the evaluation score is not high, the transmission unit 1204 transmits the image with the first resolution instead of the image with the second resolution over the communication link.

Figure 7:
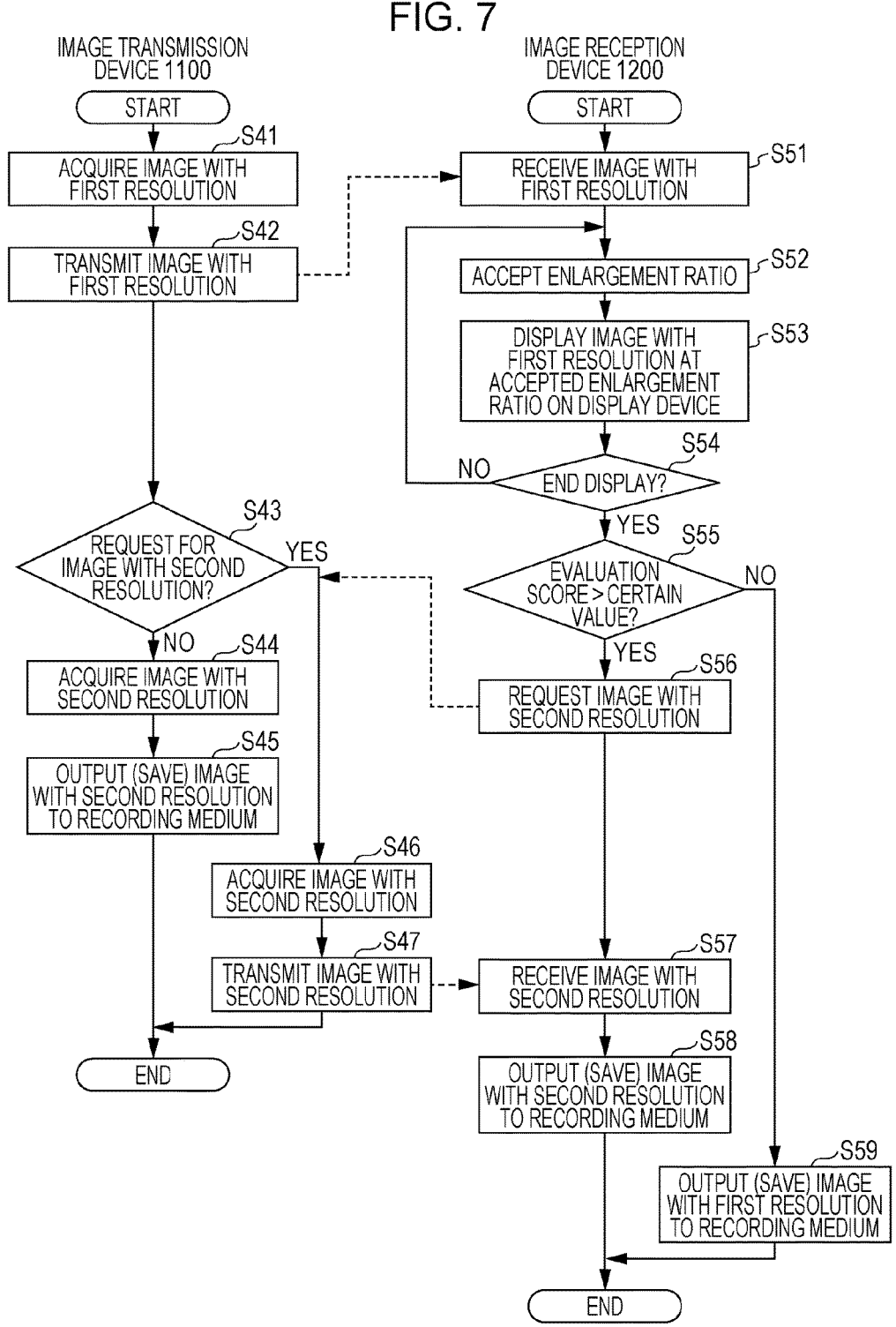
FIG. 7 is a flowchart illustrating processing operations by an image transmission device and an image reception device according to Embodiment 2.

FIG. 7 is a flowchart illustrating processing operations by the image transmission device 1100 and the image reception device 1200.

The image acquirer 1101 of the image transmission device 1100 acquires the image with the first resolution from the digital microscope 1500 (step S41). The transmission unit 1204 transmits the image with the first resolution to the image reception device 1200 over the communication link (step S42).

The display output unit 1203 of the image reception device 1200 receives the image with the first resolution transmitted from the image transmission device 1100 over the communication link (step S51). Next, the enlargement input unit 1201 of the image reception device 1200 accepts the input of an enlargement ratio for the image, according to an operation performed by the operator on an input device such as a keyboard, for example (step S52). Subsequently, the display output unit 1203 enlarges the image with the first resolution by the accepted enlargement ratio, and outputs to the display device 1501. With this output, the display output unit 1203 causes the display device 1501 to display the image with the first resolution enlarged by the accepted enlargement ratio (step S53).

Next, the display output unit 1203 of the image reception device 1200 determines whether or not to end the display of the image with the first resolution, based on a signal output from the display device 1501 as a result of the close button 602 or the load button 605 being selected (step S54). At this point, in the case of determining not to end the display (step S54, No), the enlargement input unit 1201 additionally accepts a new enlargement ratio. In other words, the operator (pathologist) observing the image displayed on the display device 1501 carries out observation while changing the enlargement ratio according to the specimen.

On the other hand, in the case of determining to end the display (step S54, Yes), the determination unit 1202 derives an evaluation score based on the enlargement ratio accepted by the enlargement input unit 1201, and determines whether or not the evaluation score is higher than a certain value (step S55).

At this point, in the case of determining that the evaluation score is not higher than the certain value (step S55, No), the first output unit 1205 of the image reception device 1200 outputs and saves the image with the first resolution to the recording medium 1502 (step S59). On the other hand, if the evaluation score is determined to be higher than the certain value (step S55, Yes), the first output unit 1205 requests the image with the second resolution from the image transmission device 1100 over the communication link (step S56).

The transmission unit 1204 of the image transmission device 1100 determines whether or not the image reception device 1200 has requested the image with the second resolution (step S43). At this point, in the case of determining that a request has not been made (step S43, No), the high-resolution image acquirer 1102 acquires the image with the second resolution (step S44). Subsequently, the second output unit 1103 outputs and saves the image with the second resolution acquired by the high-resolution image acquirer 1102 to the recording medium 1503 (step S45). Consequently, the second output unit 1103 outputs and saves the image with the second resolution to the recording medium 1503 in the case of the determination unit 1202 determining that the evaluation score is not high.

On the other hand, in the case of determining that the image with the second resolution has been requested (step S43, Yes), the high-resolution image acquirer 1102 acquires the image with the second resolution (step S46). Subsequently, the transmission unit 1204 transmits, to the image reception device 1200 over the communication link, the image with the second resolution acquired by the high-resolution image acquirer 1102 (step S47). Consequently, similarly to Embodiment 1, the transmission unit 1204 transmits the image with the second resolution in the case of the determination unit 1202 determining that the evaluation score is high, but does not transmit the image with the second resolution in the case of the determination unit 1202 determining that the evaluation score is not high.

Note that in the above example, the processing in step S44 and step S46 is conducted after the determination in step S43, but may also be conducted before the determination in step S43.

After the image with the second resolution is transmitted in step S47, the first output unit 1205 of the image reception device 1200 receives the image with the second resolution (step S57). Subsequently, the first output unit 1205 outputs and saves the image with the second resolution to the recording medium 1502 (step S58).

Advantageous Effects

With such an image output device 2001 according to the present embodiment, advantageous effects similar to Embodiment 1 may be exhibited even if the facility where an image of the subject is acquired and the facility where the image is observed are distant from each other.

Modification 1

A first modification of the image output device according to Embodiment 2 will now be described. In the present modification, in the case of determining that the evaluation score is high for multiple specimens, multiple images with the second resolution are transmitted in order from the image with the second resolution corresponding to the specimen with the highest evaluation score.

Figure 8:
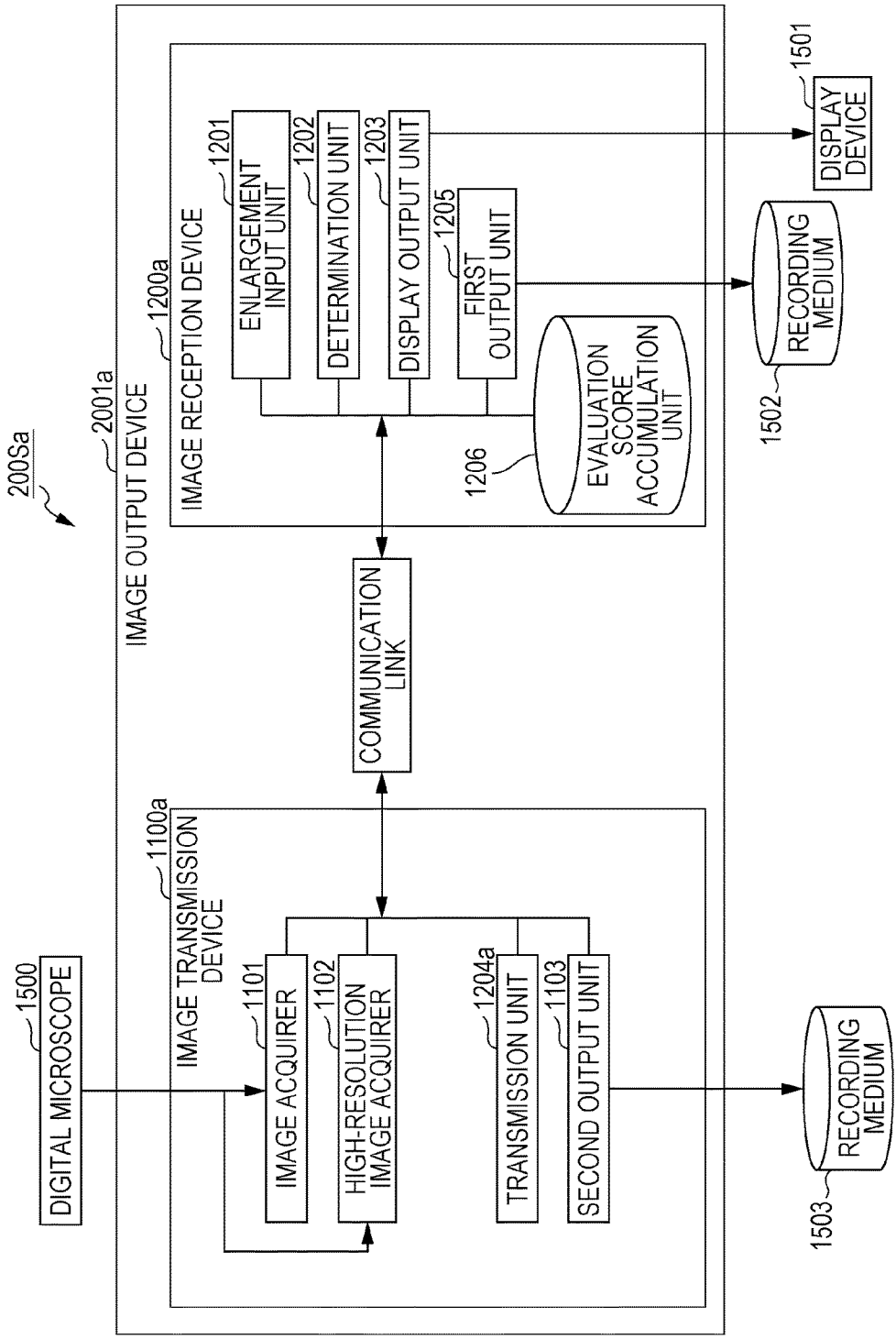
FIG. 8 is a configuration diagram illustrating an example of an image processing system including an image output device according to Modification 1 of Embodiment 2.

FIG. 8 is a configuration diagram illustrating an example of an image processing system including an image output device according to the present modification.

The image processing system 200Sa according to the present modification includes a digital microscope 1500, an image output device 2001a, a display device 1501, a recording medium 1502, and a recording medium 1503.

The image output device 2001a is equipped with an image transmission device 1100a and an image reception device 1200a, which are interconnected over a communication link.

The image reception device 1200a is equipped with an evaluation score accumulation unit 1206 in addition to the structural elements provided in the image reception device 1200 according to Embodiment 2. In the evaluation score accumulation unit 1206, evaluation scores derived for respective specimens (subjects) are accumulated. Also, the first output unit 1205 requests the image transmission device 1100a for images with the second resolution corresponding to respective evaluation scores accumulated in the evaluation score accumulation unit 1206.

The image transmission device 1100a is equipped with a transmission unit 1204a instead of the transmission unit 1204 according to Embodiment 2. The transmission unit 1204a not only includes functions similar to the transmission unit 1204 according to Embodiment 2, but in addition, when a request is received from the first output unit 1205, the transmission unit 1204a transmits multiple images with the second resolution in order from the image with the second resolution corresponding to the specimen with the highest evaluation score.

Figure 9:
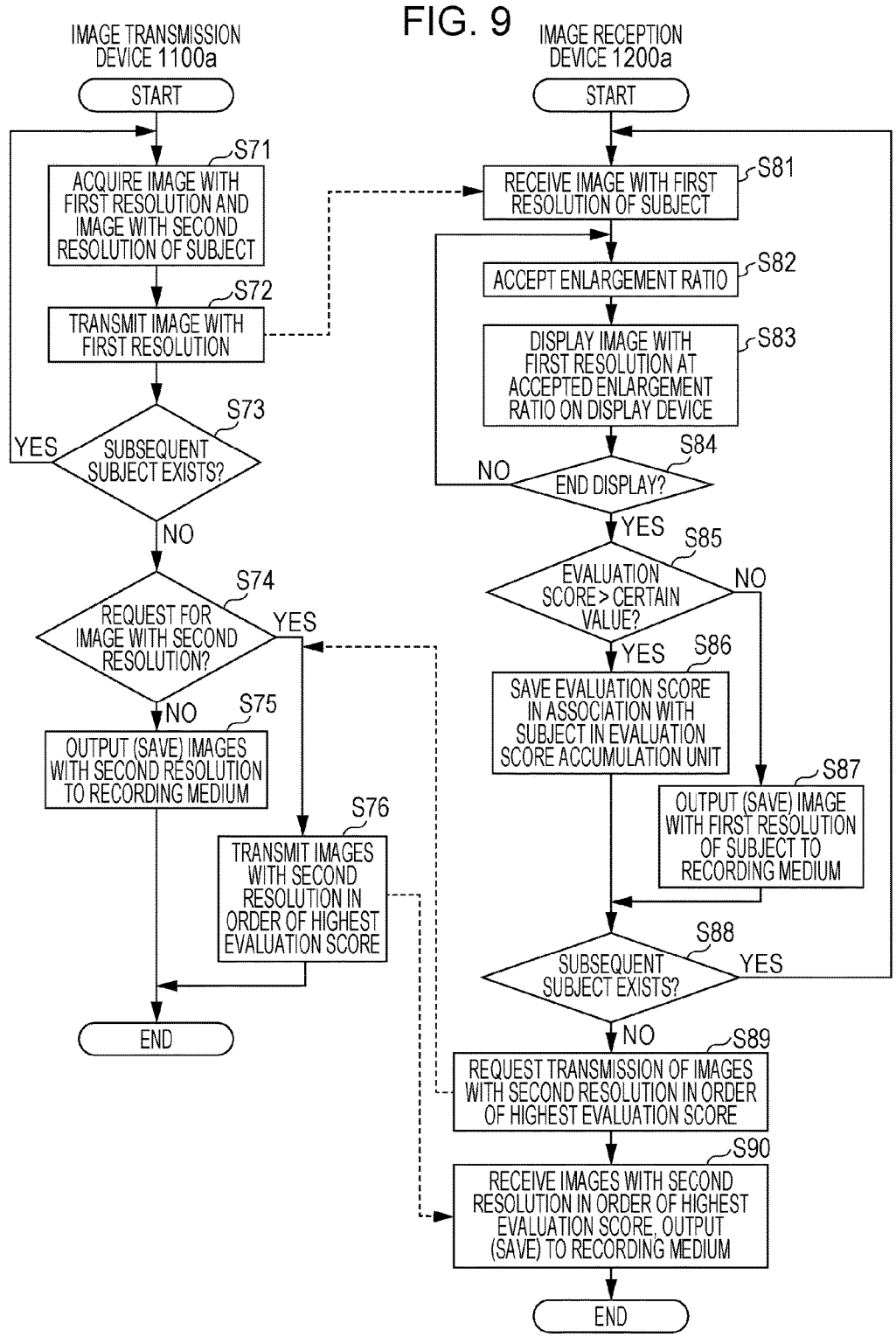
FIG. 9 is a flowchart illustrating processing operations by an image transmission device and an image reception device according to Modification 1 of Embodiment 2.

FIG. 9 is a flowchart illustrating processing operations by the image transmission device 1100a and the image reception device 1200a.

The image acquirer 1101 and the high-resolution image acquirer 1102 of the image transmission device 1100a acquire the image with the first resolution and the image with the second resolution of a subject (step S71). The transmission unit 1204a transmits the image with the first resolution to the image reception device 1200a over the communication link (step S72). Additionally, the image acquirer 1101 and the high-resolution image acquirer 1102 determine whether or not a subsequent subject exists (step S73). If a subsequent subject is determined to exist (step S73), the image transmission device 1100a repeats the process from step S71.

The display output unit 1203 of the image reception device 1200a receives the image with the first resolution transmitted from the image transmission device 1100a over the communication link (step S81). Next, the enlargement input unit 1201 of the image reception device 1200a accepts the input of an enlargement ratio for the image, according to an operation performed by the operator on an input device such as a keyboard, for example (step S82). Subsequently, the display output unit 1203 enlarges the image with the first resolution by the accepted enlargement ratio, and outputs to the display device 1501. With this output, the display output unit 1203 causes the display device 1501 to display the image with the first resolution enlarged by the accepted enlargement ratio (step S83).

Next, the display output unit 1203 of the image reception device 1200a determines whether or not to end the display of the image with the first resolution, based on a signal output from the display device 1501 as a result of the close button 602 or the load button 605 being selected (step S84). At this point, in the case of determining not to end the display (step S84, No), the enlargement input unit 1201 additionally accepts a new enlargement ratio. In other words, the operator (pathologist) observing the image displayed on the display device 1501 carries out observation while changing the enlargement ratio according to the specimen.

On the other hand, in the case of determining to end the display (step S84, Yes), the determination unit 1202 derives an evaluation score based on the enlargement ratio accepted by the enlargement input unit 1201, and determines whether or not the evaluation score is higher than a certain value (step S85).

At this point, in the case of determining that the evaluation score is not higher than the certain value (step S85, No), the first output unit 1205 of the image reception device 1200a outputs and saves the image with the first resolution to the recording medium 1502 (step S87). On the other hand, if the evaluation score is determined to be higher than the certain value (step S85, Yes), the determination unit 1202 saves the evaluation score that is higher than the certain value in the evaluation score accumulation unit 1206 in association with the subject (step S86).

Next, the display output unit 1203 of the image reception device 1200a determines whether or not a subsequent subject exists (step S88). At this point, if a subsequent subject is determined to exist (step S88, Yes), the image reception device 1200a repeats the process from step S81. On the other hand, if a subsequent subject is determined not to exist (step S88, No), the first output unit 1205 of the image reception device 1200a references the evaluation scores saved in the evaluation score accumulation unit 1206. Subsequently, the first output unit 1205 requests the image transmission device 1100 to transmit, over the communication link, images with the second resolution of the subjects, in order of the evaluation score respectively associated with the subjects (step S89).

The transmission unit 1204a of the image transmission device 1100a determines whether or not the image reception device 1200a has requested images with the second resolution (step S74). At this point, in the case of determining that a request has not been made (step S74, No), the second output unit 1103 outputs and saves the images with the second resolution of respective subjects acquired in step S71 to the recording medium 1503 (step S75). On the other hand, in the case of determining that images with the second resolution have been requested (step S74, Yes), the transmission unit 1204a transmits, to the image reception device 1200a, the images with the second resolution corresponding to evaluation scores higher than the certain value from among the images with the second resolution of respective subjects acquired in step S71. At this point, the transmission unit 1204a transmits these images with the second resolution to the image reception device 1200a over the communication link in order from the image with the second resolution having the highest evaluation score (step S76).

The first output unit 1205 of the image reception device 1200a receives, and outputs to the recording medium 1502, the images with the second resolution corresponding to evaluation scores higher than the certain value, in order from the image with the second resolution having the highest evaluation score (step S90). Consequently, images with the second resolution having evaluation scores higher than the certain value are saved in the recording medium 1502.

Advantageous Effects

In this way, in the present modification, when collectively transmitting images with the second resolution of multiple subjects for which the evaluation score is determined to be high, the images with the second resolution are transmitted in order from the image with the second resolution having the highest evaluation score. Consequently, highly important images with the second resolution may be transmitted rapidly. As a result, the pathologist is able to diagnose specimens using the images with the second resolution, in order from the image with the second resolution having the highest importance.

In other words, the image transmission device 1100a conceivably may be used in a local hospital where only an inexperienced pathologist is present, or where only surgeons are present. In such a case, the image with the second resolution of a hard-to-diagnose specimen is transmitted by the transmission unit 1204a to a major hospital where an experienced pathologist is present. The communication link may be limited, but if the image output device 2001a according to the present modification is used, the image with the second resolution of a hard-to-diagnose specimen may be prioritized for transmission from the local hospital to the major hospital. In addition, the image transmission device 1100a may be placed in small hospitals where only a single pathologist is present, and may be used when selecting important images to transmit to a pathologist at a remote location for double-checking.

Note that in pathological examinations, multiple specimens from the same patient are imaged in some cases. For example, in a cancer examination, a portion of an organ may be acquired, and different cross-sections of that portion may be observed in some cases. In other words, by imaging specimen sections at different positions in the vertical direction (referred to as different heights for the sake of convenience), multiple two-dimensional images are acquired, and these images are used to check the three-dimensional extent of the cancer. At this point, if there is a suspicion of cancer in the image at some height, it is desirable to transmit or save that image, as well as images at other heights, at high resolution.

Accordingly, the high-resolution image acquirer 1102 may also attach the same image group identifier to multiple images with the second resolution obtained from the same organ of the same patient. In this case, when transmitting an image with the second resolution, the transmission unit 1204a also transmits, to the image reception device 1200a, the other images with the second resolution associated with the image group identifier attached to that image with the second resolution. Consequently, the pathologist handling the image reception device 1200a is able to collectively acquire the multiple images with the second resolution obtained from the same organ of the same patient without having to select each image individually, and easily check factors such as the three-dimensional extent of the cancer.

Modification 2

In Embodiment 2 and Modification 1 above, the determination unit 1202 is provided in the image reception device, but the determination unit 1202 may also be provided in the image transmission device. The image transmission device according to a second modification is provided with the determination unit 1202.

Figure 10:
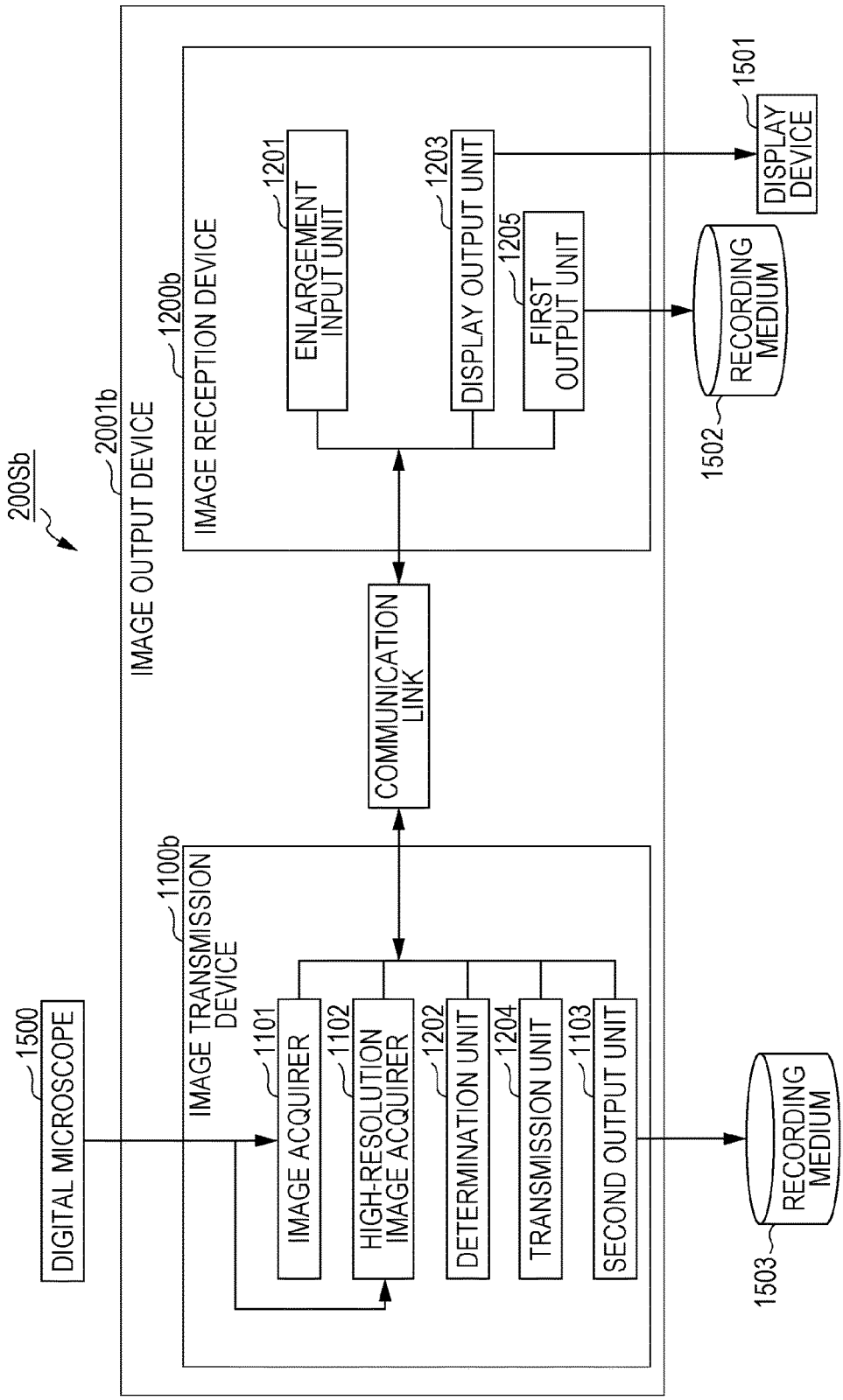
FIG. 10 is a configuration diagram illustrating an example of an image processing system including an image output device according to Modification 2 of Embodiment 2.

FIG. 10 is a configuration diagram illustrating an example of an image processing system including an image output device according to the present modification.

The image processing system 200Sb according to the present modification includes a digital microscope 1500, an image output device 2001b, a display device 1501, a recording medium 1502, and a recording medium 1503.

The image output device 2001b is equipped with an image transmission device 1100b and an image reception device 1200b, which are interconnected over a communication link.

The image transmission device 1100b is equipped with a determination unit 1202 in addition to the structural elements provided in the image transmission device 1100a according to Embodiment 2 and Modification 1.

The image reception device 1200b is not equipped with the determination unit 1202, but is equipped with an enlargement input unit 1201, a display output unit 1203, and a first output unit 1205.

Figure 11:
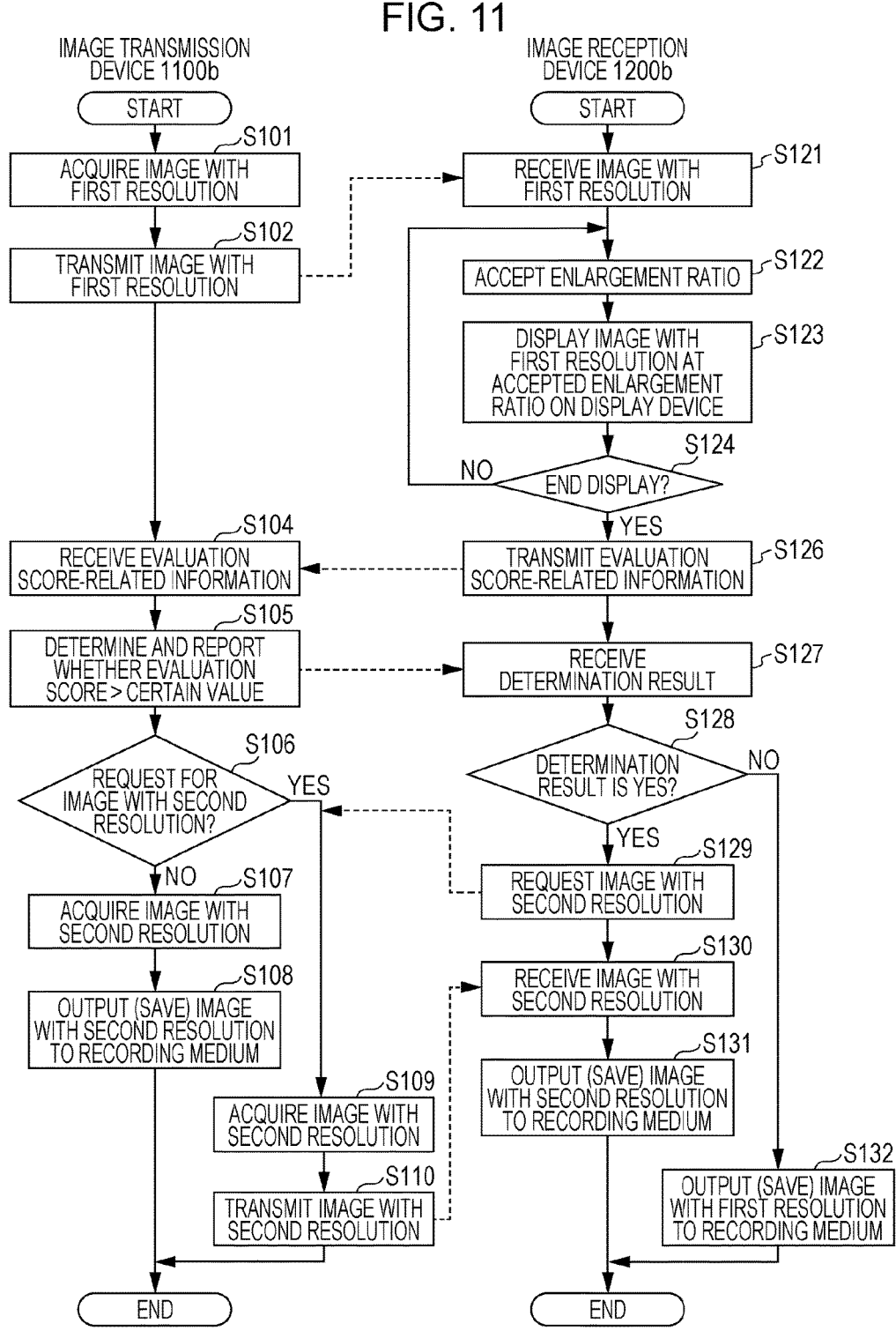
FIG. 11 is a flowchart illustrating processing operations by an image transmission device and an image reception device according to Modification 2 of Embodiment 2.

FIG. 11 is a flowchart illustrating processing operations by the image transmission device 1100b and the image reception device 1200b.

The image acquirer 1101 of the image transmission device 1100b acquires the image with the first resolution from the digital microscope 1500 (step S101). The transmission unit 1204 transmits the image with the first resolution to the image reception device 1200 over the communication link (step S102).

The display output unit 1203 of the image reception device 1200b receives the image with the first resolution transmitted from the image transmission device 1100b over the communication link (step S121). Next, the enlargement input unit 1201 of the image reception device 1200b accepts the input of an enlargement ratio for the image, according to an operation performed by the operator on an input device such as a keyboard, for example (step S122). Subsequently, the display output unit 1203 enlarges the image with the first resolution by the accepted enlargement ratio, and outputs to the display device 1501. With this output, the display output unit 1203 causes the display device 1501 to display the image with the first resolution enlarged by the accepted enlargement ratio (step S123).

Next, the display output unit 1203 of the image reception device 1200b determines whether or not to end the display of the image with the first resolution, based on a signal output from the display device 1501 as a result of the close button 602 or the load button 605 being selected (step S124). At this point, in the case of determining not to end the display (step S124, No), the enlargement input unit 1201 additionally accepts a new enlargement ratio. In other words, the operator (pathologist) observing the image displayed on the display device 1501 carries out observation while changing the enlargement ratio according to the specimen. On the other hand, in the case of determining to end the display (step S124, Yes), the display output unit 1203 transmits evaluation score-related information required to derive the evaluation score to the image transmission device 1100b over the communication link (step S126). The evaluation score-related information is at least one of the previous enlargement ratio, the maximum enlargement ratio, the input count, the display time, and the display area discussed earlier, for example.

The determination unit 1202 of the image transmission device 1100b receives the evaluation score-related information (step S104). Subsequently, the determination unit 1202 derives the evaluation score based on the evaluation score-related information. Additionally, the determination unit 1202 determines whether or not the derived evaluation score is higher than the certain value, and informs the image reception device 1200b of the determination result over the communication link (step S105).

The first output unit 1205 of the image reception device 1200b receives the determination result reported by the image transmission device 1100b over the communication link (step S127), and confirms whether or not the determination result is positive (Yes) (step S128). At this point, if the determination result is confirmed to be negative, or in other words, if the evaluation score is confirmed not to be higher than the certain value (step S128, No), the first output unit 1205 of the image reception device 1200b outputs and saves the image with the first resolution to the recording medium 1502 (step S132). On the other hand, if the determination result is confirmed to be positive, or in other words, if the evaluation score is confirmed to be higher than the certain value (step S128, Yes), the first output unit 1205 of the image reception device 1200b requests the image with the second resolution from the image transmission device 1100 over the communication link (step S129).

The transmission unit 1204 of the image transmission device 1100b determines whether or not the image reception device 1200b has requested the image with the second resolution (step S106). At this point, in the case of determining that a request has not been made (step S106, No), the high-resolution image acquirer 1102 acquires the image with the second resolution (step S107). Furthermore, the second output unit 1103 outputs and saves the image with the second resolution acquired by the high-resolution image acquirer 1102 to the recording medium 1503 (step S108).

On the other hand, in the case of determining that the image with the second resolution has been requested (step S106, Yes), the high-resolution image acquirer 1102 acquires the image with the second resolution (step S109). Subsequently, the transmission unit 1204 transmits, to the image reception device 1200b over the communication link, the image with the second resolution acquired by the high-resolution image acquirer 1102 (step S110).

Note that in the above example, the processing in step S107 and step S109 is conducted after the determination in step S106, but may also be conducted before the determination in step S106.

After the image with the second resolution is transmitted in step S110, the first output unit 1205 of the image reception device 1200b receives the image with the second resolution (step S130). Subsequently, the first output unit 1205 outputs the image with the second resolution to the recording medium 1502 for saving (step S131).

Advantageous Effects

In this way, in the present modification, advantageous effects similar to Embodiments 1 and 2 above may be exhibited, even if the determination unit 1202 is provided in the image transmission device 1100b.

Also, in the present modification, and similarly to Modification 1, respective images with the second resolution of multiple subjects associated with evaluation scores higher than the certain value may be transmitted and received in order from the image with the second resolution having the highest evaluation score.

Embodiment 3

In Embodiments 1 and 2 and their corresponding modifications above, transmitting or not transmitting the image with the second resolution is switched according to whether or not the evaluation score is higher than the certain value. The present embodiment, rather than switching between transmission and non-transmission, switches between saving and not saving the image with the second resolution, according to whether or not the evaluation score is higher than the certain value. Note that among the devices and corresponding structural elements according to the present embodiment, the devices and corresponding structural elements which are the same as Embodiment 1 or 2 will be denoted using the same reference signs as Embodiment 1 or 2, and detailed description of such devices and structural elements will be reduced or omitted.

Figure 12:
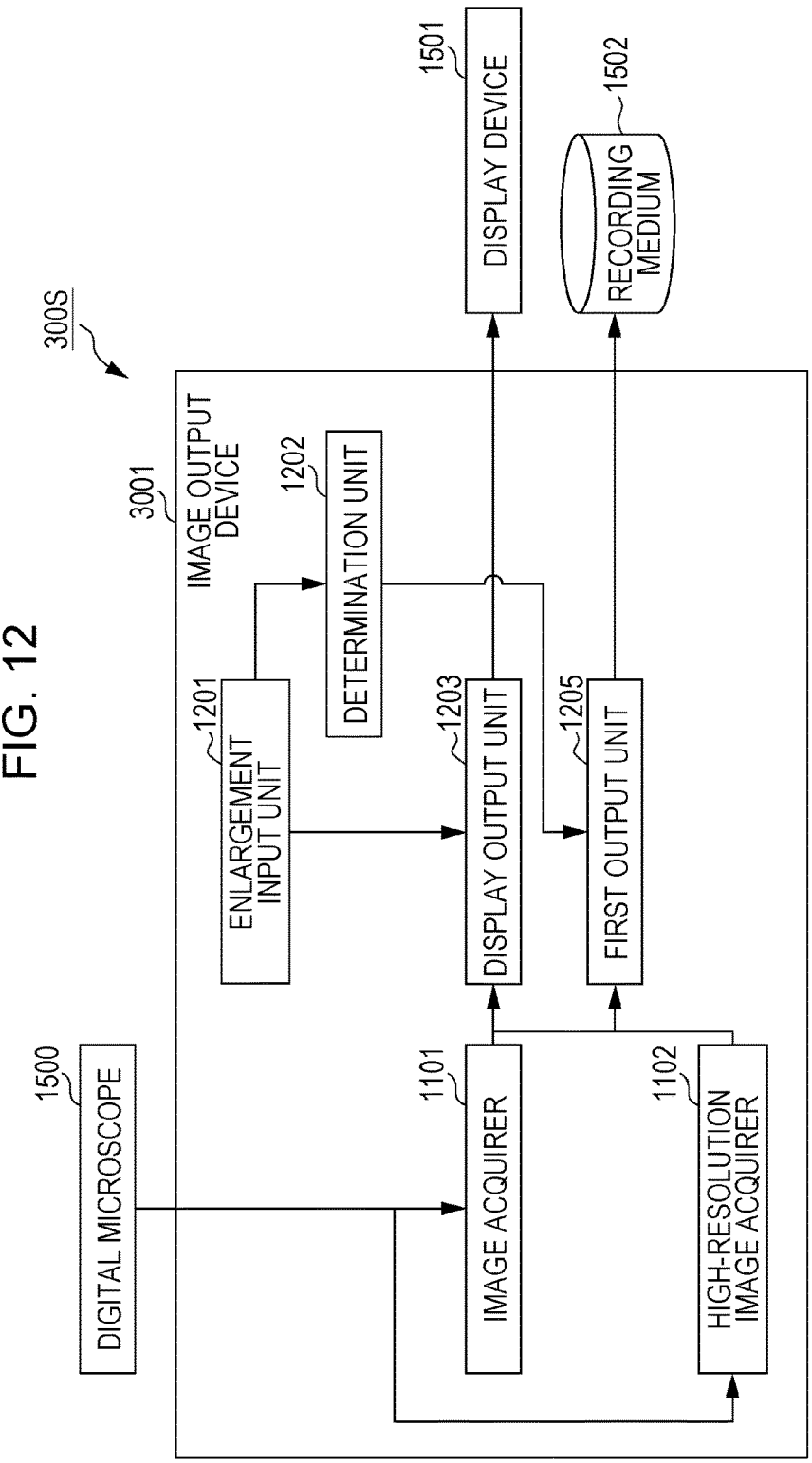
FIG. 12 is a configuration diagram illustrating an example of an image processing system including an image output device according to Embodiment 3.

FIG. 12 is a configuration diagram illustrating an example of an image processing system including an image output device according to Embodiment 3.

The image processing system 300S includes a digital microscope 1500, an image output device 3001, a display device 1501, and a recording medium 1502.

The image output device 3001 is equipped with an image acquirer 1101, a high-resolution image acquirer 1102, an enlargement input unit 1201, a determination unit 1202, a display output unit 1203, and a first output unit 1205. In other words, the image output device 3001 according to the present embodiment is equipped with the first output unit 1205 instead of the transmission unit 1204 from among the structural elements provided in the image output device 1001 according to Embodiment 1. Note that although the image output device 3001 according to the present embodiment is equipped with the display output unit 1203, similarly to Embodiment 1, the display output unit 1203 may also not be provided.

Similarly to the modification of Embodiment 1, the first output unit 1205 outputs and saves the image with the second resolution to the recording medium 1502 in the case of the determination unit 1202 determining that the evaluation score is higher than the certain value. On the other hand, the first output unit 1205 does not output the image with the second resolution to the recording medium 1502 in the case of the determination unit 1202 determining that the evaluation score is not higher than the certain value.

Advantageous Effects

Consequently, in the present embodiment, similarly to the modification of Embodiment 1, a high-resolution image (the image with the second resolution) may be saved automatically for a specimen requiring diagnosis at a high resolution. Also, since a high-resolution image is not saved for a specimen not requiring diagnosis at a high resolution, limitations of free space in the recording medium 1502 may be minimized.

Modification 1

The image output device 3001 according to Embodiment 3 above is configured as a single device, but may also be configured as two devices like in Embodiment 2. An image output device according to the present modification includes an image transmission device and an image reception device, which are interconnected over a communication link.

Figure 13:
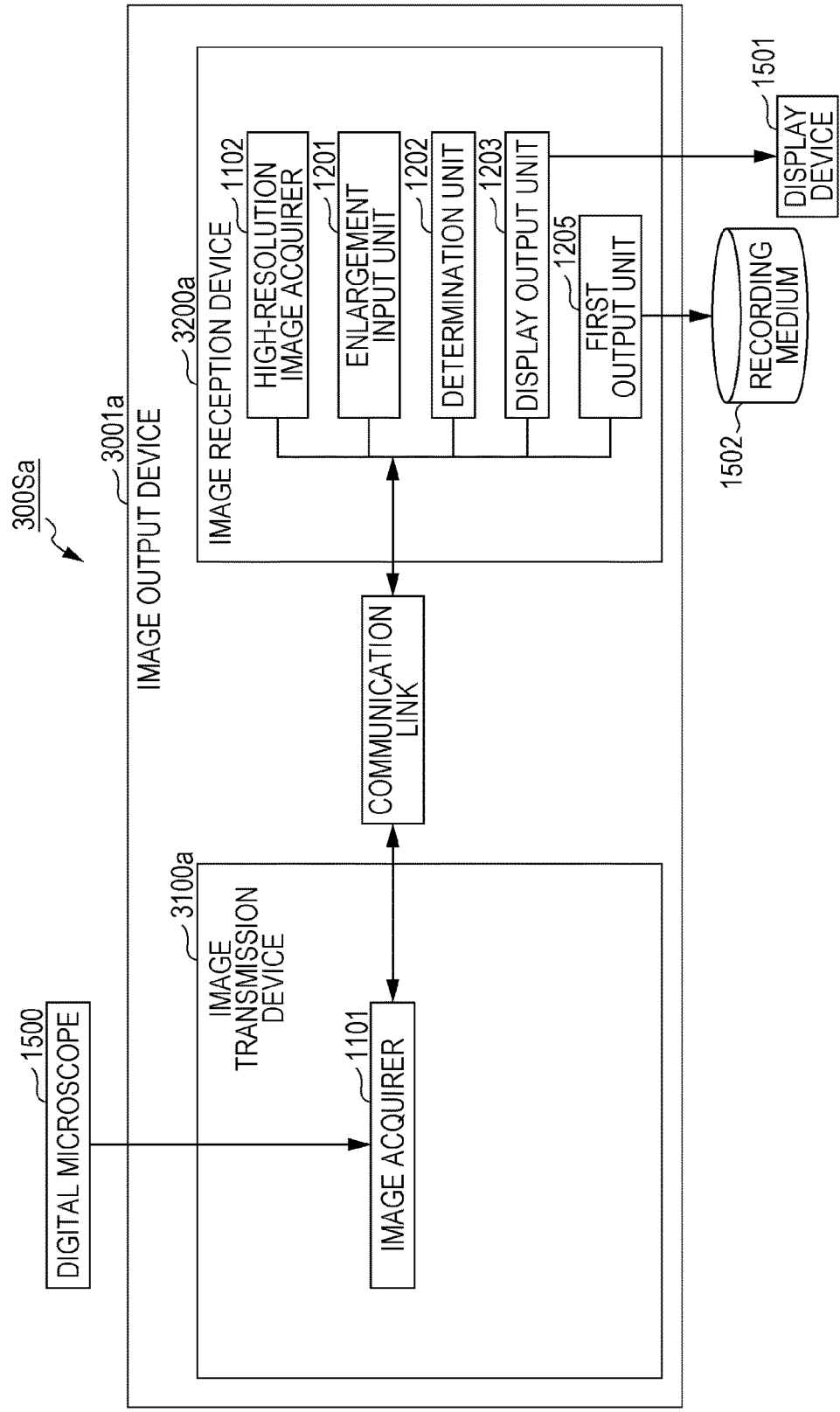
FIG. 13 is a configuration diagram illustrating an example of an image processing system including an image output device according to Modification 1 of Embodiment 3.

FIG. 13 is a configuration diagram illustrating an example of an image processing system including an image output device according to a first modification of Embodiment 3.

The image processing system 300Sa includes a digital microscope 1500, an image output device 3001a, a display device 1501, and a recording medium 1502.

The image output device 3001a is equipped with an image transmission device 3100a and an image reception device 3200a, which are interconnected over a communication link. Note that overall, the image output device 3001a has functions similar to the image output device 3001 of Embodiment 3. In addition, for example, a set including the digital microscope 1500 and the image transmission device 3100a are placed in a facility such as a hospital where a pathologist is not present. A set including the image reception device 3200a, the display device 1501, and the recording medium 1502 is placed in a facility where a pathologist is present, distant from the hospital, for example.

The image transmission device 3100a is equipped with an image acquirer 1101. The image acquirer 1101 acquires images with the first resolution from the digital microscope 1500, and transmits the images with the first resolution to the image reception device 3200a over the communication link.

The image reception device 3200a is equipped with a high-resolution image acquirer 1102, an enlargement input unit 1201, a determination unit 1202, a display output unit 1203, and a first output unit 1205. The high-resolution image acquirer 1102 according to the present modification acquires multiple images with the first resolution from the image transmission device 3100a over the communication link, in response to a request from the first output unit 1205. Subsequently, the high-resolution image acquirer 1102 acquires an image with the second resolution by generating the image with the second resolution based on the images with the first resolution.

In the case of the determination unit 1202 determining that the evaluation score is higher than the certain value, the first output unit 1205 requests the image with the second resolution from the high-resolution image acquirer 1102, and acquires the image with the second resolution from the high-resolution image acquirer 1102. Subsequently, the first output unit 1205 outputs and saves the image with the second resolution to the recording medium 1502. On the other hand, the first output unit 1205 does not output the image with the second resolution to the recording medium 1502 in the case of the determination unit 1202 determining that the evaluation score is not higher than the certain value.

Advantageous Effects

With such an image output device 3001a according to the present modification, advantageous effects similar to Embodiment 3 may be exhibited even if the facility where an image of the subject is acquired and the facility where the image is observed are distant from each other.

Modification 2

In Embodiment 3 and the first modification above, the determination unit 1202 is provided in the image reception device, but the determination unit 1202 may also be provided in the image transmission device. The image transmission device according to a second modification is provided with the determination unit 1202.

Figure 14:
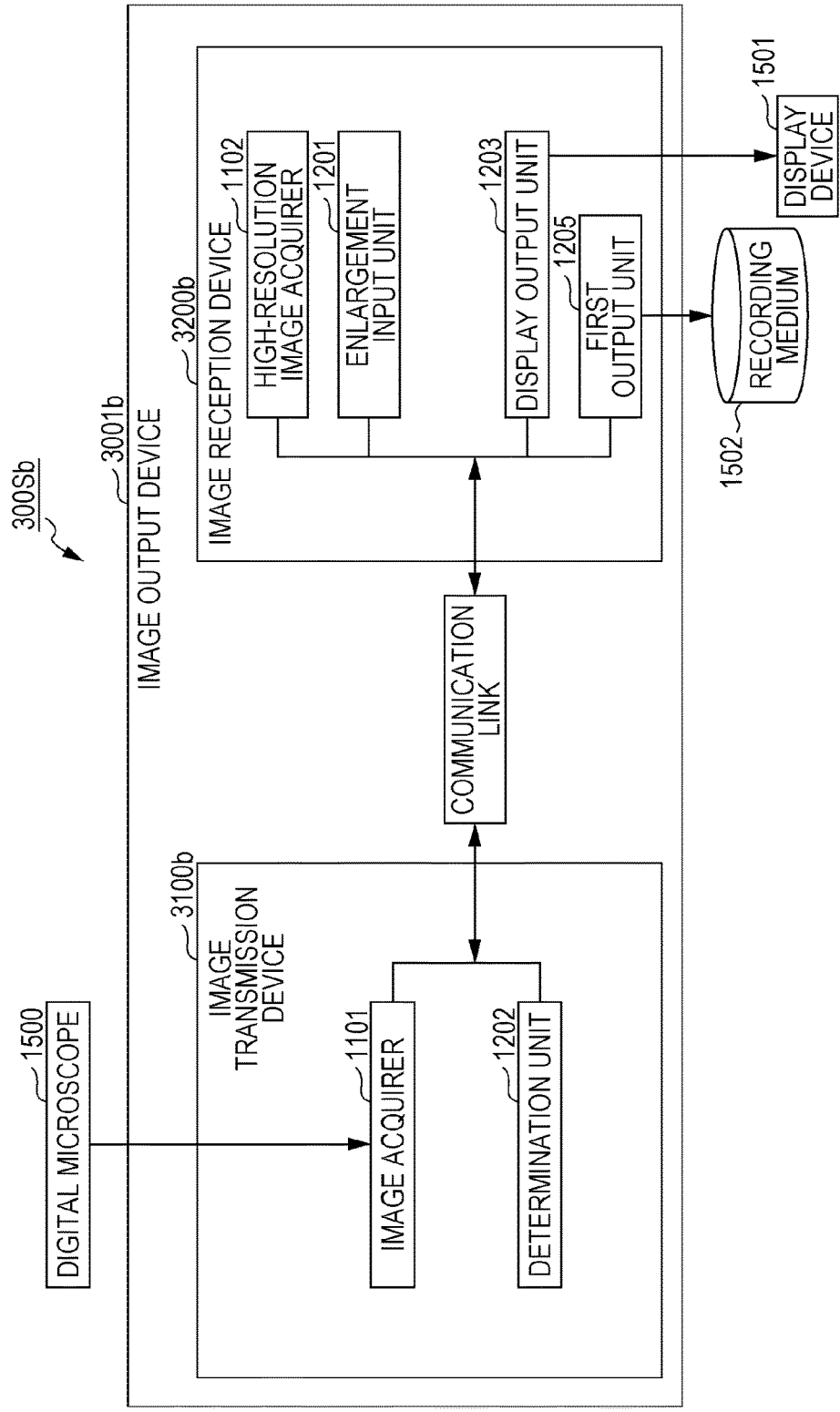
FIG. 14 is a configuration diagram illustrating another example of an image processing system including an image output device according to Modification 2 of Embodiment 3.

FIG. 14 is a configuration diagram illustrating another example of an image processing system including an image output device according to the second modification of Embodiment 3.

The image processing system 300Sb includes a digital microscope 1500, an image output device 3001b, a display device 1501, and a recording medium 1502.

The image output device 3001b is equipped with an image transmission device 3100b and an image reception device 3200b, which are interconnected over a communication link. Note that overall, the image output device 3001b has functions similar to the image output device 3001 of Embodiment 3. In addition, for example, a set including the digital microscope 1500 and the image transmission device 3100b are placed in a facility such as a hospital where a pathologist is not present. A set including the image reception device 3200b, the display device 1501, and the recording medium 1502 is placed in a facility where a pathologist is present, distant from the hospital, for example.

The image transmission device 3100b is equipped with an image acquirer 1101 and a determination unit 1202. The image acquirer 1101 acquires the image with the first resolution from the digital microscope 1500, and transmits the image with the first resolution to the image reception device 3200b over the communication link. The determination unit 1202 acquires the evaluation score-related information discussed earlier, which is transmitted from the image reception device 3200b over the communication link, and derives an evaluation score based on the evaluation score-related information. Subsequently, the determination unit 1202 determines whether or not the evaluation score is higher than the certain value, and informs the image reception device 3200b of the determination result over the communication link.

The image reception device 3200b is equipped with a high-resolution image acquirer 1102, an enlargement input unit 1201, a display output unit 1203, and a first output unit 1205.

The high-resolution image acquirer 1102 acquires multiple images with the first resolution from the image transmission device 3100b over the communication link, in response to a request from the first output unit 1205. Subsequently, the high-resolution image acquirer 1102 acquires an image with the second resolution by generating the image with the second resolution based on the images with the first resolution.

The display output unit 1203 transmits the evaluation score-related information to the image transmission device 3100b over the communication link. Consequently, a determination is made by the determination unit 1202 of the image transmission device 3100b.

If the determination result reported by the image transmission device 3100b is confirmed to be positive, or in other words, if the evaluation score is confirmed to be higher than the certain value, the first output unit 1205 requests the image with the second resolution from the high-resolution image acquirer 1102. Subsequently, the first output unit 1205 acquires the image with the second resolution from the high-resolution image acquirer 1102, and outputs and saves the image with the second resolution to the recording medium 1502. On the other hand, if the determination result reported by the image transmission device 3100b is confirmed to be negative, or in other words, if the evaluation score is confirmed not to be higher than the certain value, the first output unit 1205 does not output the image with the second resolution to the recording medium 1502.

Advantageous Effects

In this way, in the present modification, advantageous effects similar to Embodiment 3 and Modification 1 above may be exhibited, even if the determination unit 1202 is provided in the image transmission device 3100b.

Embodiment 4

The digital microscope 1500 according to the foregoing embodiments and their modifications will now be described in detail. Note that hereinafter, the digital microscope 1500 will be referred to as the image acquisition device (digitizer).

Basic Principle of High-Resolution Image Formation

In this disclosure, multiple images obtained by executing image capture multiple times while changing the light source direction of illuminating light are used to form an image with a higher resolution (resolving power) than each of the multiple images (such an image is hereinafter designated a "high-resolution image" or a "high resolving power image"). Note that the high-resolution images corresponds to the image with the second resolution discussed earlier, while each of the multiple images (sub-images) used to form the high-resolution image corresponds to the image with the first resolution discussed earlier. First, FIGS. 15A to 20 will be referenced to describe the basic principle of high-resolution image formation. The description herein takes the example of a charge-coupled device (CCD) image sensor. Note that in the following description, structural elements having substantially the same functions will be denoted by shared reference signs, and the description of such structural elements may be reduced or omitted.

Figure 15A:
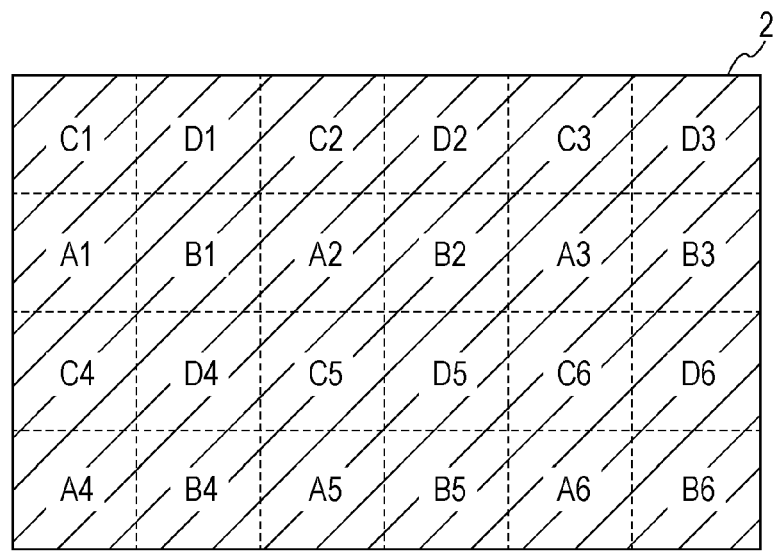
FIG. 15A is a plan view schematically illustrating part of a subject.
Figure 15B:
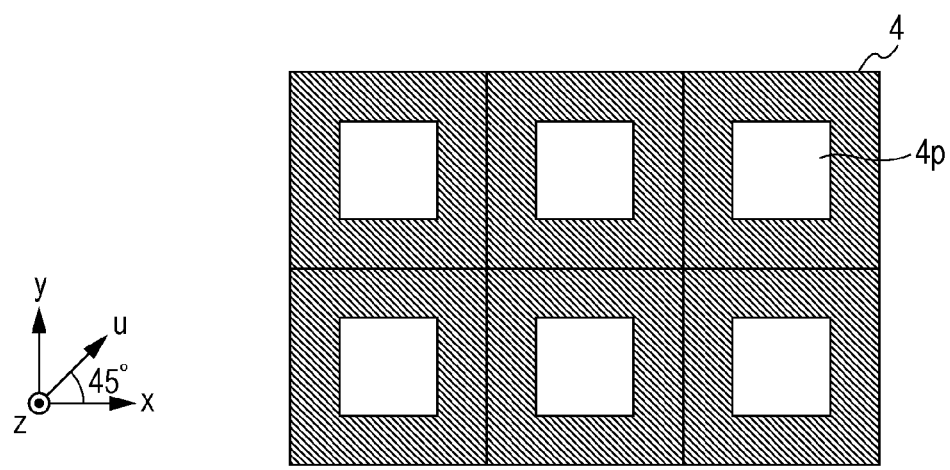
FIG. 15B is a plan view schematically illustrating an extraction of the photodiodes involved in the imaging of the region illustrated in FIG. 15A.

Refer to FIGS. 15A and 15B. FIG. 15A is a plan view schematically illustrating part of a subject. The subject 2 illustrated in FIG. 15A is a thin slice of biological tissue (typically having a thickness of a few dozen micrometers or less). When acquiring an image of the subject 2, the subject 2 is placed in close proximity to the imaging face of the image sensor. The distance from the imaging face of the image sensor to the subject 2 typically is 1 mm or less, and may be set to approximately 1 μm, for example.

FIG. 15B is a plan view schematically illustrating an extraction of the photodiodes involved in the imaging of the region illustrated in FIG. 15A from among the photodiodes of the image sensor. In the example described herein, six photodiodes are illustrated from among the photodiodes 4p constituting an image sensor 4. Note that for reference, FIG. 15B illustrates arrows indicating mutually orthogonal x, y, and z directions. The z direction indicates the normal direction of the imaging face. FIG. 15B also illustrated an arrow indicating a u direction, which is a direction rotated 45° from the x axis towards the y axis on the xy plane. Other diagrams likewise may illustrate arrows indicating the x, y, z, and u directions.

Structural elements other than the photodiodes 4p in the image sensor 4 are covered by a light shield layer. In FIG. 15B, the hatched region indicates the region covered by the light shield layer. The surface area (S2) of the photosensitive face of one photodiode on the imaging face of the CCD image sensor is smaller than the surface area (S1) of a unit region including that photodiode. The ratio of the photosensitive area S2 versus the pixel area S1 (S2/S1) is called the aperture ratio. In the description herein, the aperture ratio is taken to be 25%.

Figure 16A:
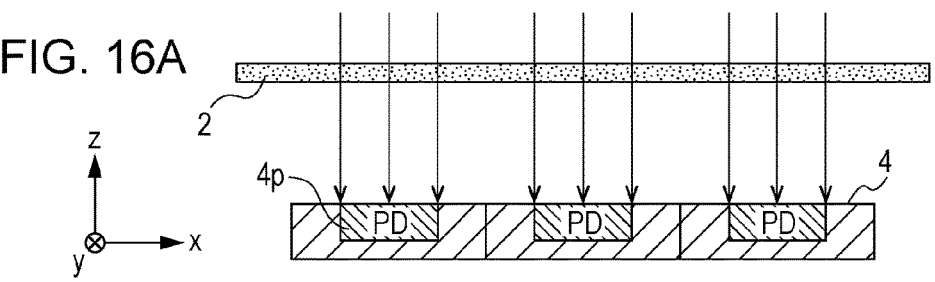
FIG. 16A is a cross-section view schematically illustrating the direction of light rays passing through a subject and incident on photodiodes.
Figure 16B:
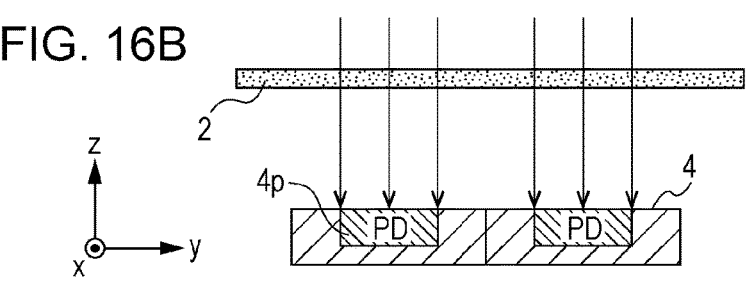
FIG. 16B is a cross-section view schematically illustrating the direction of light rays passing through a subject and incident on photodiodes.

FIGS. 16A and 16B schematically illustrate the direction of light rays passing through the subject 2 and incident on the photodiodes 4p. FIGS. 16A and 16B illustrate a state in which light rays are incident from a direction perpendicular to the imaging face. As illustrated schematically in FIGS. 16A and 16B, in this case, a lens for image formation is not disposed between the subject 2 and the image sensor 4, and thus an image of the subject 2 is acquired using substantially parallel light rays that pass through the subject 2.

Figure 16C:
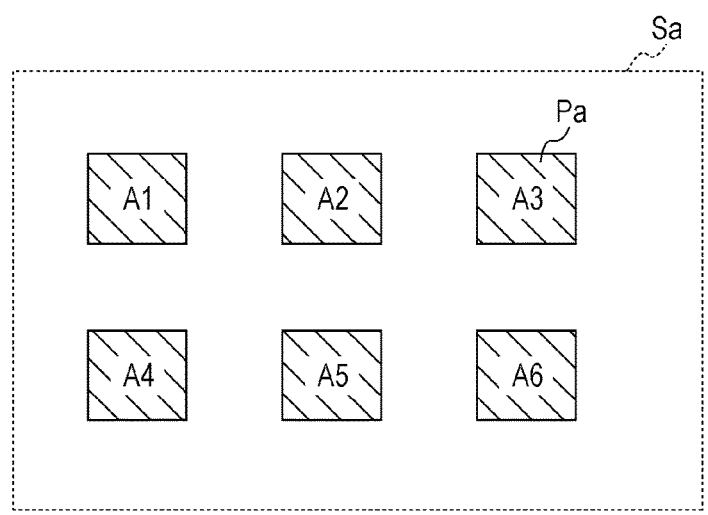
FIG. 16C is a diagram schematically illustrating six pixels acquired by six photodiodes.

FIG. 16C schematically illustrates an image Sa (first sub-image Sa) acquired under the light source direction illustrated in FIGS. 16A and 16B. As illustrated in FIG. 16C, the first sub-image Sa is made up of six pixels Pa acquired by six photodiodes 4p. Each of the pixels Pa has a value (pixel value) indicating a quantity of light incident on an individual photodiode 4p.

As illustrated in FIGS. 16A and 16B, when light is shined onto the subject 2 from a direction perpendicular to the imaging face, light passing through the region positioned directly above the photodiodes 4p from among the entirety of the subject 2 is incident on the photodiodes 4p. In this example, the first sub-image Sa includes information about the regions A1, A2, A3, A4, A5, and A6 (see FIG. 15A) from among the entirety of the subject 2. Note that light passing through regions not positioned directly above the photodiodes 4p is not incident on the photodiodes 4p. Consequently, in the first sub-image Sa, information about regions other than the regions A1, A2, A3, A4, A5, and A6 from among the entirety of the subject 2 is lacking.

Figure 17A:
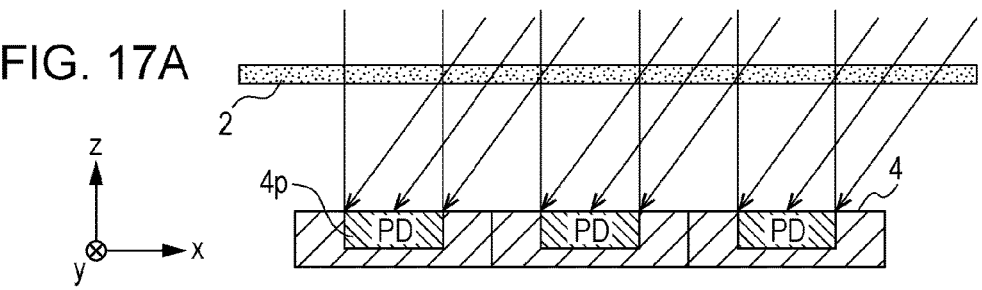
FIG. 17A is a cross-section view schematically illustrating how light rays are incident from a light source direction different from the light source direction illustrated in FIGS. 16A and 16B.
Figure 17B:
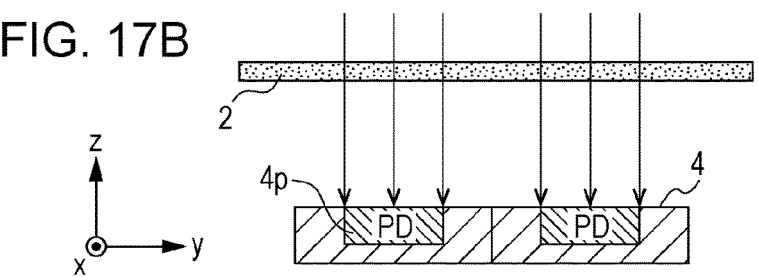
FIG. 17B is a cross-section view schematically illustrating how light rays are incident from a light source direction different from the light source direction illustrated in FIGS. 16A and 16B.

FIGS. 17A and 17B illustrate a state in which light rays are incident from a light source direction different from the light source direction illustrated in FIGS. 16A and 16B. The light rays illustrated in FIGS. 17A and 17B are tilted towards the x direction with respect to the z direction. In this case, light passing through regions different from the regions positioned directly above the photodiodes 4p from among the entirety of the subject 2 is incident on the photodiodes 4p.

Figure 17C:
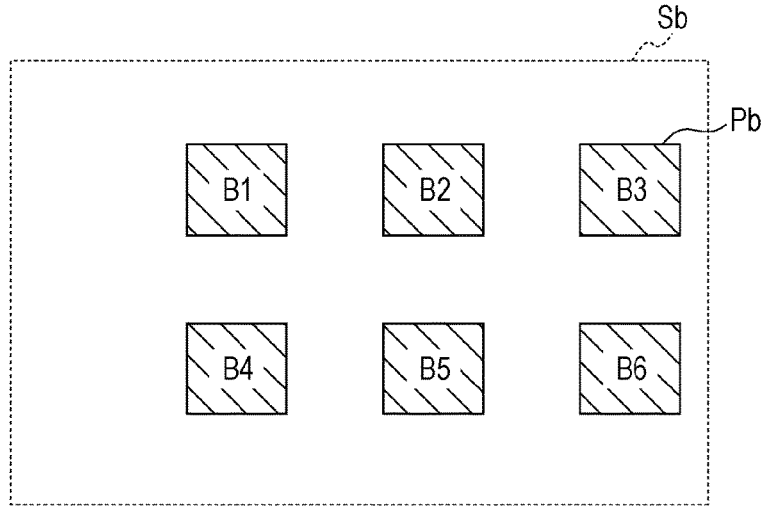
FIG. 17C is a diagram schematically illustrating six pixels acquired under the light source direction illustrated in FIGS. 17A and 17B.

FIG. 17C schematically illustrates an image Sb (second sub-image Sb) acquired under the light source direction illustrated in FIGS. 17A and 17B. As illustrated in FIG. 17C, the second sub-image Sb likewise is made up of six pixels acquired by six photodiodes 4p. However, the pixels Pb constituting the second sub-image Sb has pixel values corresponding to the regions B1, B2, B3, B4, B5, and B6 which are different from the regions A1, A2, A3, A4, A5, and A6 (see FIG. 15A) from among the entirety of the subject 2. In other words, the second sub-image Sb does not include information about the regions A1, A2, A3, A4, A5, and A6 from among the entirety of the subject 2, but instead includes information about the regions B1, B2, B3, B4, B5, and B6. Herein, the region B1, for example, is the region adjacent to the right of the region A1 in the subject 2 (see FIG. 15A).

As a comparison of FIGS. 16A and 16B to FIGS. 17A and 17B demonstrates, by appropriately changing the light source direction, it is possible to make light rays passing through different regions of the subject 2 incident on the photodiodes 4p. As a result, the first sub-image Sa and the second sub-image Sb may include pixel information corresponding to different positions in the subject 2.

Figure 18A:
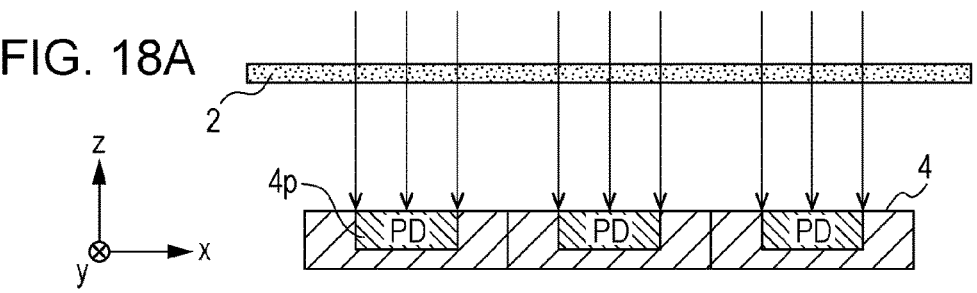
FIG. 18A is a cross-section view schematically illustrating how light rays are incident from a light source direction different from the light source direction illustrated in FIGS. 16A and 16B and the light source direction illustrated in FIGS. 17A and 17B.
Figure 18B:
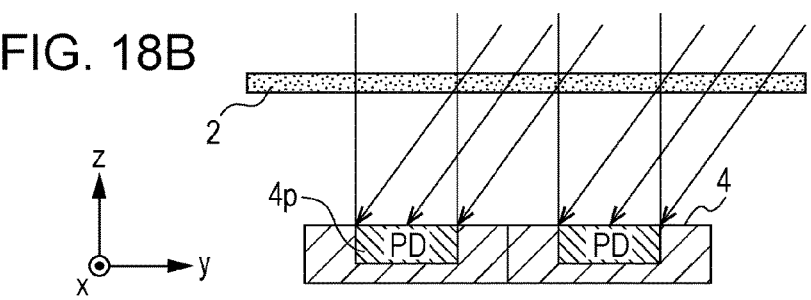
FIG. 18B is a cross-section view schematically illustrating how light rays are incident from a light source direction different from the light source direction illustrated in FIGS. 16A and 16B and the light source direction illustrated in FIGS. 17A and 17B.

FIGS. 18A and 18B illustrate how light rays are incident from a light source direction different from the light source direction illustrated in FIGS. 16A and 16B and the light source direction illustrated in FIGS. 17A and 17B. The light rays illustrated in FIGS. 18A and 18B are tilted towards the y direction with respect to the z direction.

Figure 18C:
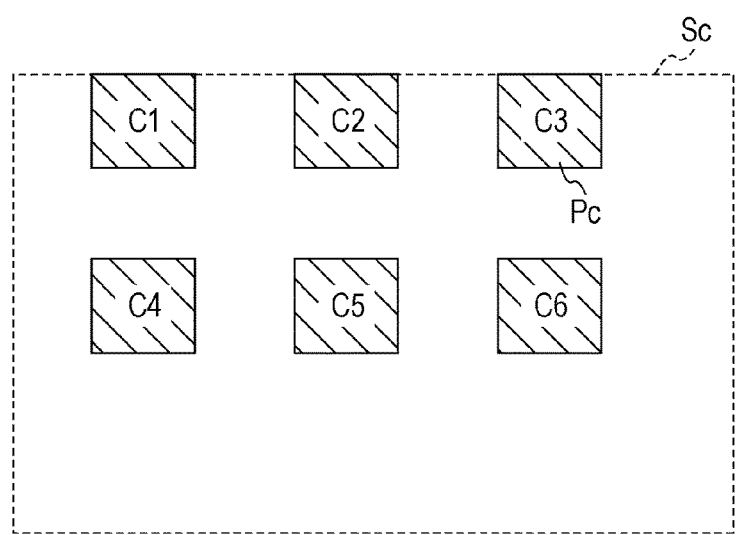
FIG. 18C is a diagram schematically illustrating six pixels acquired under the light source direction illustrated in FIGS. 18A and 18B.

FIG. 18C schematically illustrates an image Sc (third sub-image Sc) acquired under the light source direction illustrated in FIGS. 18A and 18B. As illustrated in FIG. 18C, the third sub-image Sc is made up of six pixels Pc acquired by six photodiodes 4p. As illustrated in the drawing, the third sub-image Sc includes information about the regions C1, C2, C3, C4, C5, and C6 illustrated in FIG. 15A from among the entirety of the subject 2. Herein, the region C1, for example, is the region adjacent above the region A1 in the subject 2 (see FIG. 15A).

Figure 19A:
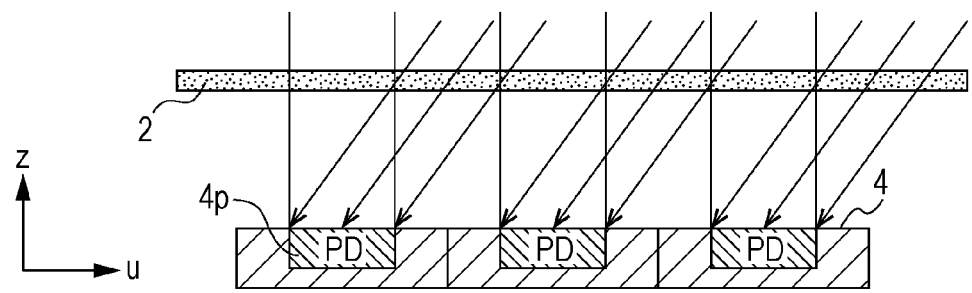
FIG. 19A is a cross-section view schematically illustrating how light rays are incident from a light source direction different from the light source direction illustrated in FIGS. 16A and 16B, the light source direction illustrated in FIGS. 17A and 17B, and the light source direction illustrated in FIGS. 18A and 18B.

FIG. 19A illustrates a state in which light rays are incident from a light source direction different from the light source direction illustrated in FIGS. 16A and 16B, the light source direction illustrated in FIGS. 17A and 17B, and the light source direction illustrated in FIGS. 18A and 18B. The light rays illustrated in FIG. 19A are tilted in a direction with respect to the z direction so as to obtain a 45° angle with the x axis on the xy plane.

Figure 19B:
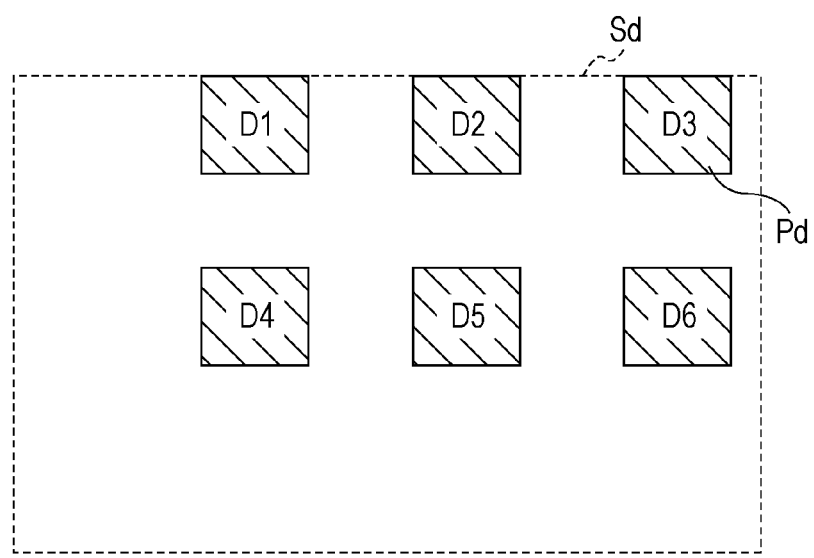
FIG. 19B is a diagram schematically illustrating six pixels acquired under the light source direction illustrated in FIG. 19A.

FIG. 19B schematically illustrates an image Sd (fourth sub-image Sd) acquired under the light source direction illustrated in FIG. 19A. As illustrated in FIG. 19B, the fourth sub-image Sd is made up of six pixels Pd acquired by six photodiodes 4p. The fourth sub-image Sd includes information about the regions D1, D2, D3, D4, D5, and D6 illustrated in FIG. 15A from among the entirety of the subject 2. Herein, the region D1, for example, is the region adjacent to the right of the region C1 (see FIG. 15A). In this way, each of the sub-images Sa, Sb, Sc, and Sd includes an image made up of a different portion of the subject 2.

Figure 20:
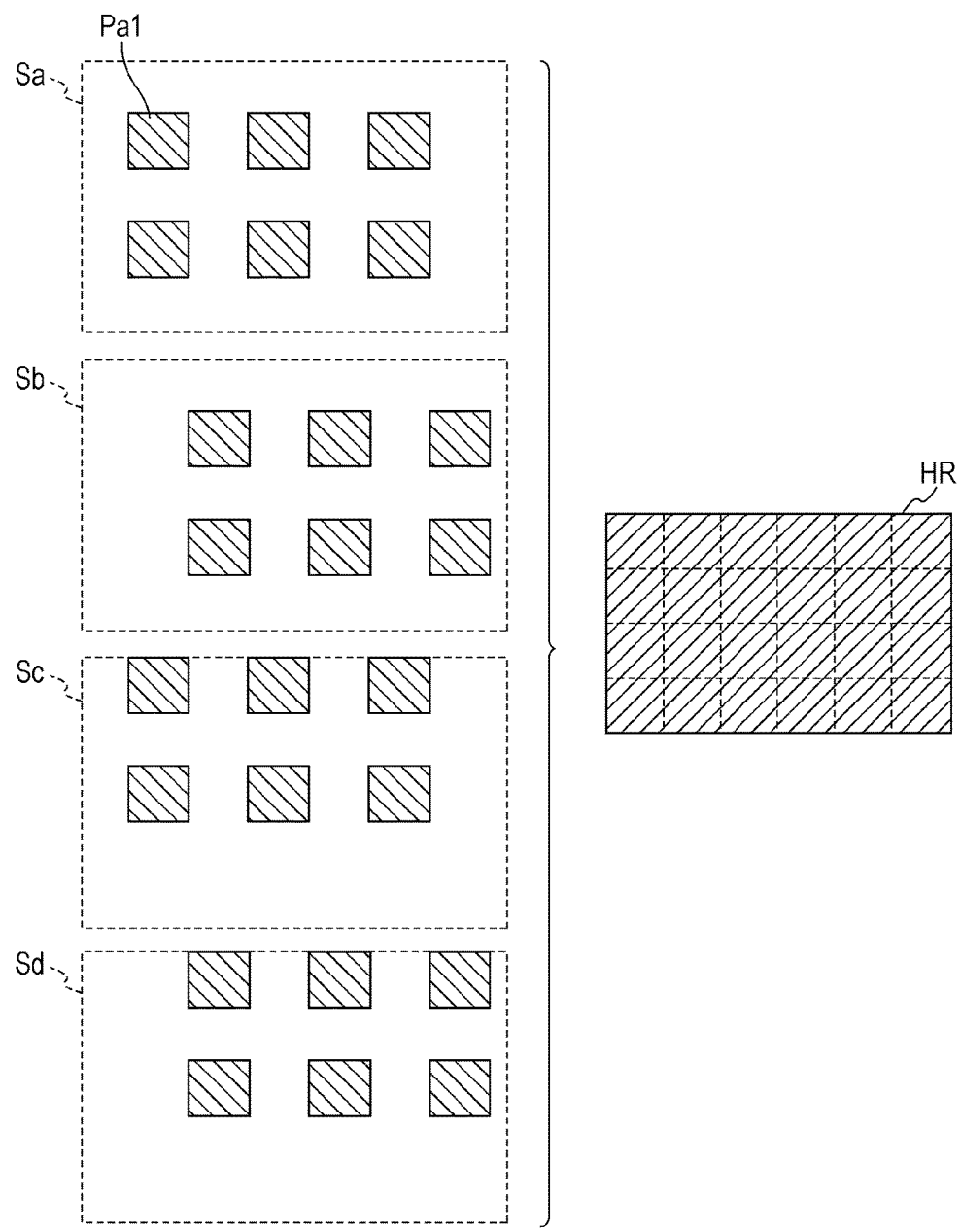
FIG. 20 is a diagram illustrating a high resolving power image composited from four sub-images.

FIG. 20 illustrates a high-resolution image HR composited from the four sub-images Sa, Sb, Sc, and Sd. As illustrated in FIG. 20, the pixel count and pixel density of the high-resolution image HR is four times (4×) the pixel count and the pixel density of each of the four sub-images Sa, Sb, Sc, and Sd.

For example, take the block made up of the regions A1, B1, C1, and D1 of the subject 2 illustrated in FIG. 15A. As the above description demonstrates, the pixel Pa1 of the sub-image Sa illustrated in FIG. 20 includes information about the region A1 only, and not the entirety of the block discussed above. Consequently, the sub-image Sa may be said to be an image that lacks information about the regions B1, C1, and D1.

However, by using the sub-images Sb, Sc, and Sd which include pixel information corresponding to different positions in the subject 2, as illustrated in FIG. 20, it is possible to complement the information lacking in the sub-image Sa, and form a high-resolution image HR that includes information about the entire block. Whereas the resolution of the individual sub-images is equal to the native resolution of the image sensor 4, in this example, a resolution that is four times (4×) the native resolution of the image sensor 4 is obtained. The degree of resolution increase (super-resolution) depends on the aperture ratio of the image sensor. In this example, since the aperture ratio of the image sensor 4 is 25%, a resolution increase up to a maximum of four times (4×) is achieved by shining light from four different directions. Provided that N is an integer equal to or greater than 2, and the aperture ratio of the image sensor 4 is approximately equal to 1/N, a resolution increase up to a maximum of N times (N×) is possible.

In this way, by imaging a subject while successively shining parallel light from multiple different light source directions with respect to the subject, the pixel information that is "spatially" sampled from the subject may be increased. By compositing the multiple obtained sub-images, it is possible to form a high-resolution image with a higher resolution than each of the multiple sub-images. Obviously, the light source directions are not limited to the light source directions described with reference to FIGS. 16A to 19B.

Figure 21:
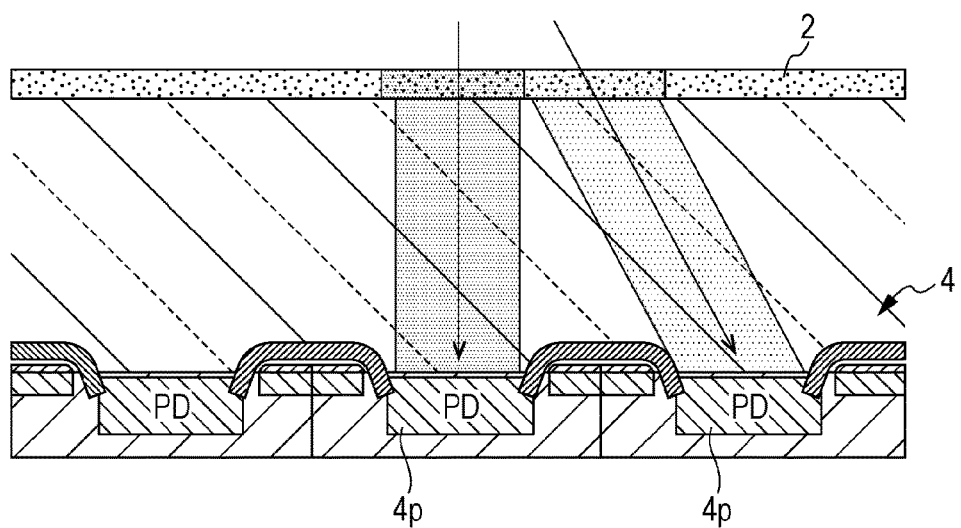
FIG. 21 is a cross-section view schematically illustrating light source directions adjusted so that light rays passing through two adjacent regions of a subject are incident on respectively different photodiodes.

Note that in the above example, the sub-images Sa, Sb, Sc, and Sd illustrated in FIG. 20 include pixel information about mutually different regions in the subject 2, and do not overlap. However, different sub-images may also overlap each other. Also, in the above example, light rays passing through two adjacent regions in the subject 2 are both incident on the same photodiode. However, the configuration of the light source directions is not limited to this example. For example, as illustrated in FIG. 21, the light source direction may also be adjusted so that light rays passing through two adjacent regions of the subject 2 are respectively incident on different photodiodes.

Module

In the formation of a high-resolution image based on the basic principle described with reference to FIGS. 15A to 20, sub-image acquisition is executed in a state in which the subject 2 is placed in close proximity to the imaging face of the image sensor 4. In an embodiment of the present disclosure, sub-image acquisition is conducted using a module having a structure in which the subject 2 and the image sensor 4 are integrated. Hereinafter, an example of a module configuration and an example of a module fabrication method will be described with reference to the drawings.

Figure 22A:
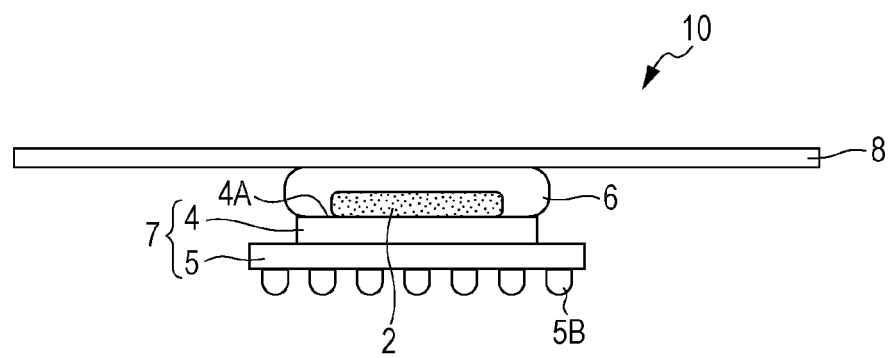
FIG. 22A is a diagram schematically illustrating an example of a cross-sectional structure of a module.

FIG. 22A schematically illustrates an example of a cross-sectional structure of a module. In the module 10 illustrated in FIG. 22A, a subject 2 covered by an encapsulant 6 is placed on top of the imaging face 4A of an image sensor 4. In the illustrated example, a transparent plate (typically a glass plate) 8 is placed on top of the subject 2. In other words, with the configuration illustrated as an example in FIG. 22A, the subject 2 is sandwiched between the image sensor 4 and the transparent plate 8. The inclusion of the transparent plate 8 in the module 10 improves workability, and thus is beneficial. For the transparent plate 8, an ordinary microscope slide may be used, for example. Note that in the drawing, respective elements are represented schematically, and thus the actual size and shape of each element does not necessarily match the apparent size and shape depicted in the drawing. This applies similarly to the other drawings referenced hereinafter.

Figure 22B:
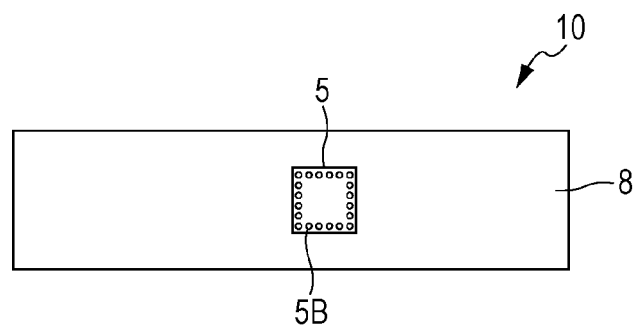
FIG. 22B is a plan view illustrating an example of an exterior appearance of the module illustrated in FIG. 22A as viewed from the image sensor side.

In the configuration illustrated as an example in FIG. 22A, the image sensor 4 is affixed to a package 5. FIG. 22B illustrates an example of an exterior appearance of the module 10 illustrated in FIG. 22A as viewed from the image sensor 4 side. As illustrated in FIGS. 22A and 22B, the package 5 includes rear-face electrodes 5B on the face on the opposite side from the transparent plate 8. The rear-face electrodes 5B are electrically connected to the image sensor 4 via an interconnect pattern (not illustrated) formed in the package 5. In other words, the output of the image sensor 4 may be retrieved through the rear-face electrodes 5B. In this specification, the integrated structure of the package and the image sensor is called the "imaging element".

An example of a method of fabricating the module 10 will be described with reference to FIG. 23. Herein, a thin slice of biological tissue (tissue section) is illustrated as an example of the subject 2. A module 10 including a thin slice of biological tissue as the subject 2 may be used for pathological diagnosis.

Figure 23:
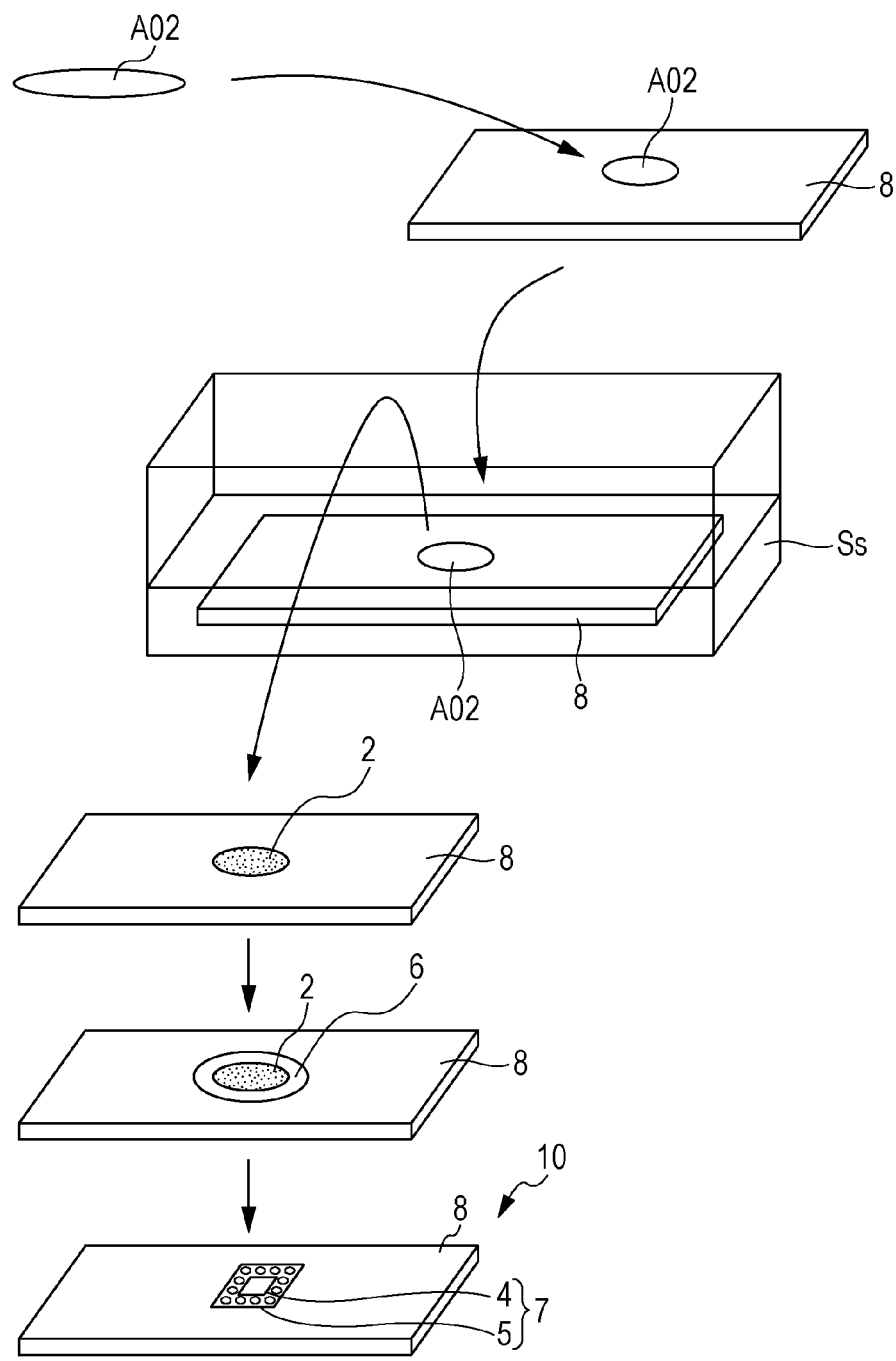
FIG. 23 is a diagram for explaining an example of a module fabrication method.

First, as illustrated in FIG. 23, the tissue section A02 is placed on the transparent plate 8. The transparent plate 8 may be a microscope slide used for sample observation with an optical microscope. Hereinafter, the use of a microscope slide as the transparent plate 8 will be illustrated as an example. Next, the entire transparent plate 8 with the tissue section A02 placed thereupon is immersed in a dye solution to stain the tissue section A02. Next, by applying an encapsulant 6 on top of the transparent plate 8, the subject 2 obtained by staining the tissue section A02 is covered by the encapsulant 6. The encapsulant 6 has a function of protecting the subject 2. Next, the imaging element 7 is placed on top of the subject 2 so that the imaging face of the image sensor 4 faces opposite the subject 2. In this way, the module 10 is obtained.

The module 10 is fabricated for each target of observation. For example, in the scenario of pathological diagnosis, multiple (for example, 5 to 20) tissue sections are prepared from one specimen. For this reason, multiple modules 10 including tissue sections obtained from the same specimen as the subject 2 may be fabricated. If multiple sub-images are acquired for each of these multiple modules 10, it is possible to form a high-resolution image corresponding to each of the multiple modules 10.

As illustrated in FIG. 22A, the module 10 is equipped with the image sensor 4 that acquires images of the subject 2, unlike a prepared sample used for observation with an optical microscope. Such a module may also be called an "electronic prepared sample". By using the module 10 having a structure in which the subject 2 and the imaging element 7 are integrated as illustrated in FIG. 22A, an advantage of being able to secure the positioning of the subject 2 and the image sensor 4 is obtained.

Figure 24A:
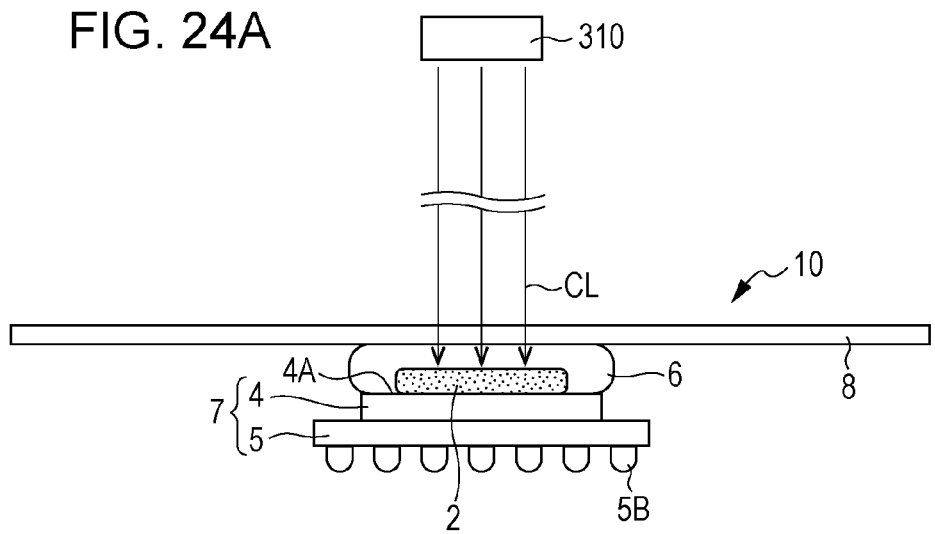
FIG. 24A is a cross-section view illustrating an example of a light source angle when acquiring a sub-image.
Figure 24B:
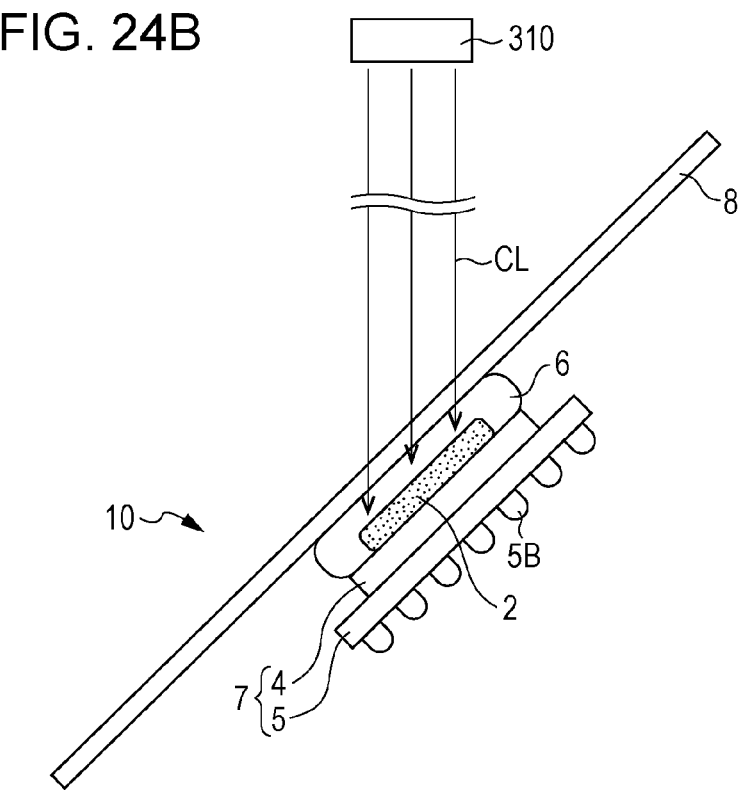
FIG. 24B is a cross-section view illustrating an example of a method of shining light on a subject at a different light source angle from the light source angle illustrated in FIG. 24A.

When acquiring images of the subject 2 using the module 10, illuminating light is shined onto the subject 2 through the transparent plate 8. The illuminating light passing through the subject 2 is incident on the image sensor 4. Consequently, an image of the subject 2 is obtained. By successively executing imaging while changing the relative positioning of the light source and the subject, multiple different images illuminated by light shining at different angles may be acquired. For example, as illustrated in FIG. 24A, a light source 310 is positioned directly above the image sensor 4. Additionally, if imaging is conducted in a state of shining collimated light CL onto the subject 2 from the normal direction of the imaging face 4A of the image sensor 4, a sub-image similar to the sub-image Sa illustrated in FIG. 16C is obtained. Also, as illustrated in FIG. 24B, if imaging is conducted while shining collimated light CL onto the subject 2 with the module 10 in a tilted state, a sub-image similar to the sub-image Sb illustrated in FIG. 17C (or the sub-image Sc illustrated in FIG. 18C) is obtained. In this way, by successively executing imaging while varying the orientation of the module 10 with respect to the light source, the basic principle described with reference to FIGS. 15A to 20 may be applied to obtain a high-resolution image.

Image Acquisition Device

Figure 25:
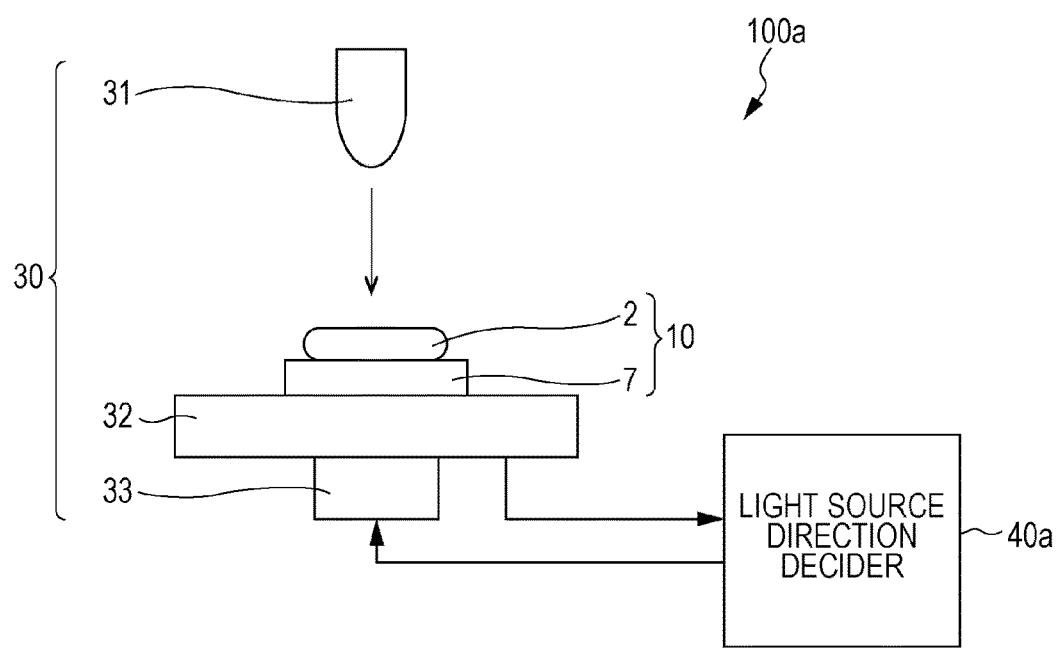
FIG. 25 is a schematic diagram illustrating an example of a configuration of an image acquisition device according to an exemplary embodiment of the present disclosure.

FIG. 25 schematically illustrates an example of a configuration of an image acquisition device according to an embodiment of the present disclosure.

The image acquisition device 100a illustrated in FIG. 25 includes a lighting system 30. In the configuration illustrated as an example in FIG. 25, the lighting system 30 includes a light source 31 that generates illuminating light, a stage 32 configured to allow removable loading of the module 10, and a stage driving mechanism 33 configured to enable variation in the orientation of the stage 32. FIG. 25 schematically illustrates a state in which the module 10 has been loaded onto the stage 32. However, the encapsulant 6 and the transparent plate 8 of the module 10 are omitted from illustration. The module 10 is not a required structural element of the image acquisition device 100a.

The module 10, when connected to the stage 32, is positioned so that illuminating light passing through the subject 2 is incident on the imaging element 7. The lighting system 30 varies the orientation of the stage 32, for example, and thereby varies the light source direction from the perspective of the subject 2. Varying the "orientation" in this specification broadly encompasses actions such as varying the tilt with respect to a reference plane, varying the angle of rotation with respect to a reference bearing, and varying the position with respect to a reference point. Illuminating light generated by the light source 31 is successively shined onto the subject 2 from multiple different light source directions from the perspective of the subject 2. An example of a detailed configuration and operation of the lighting system 30 will be discussed later. By shining light onto the subject 2 while changing the light source direction, the imaging element 7 acquires multiple different images (sub-images) according to the multiple different light source directions. The multiple obtained images may then be used to form a high-resolution image.

The image acquisition device 100a illustrated in FIG. 25 includes a light source direction decider 40a. The light source direction decider 40a decides the multiple different light source directions to use while the imaging element 7 acquires multiple sub-images. In an embodiment of the present disclosure, sub-image acquisition is executed based on the multiple different light source directions decided by the light source direction decider. In other words, the sub-images according to an embodiment of the present disclosure are multiple different images corresponding to multiple different light source directions decided by the light source direction decider. A specific example of the configuration and operation of the light source direction decider 40a will be discussed later.

Next, an example of a method of changing the light source direction of illuminating light from the perspective of the subject will be described with reference to FIGS. 26A to 27B.

Figure 26A:
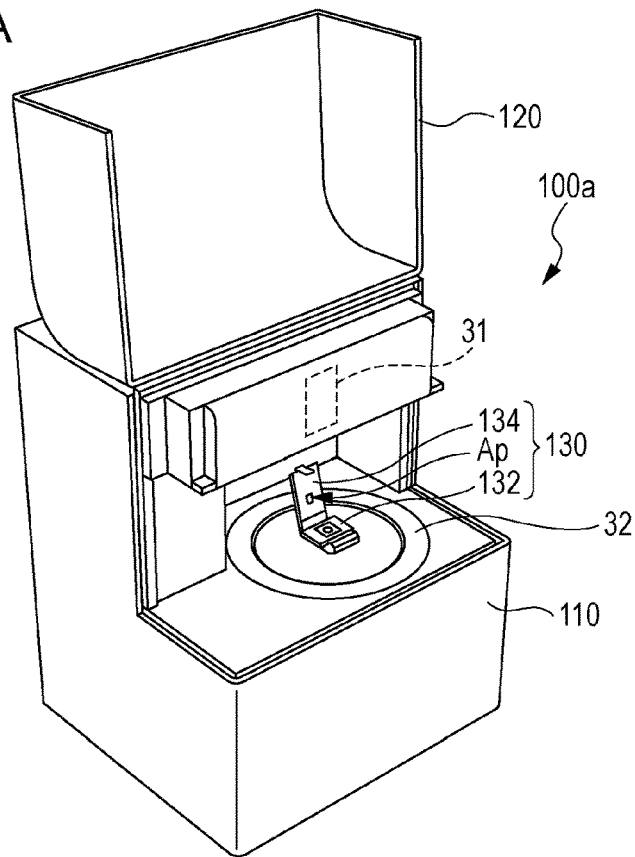
FIG. 26A is a perspective view illustrating an exemplary exterior appearance of an image acquisition device.
Figure 26B:
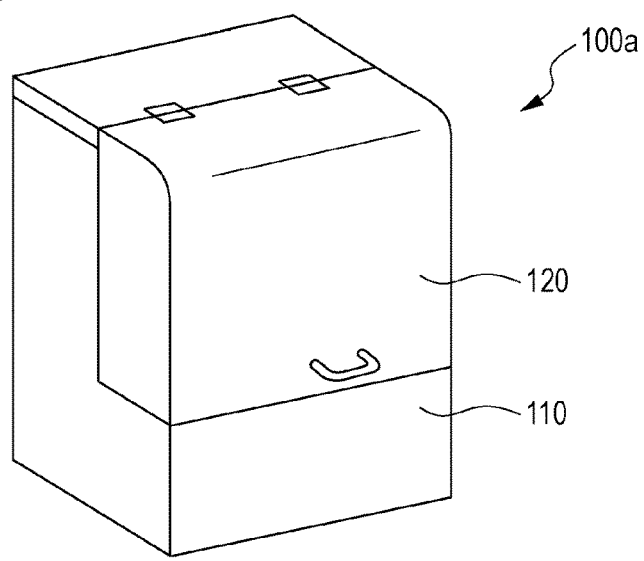
FIG. 26B is a perspective view illustrating a closed state of a cover unit on the image acquisition device illustrated in FIG. 26A.

FIGS. 26A and 26B illustrate an exemplary exterior appearance of the image acquisition device 100a. In the configuration illustrated as an example in FIG. 26A, the image acquisition device 100a includes a main unit 110 including a light source 31 and a stage 32, and a cover unit 120 that is openably and closably joined to the main unit 110. By closing the cover unit 120, a darkroom may be formed inside the image acquisition device 100a (see FIG. 26B).

In the example illustrated in the drawing, a socket 130 for holding the module 10 is connected to the stage 32. The socket 130 may be affixed to the stage 32 or removably attachable to the stage 32. Herein, a configuration in which the socket 130 is removably attachable to the stage 32 is illustrated as an example. The socket 130 includes a lower member 132 to which the module 10 may be removably attached, and an upper member 134 having an aperture Ap formed therein, for example. In the configuration illustrated as an example in FIG. 26A, the socket 130 holds the module 10 by sandwiching the module 10 between the lower member 132 and the upper member 134.

The lower member 132 may include an electrical connector including electrical contacts for make an electrical connection with the imaging element 7 of the module 10. During acquisition, the module 10 is placed on the lower member 132 so that the imaging face of the imaging element 7 faces opposite the light source 31. At this point, due to the contact between the electrical contacts of the electrical connector and the rear-face electrodes 5B of the imaging element 7 (see FIGS. 22A and 22B), the imaging element 7 of the module 10 and the electrical connector of the lower member 132 are electrically connected.

Figure 26C:
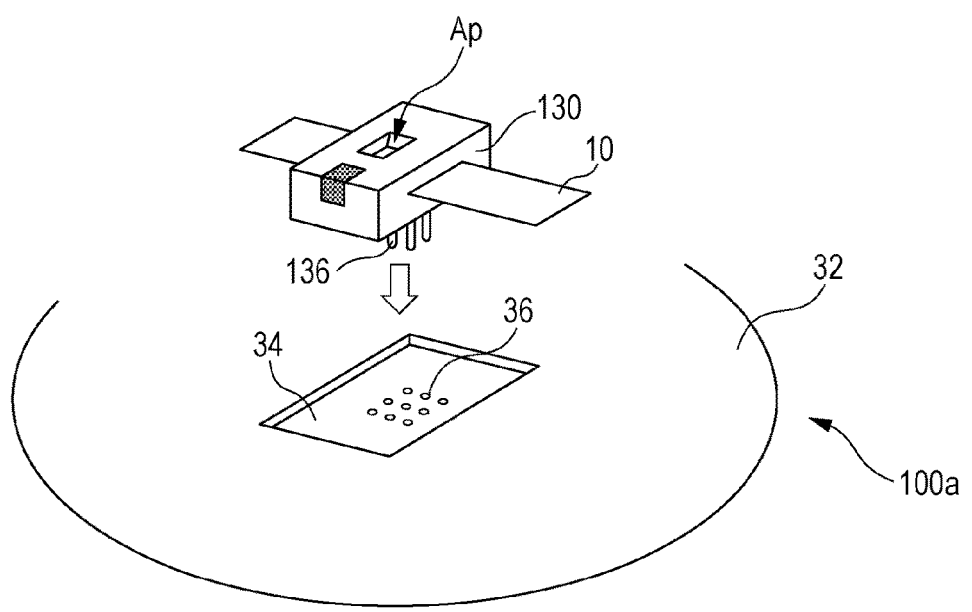
FIG. 26C is a diagram schematically illustrating an example of a method of loading a socket onto a stage of the image acquisition device.

FIG. 26C illustrates an example of a method of loading the socket 130 onto the stage 32 of the image acquisition device 100a. In the configuration illustrated as an example in FIG. 26C, the socket 130 includes electrodes 136 that protrude from the bottom face. The electrodes 136 may be part of the electrical connector of the lower member 132. Also, in the example illustrated in FIG. 26C, the stage 32 of the image acquisition device 100a includes a mount 34 provided with jacks 36. As illustrated in FIG. 26C, the socket 130, which is in a state of holding the module 10, for example, is loaded onto the stage 32 so that the electrodes 136 of the socket 130 are inserted into the jacks 36. As a result, an electrical connection is established between the imaging element 7 of the module 10 held by the socket 130, and the image acquisition device 100a. The stage 32 may include a circuit that receives the output of the image sensor 4 when the socket 130 holding the module 10 is loaded. In an embodiment of the present disclosure, the image acquisition device 100a acquires information expressing an image of the subject 2 (an image signal or image data) through the interface of the electrical connector included on the socket 130.

Note that in the case of imaging multiple subjects using multiple modules 10, a number of sockets 130 equal to the number of modules 10 may be prepared, and the target of imaging may be changed by interchanging the sockets 130 respectively holding the modules 10. Alternatively, the target of imaging may be changed by interchanging the module 10 while keeping a single socket 130 attached to the stage 32.

As illustrated in FIG. 26C, by loading the socket 130 onto the stage 32, the bottom face of the socket 130 and the top face of the mount 34 may be made to adhere closely to each other. As a result, the positioning of the socket 130 with respect to the stage 32 is fixed. Consequently, the positioning of the stage 32 and the module 10 held by the socket 130 may be kept constant through changes in orientation of the stage 32. Typically, when the socket 130 is loaded onto the stage 32, the primary face of the transparent plate 8 of the module 10 is nearly parallel to the stage 32.

Figure 27A:
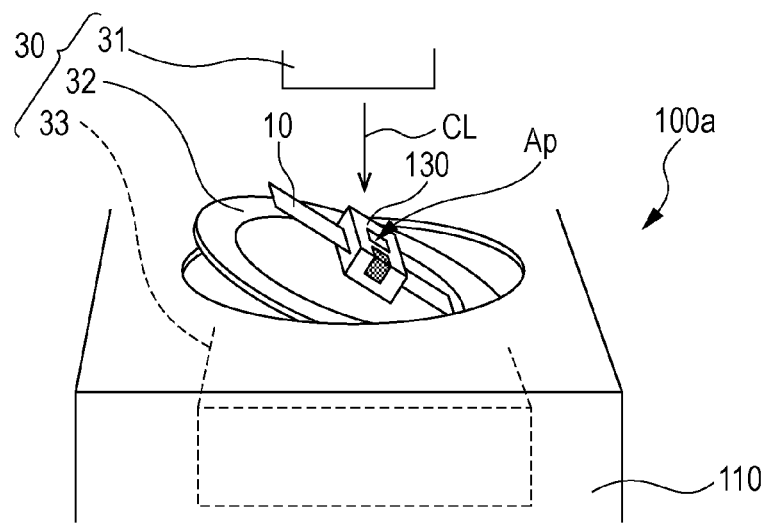
FIG. 27A is a diagram schematically illustrating an example of a method of changing a light source direction.

FIG. 27A illustrates an example of a method of changing the light source direction. As illustrated in the drawing, illuminating light CL emitted from the light source 31 is shined onto the module 10 held by the socket 130. The illuminating light CL is incident on the subject of the module 10 through the aperture Ap provided in the socket 130. Light passing through the subject is incident on the imaging face of the imaging element 7 of the module 10.

The light emitted from the light source 31 is typically collimated light. However, the light emitted from the light source 31 may also not be collimated light, insofar as the light that is incident on the subject may be regarded substantially as parallel light.

The light source 31 includes an LED chip, for example. The light source 31 may also include multiple LED chips having peaks in respectively different wavelength bands. For example, the light source 31 may also include an LED chip that emits blue light, an LED chip that emits red light, and an LED chip that emits green light. If multiple light-emitting elements are arranged in close proximity to each other (for example, approximately 100 μm), the multiple light-emitting elements may be considered to be a point light source.

By using multiple light-emitting elements that emit mutually different colors of light, such as by shining different colors of light in a time-sequential manner for each light source direction, for example, multiple sub-images for each color may be acquired. For example, a set of blue sub-images, a set of red sub-images, and a set of green sub-images may be acquired. The acquired sets of sub-images then may be used to form a high-resolution color image. For example, in the scenario of pathological diagnosis, by using a high-resolution image color image, more useful information related to factors such as the presence or absence of a lesion may be obtained. Mutually different colors of illuminating light may also be obtained in a time-sequential manner by using a white LED chip as the light source 31 and also positioning a color filter along the optical pathway. In addition, an image sensor for color imaging may also be used as the image sensor 4. However, a configuration that does not include a color filter is beneficial from the perspective of minimizing reductions in the light intensity incident on the photoelectric transducers of the image sensor 4.

The light source 31 is not limited to being an LED, and may also be a device such as an incandescent bulb, a laser element, a fiber laser, or a discharge tube. The light emitted from the light source 31 is not limited to being visible light, and may also be light such as ultraviolet light or infrared light. The number and arrangement of light-emitting elements included in the light source 31 may also be configured arbitrarily.

As illustrated in FIG. 25 and FIG. 27A, the image acquisition device 100a includes a stage driving mechanism 33. The stage driving mechanism 33 includes components such as a gonio mechanism and a rotation mechanism, and varies the tilt of the stage 32 with respect to the main unit 110 and/or an angle of rotation about an axis passing through the center of the stage 32. The stage driving mechanism 33 may also include a slide mechanism capable of moving the stage 32 parallel to a reference plane (typically the horizontal plane).

Figure 27B:
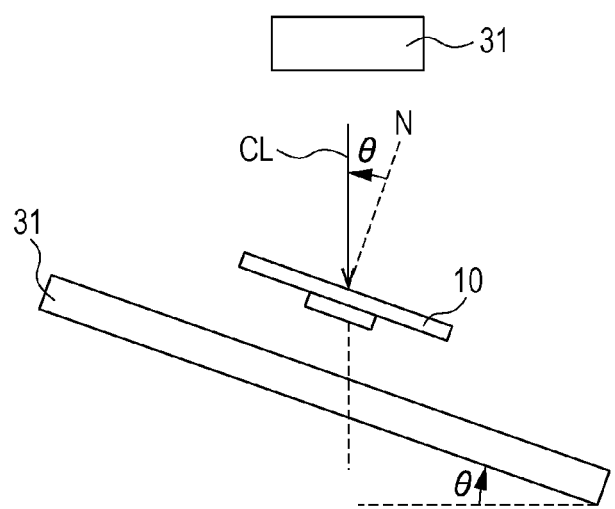
FIG. 27B is a diagram schematically illustrating a change of direction of light rays incident on a subject when the stage is tilted by an angle θ with respect to a reference plane.

By causing the stage driving mechanism 33 to operate, the orientation of the stage 32 may be varied. Herein, since the socket 130 holding the module 10 is attached to the stage 32, by varying the orientation of the stage 32, the orientation of the module 10 may be varied. For example, suppose that the incident direction of illuminating light when the stage 32 is not tilted with respect to the reference plane is the normal direction of the imaging face of the image sensor. In this case, the relationship (for example, the parallel relationship) between the tilt of the stage 32 with respect to the reference plane and the tilt of the module 10 with respect to the reference plane (which may also be referred to as the tilt of the transparent plate 8) is kept constant through the variation of the orientation of the stage 32. For this reason, as illustrated in FIG. 27B, if the stage 32 is tilted by an angle θ with respect to the reference plane, the direction of light rays incident on the subject is also tilted by the angle θ. Note that in FIG. 27B, the dashed line N represents the normal line of the imaging face of the image sensor.

In this way, by varying the orientation of the stage 32 together with the module 10, it is possible to shine illuminating light onto the subject successively from multiple different light source directions from the perspective of the subject 2. Consequently, the imaging element 7 of the module 10 is able to acquire multiple images corresponding to the multiple different light source directions from the perspective of the subject 2. A light source direction from the perspective of the subject 2 may be expressed by the combination of the angle obtained between the normal line N of the imaging face of the image sensor and the incident light rays on the subject 2 (the zenith angle θ illustrated in FIG. 27B), and the angle obtained between a reference bearing set on the imaging face and the projection of incident light rays onto the imaging face (bearing angle), for example.

Note that it is also possible to shine light onto the subject 2 from multiple different light source directions by moving the light source 31 inside the image acquisition device 100a, or by causing multiple light sources positioned at mutually different locations to turn on successively. For example, the light source direction may be changed by causing the light source 31 to move along the direction joining the light source 31 and the subject 2. The light source direction may also be varied according to the combination of a variation of orientation of the stage 32 and movement of the light source 31.

Image Sensor Used in Module

Note that in an embodiment of the present disclosure, the image sensor 4 is not limited to being a CCD image sensor, and may also be a complementary metal-oxide semiconductor (CMOS) image sensor, or some other image sensor (as an example, a laminated photoconductive film image sensor. The CCD image sensor and the CMOS image sensor may be either front-illuminated or back-illuminated. Hereinafter, the relationship between the element structure of an image sensor and the light incident on photodiodes in the image sensor will be described.

Figure 28:
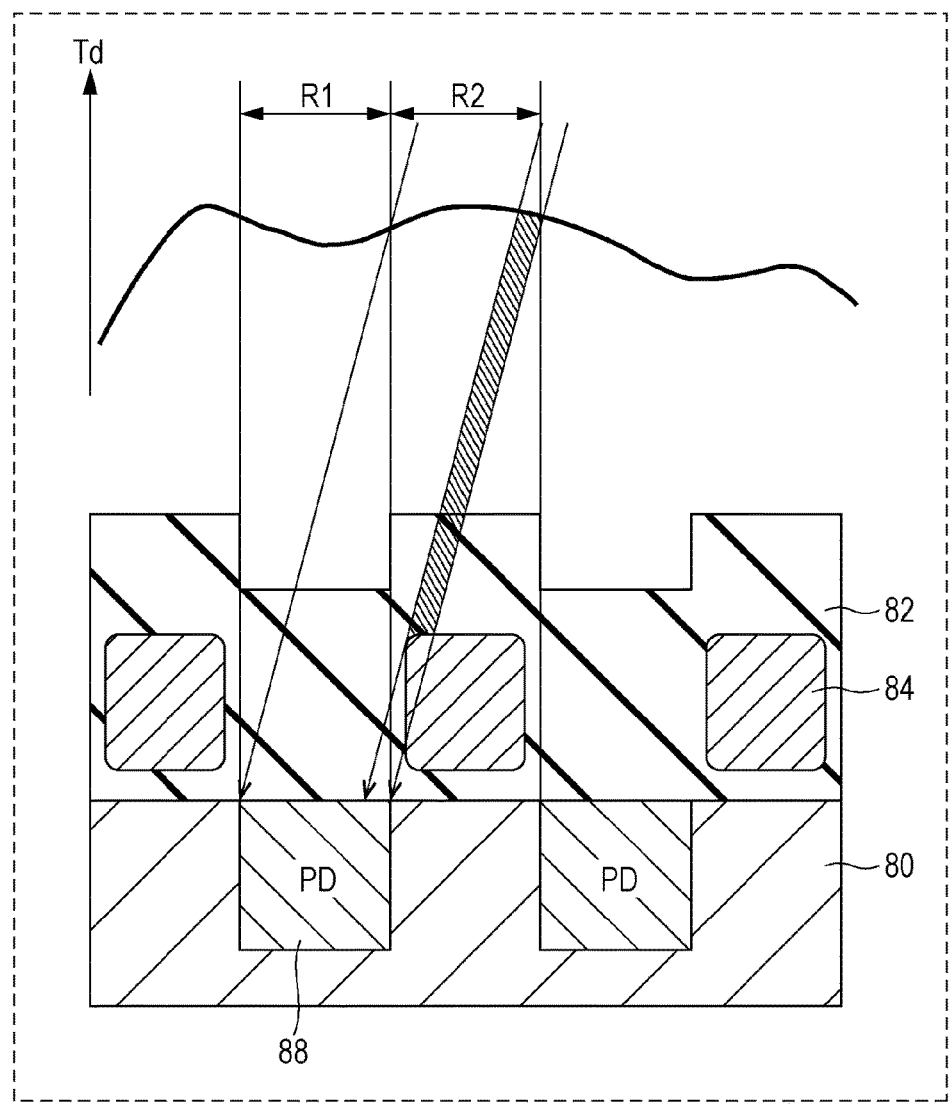
FIG. 28 is a diagram illustrating an example of a cross-sectional structure of a CCD image sensor and a distribution of relative transmittance of a subject.

FIG. 28 illustrates an example of a cross-sectional structure of a CCD image sensor and a distribution of the relative transmittance Td of a subject. As illustrated in FIG. 28, the CCD image sensor schematically includes a substrate 80, an insulating layer 82 on the substrate 80, and interconnects 84 arranged in the insulating layer 82. Multiple photodiodes 88 are formed in the substrate 80. A light shield layer (not illustrated in FIG. 28) is formed on top of the interconnects 84. Herein, the illustration of elements such as transistors is omitted. The illustration of elements such as transistor is also omitted from the drawings below. Note that schematically, the cross-sectional structure near the photodiodes in a front-illuminated CMOS image sensor is mostly similar to the cross-sectional structure near the photodiodes in a CCD image sensor. For this reason, herein, illustration and description of the cross-sectional structure of a front-illuminated CMOS image sensor is omitted.

As illustrated in FIG. 28, when illuminating light is incident from the normal direction of the imaging face, the radiant light passing through the region R1 directly above a photodiodes 88 from among the entirety of the subject is incident on the photodiodes 88. On the other hand, the radiant light passing through the region R2 directly above the light shield layer on the interconnects 84 is incident on the light-shielded region of the image sensor (the region where the light-shielding film is formed). Consequently, when shining light from the normal direction of the imaging face, an image expressing the region R1 directly above the photodiodes 88 from among the entirety of the subject is obtained.

To acquire an image expressing the region directly above the light-shielding film, it is sufficient to shine light from a direction tilted with respect to the normal direction of the imaging face so that the light passing through the region R2 is incident on the photodiodes 88. At this point, depending on the light source direction, part of the light passing through the region R2 may be blocked by the interconnects 84. In the illustrated example, the light rays passing through the hatched portion do not reach the photodiodes 88. For this reason, for tilted incidence of light, the pixel values may decrease to some extent. However, not all of the transmitted light is blocked, and thus the formation of a high-resolution image using the sub-images obtained at this point is still possible.

Figure 29A:
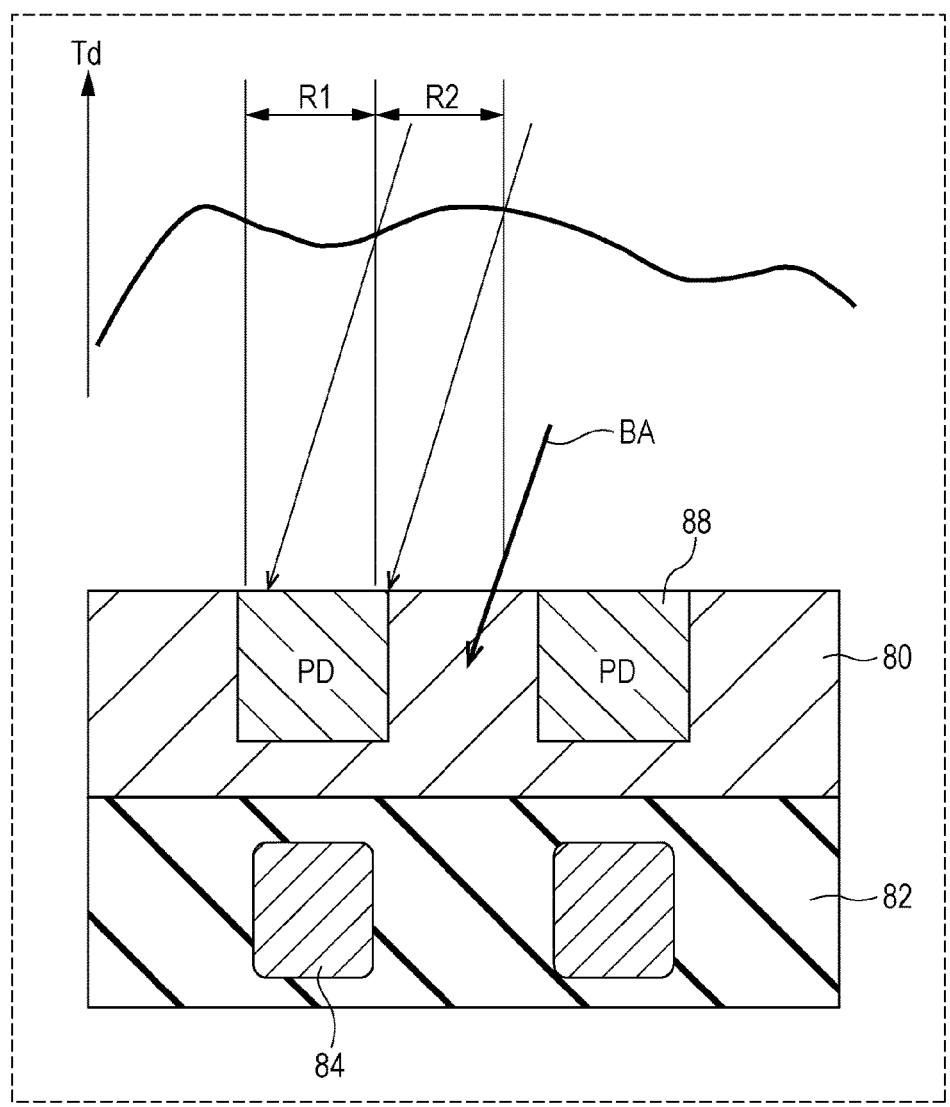
FIG. 29A is a diagram illustrating an example of a cross-sectional structure of a back-illuminated CMOS image sensor and a distribution of relative transmittance of a subject.
Figure 29B:
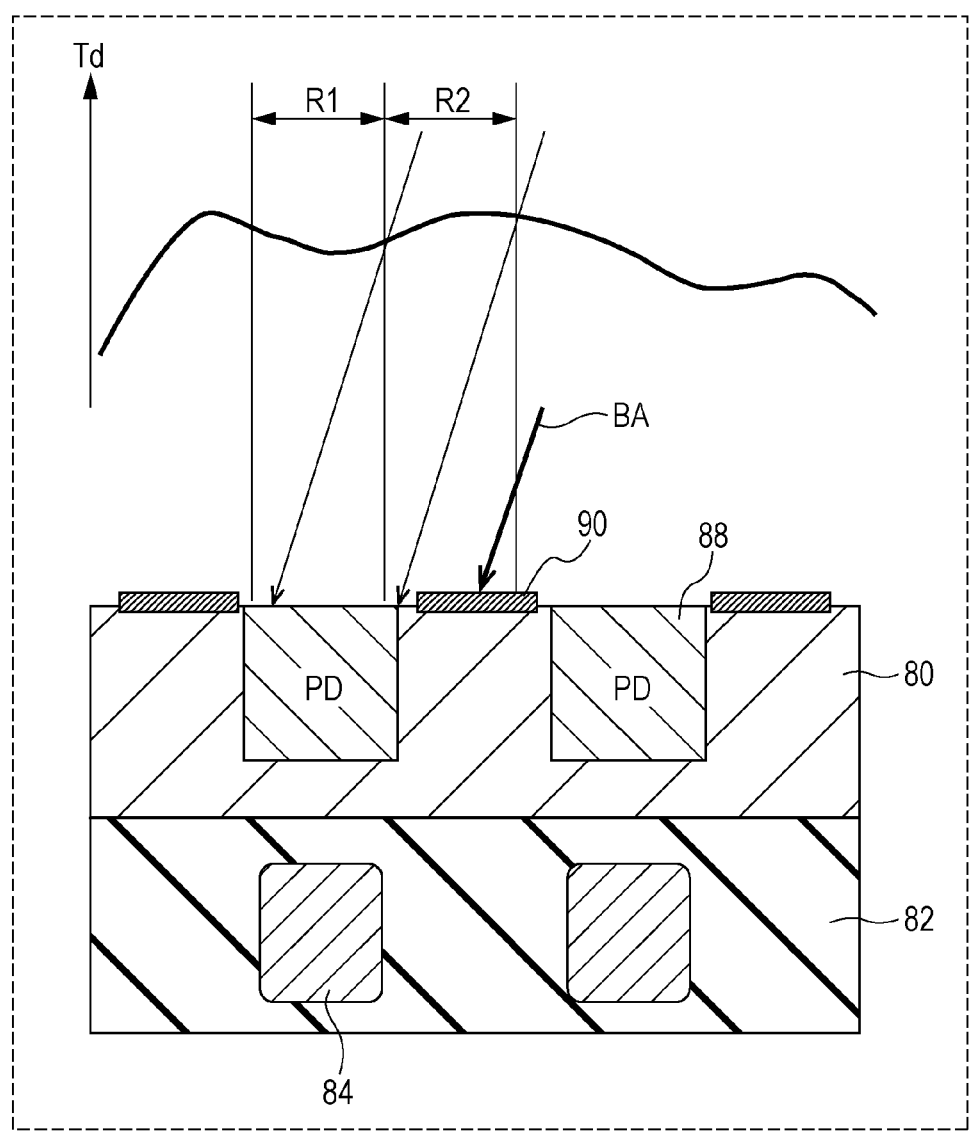
FIG. 29B is a diagram illustrating an example of a cross-sectional structure of a back-illuminated CMOS image sensor and a distribution of relative transmittance of a subject.

FIGS. 29A and 29B illustrate examples of a cross-sectional structure of a back-illuminated CMOS image sensor and a distribution of the relative transmittance Td of a subject. As illustrated in FIG. 29A, in a back-illuminated CMOS image sensor, transmitted light is not blocked by the interconnects 84, even in the case of tilted incidence of light. However, noise may be produced due to light passing through another region different from the desired region to be imaged (the light schematically indicated by the bold arrow BA in FIG. 29A as well as FIG. 29B discussed later) and being incident on the substrate 80, and there is a risk of degraded image quality of the sub-images. As illustrated in FIG. 29B, such degradation may be reduced by forming a light shield layer 90 on top of the regions other than the regions where photodiodes are formed in the substrate.

Figure 30:
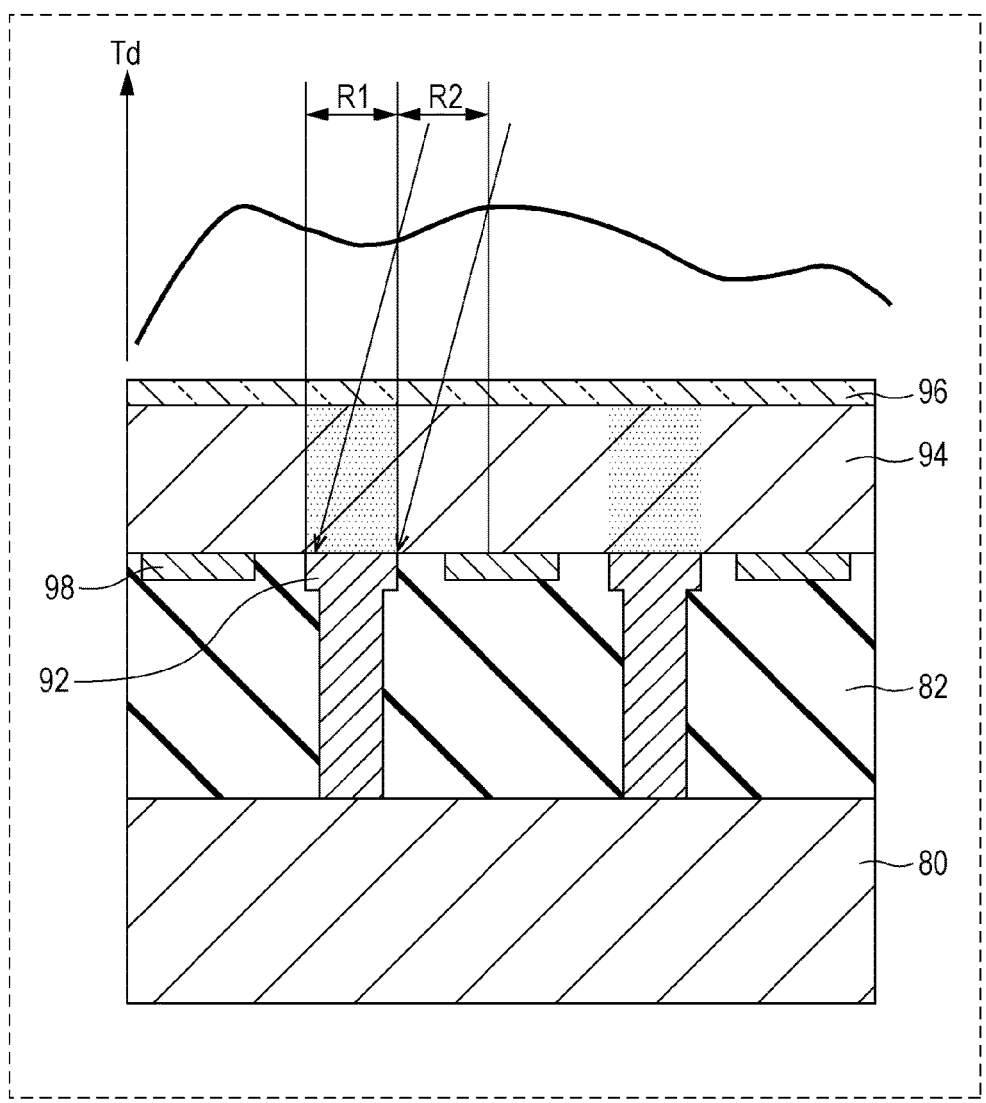
FIG. 30 is a diagram illustrating an example of a cross-sectional structure of a laminated photoconductive film image sensor and a distribution of relative transmittance of a subject.

FIG. 30 illustrates an example of a cross-sectional structure of an image sensor provided with a photoconductive film made of organic material or inorganic material (hereinafter called a "laminated photoconductive film image sensor") and a distribution of the relative transmittance Td of a subject.

As illustrated in FIG. 30, the laminated photoconductive film image sensor schematically includes a substrate 80, an insulating layer 82 provided with multiple pixel electrodes, a photoconductive film 94 on top of the insulating layer 82, and transparent electrodes 96 on top of the photoconductive film 94. As illustrated in the drawing, in the laminated photoconductive film image sensor, instead of photodiodes being formed on a semiconductor substrate, a photoconductive film 94 that performs photoelectric conversion is formed on top of the substrate 80 (for example, a semiconductor substrate). The photoconductive film 94 and the transparent electrodes 96 typically are formed over the entirety of the imaging face. Herein, the illustration of a protective film that protects the photoconductive film 94 is omitted.

In the laminated photoconductive film image sensor, charge (electrons or holes) produced by the photoelectric conversion of incident light on the photoconductive film 94 is collected by the pixel electrodes 92. As a result, a value expressing the quantity of light incident on the photoconductive film 94 is obtained. Consequently, in the laminated photoconductive film image sensor, a unit region including one pixel electrode 92 on the imaging face may be said to correspond to one pixel. In the laminated photoconductive film image sensor, similarly to a back-illuminated CMOS image sensor, transmitted light is not blocked by interconnects, even in the case of tilted incidence of light.

As described with reference to FIGS. 15A to 20, in the formation of a high-resolution image, multiple sub-images expressing images made up of different portions of the subject are used. However, in a typical laminated photoconductive film image sensor, the photoconductive film 94 is formed over the entirety of the imaging face, and thus even in the case of perpendicular incidence of light, for example, the photoconductive film 94 may also photoelectrically convert light passing through regions other than the desired region of the subject. If the extra electrons or holes produced at this point are taken into the pixel electrodes 92, there is a risk of not obtaining an appropriate sub-image. Consequently, it is beneficial for the pixel electrodes 92 to selectively take in charge produced in regions where the pixel electrodes 92 and the transparent electrodes 96 overlap (the shaded region in FIG. 30).

In the configuration illustrated as an example in FIG. 30, dummy electrodes 98 are provided inside the pixels, in correspondence with respective pixel electrodes 92. When acquiring an image of a subject, an appropriate potential difference is applied between the pixel electrodes 92 and the dummy electrodes 98. As a result, charge produced in regions other than the regions where the pixel electrodes 92 and the transparent electrodes 96 overlap is taken by the dummy electrodes 98, whereas charge produced in the regions where the pixel electrodes 92 and the transparent electrodes 96 overlap may be taken in selectively by the pixel electrodes 92. Note that it is also possible to obtain similar advantageous effects by patterning of the transparent electrodes 96 of the photoconductive film 94. In such a configuration, the ratio of the geometric area S3 of a pixel electrode 92 with respect to the geometric area S1 of a pixel (S3/S1) may be said to correspond to the "aperture ratio".

As already described, provided that N is an integer equal to or greater than 2, and the aperture ratio of the image sensor 4 is approximately equal to 1/N, a resolution increase up to a maximum of N times (N×) is possible. In other words, a small aperture ratio is more effective for increased resolution. In a laminated photoconductive film image sensor, by adjusting the geometric area S3 of the pixel electrodes 92, it is possible to adjust the ratio corresponding to the aperture ratio (S3/S1). This ratio (S3/S1) is set within a range from 10% to 50%, for example. A laminated photoconductive film image sensor having a ratio (S3/S1) within the above range may be used for super-resolution.

Note that, as FIGS. 28 and 29B demonstrate, the surface facing the subject in a CCD image sensor or a front-illuminated CMOS image sensor is not flat. For example, in a CCD image sensor, step-like levels exist on the surface. Meanwhile, in a back-illuminated CMOS image sensor, acquiring a sub-image for forming a high-resolution image requires the provision of a patterned light shield layer on the imaging face, and thus the surface facing the subject is not flat.

In contrast, the imaging face of a laminated photoconductive film image sensor is nearly a flat face, as FIG. 30 demonstrates. Consequently, even if the subject is placed on top of the imaging face, almost no deformations in the subject caused by the shape of the imaging face are produced. In other words, by acquiring sub-images using a laminated photoconductive film image sensor, more detailed structure of the subject may be observed.

The foregoing thus describes an image output device according to one or more aspects on the basis of several embodiments, but the present disclosure is not limited to these embodiments. Embodiments obtained by applying various modifications that may occur to persons skilled in the art as well as embodiments constructed by combining the structural elements in different embodiments may also be included the present disclosure insofar as such embodiments do not depart from the spirit of the present disclosure.

Note that, in the above respective embodiments, each structural element may be configured by dedicated hardware, or realized by executing a software program suited to each structural element. Each structural element may be realized as a result of a program execution unit such as a CPU or processor reading out and executing a software program (that is, instructions) recorded on a recording medium such as a hard disk or semiconductor memory. Herein, software realizing features such as the image output device of the foregoing embodiments is a program causing a computer to execute each step in the flowchart of FIG. 3, FIG. 4, FIG. 7, FIG. 9, or FIG. 11. Note that the software execution unit may be made up of a single processor, or be made up of multiple processors.

Additionally, in the present disclosure, all or part of the units and devices, or all or part of the function blocks in the block diagrams illustrated in FIGS. 1, 5, 6, 8, 10, and FIGS. 12 to 14, may also be executed by one or multiple electronic circuits, including a semiconductor device, a semiconductor integrated circuit (IC), or a large-scale integration (LSI) circuit. An LSI circuit or IC may be integrated into a single chip, or be configured by combining multiple chips. For example, function blocks other than storage elements may be integrated into a single chip. Although referred to as an LSI circuit or IC herein, such electronic circuits may also be called a system LSI circuit, a very large-scale integration (VLSI) circuit, or an ultra large-scale integration (ULSI) circuit, depending on the degree of integration. A field-programmable gate array (FPGA) programmed after fabrication of the LSI circuit, or a reconfigurable logic device in which interconnection relationships inside the LSI circuit may be reconfigured or in which circuit demarcations inside the LSI may be set up, may also be used for the same purpose.

Furthermore, the functions or operations of all or part of a unit, device, or part of a device may also be executed by software processing. In this case, the software is recorded onto one or multiple non-transitory recording media, such as ROM, an optical disc, or a hard disk drive, and when the software is executed by a processor, the software causes the processor and peripheral devices to execute specific functions in software. A system or device may also be equipped with one or multiple non-transitory recording media on which the software is recorded, a processor, and necessary hardware devices, such as an interface, for example.

The present disclosure exhibits an advantageous effect of reducing the burden of handling high-resolution images, and may be applied to devices such as an image output device that handles high-resolution images of pathological specimens, for example.

What is claimed is:

1. An image output device comprising:
   at least one processor; and
   a non-transitory recording medium that stores one or more instructions,
   wherein the one or more instructions cause the at least one processor to
      acquire an image with a first resolution, being an image of a subject obtained based on imaging by a digital microscope,
      acquire an image with a second resolution, being an image of the subject obtained based on imaging by the digital microscope, the image with the second resolution being of a higher resolution than the image with the first resolution, accept an enlargement ratio for the image with the first resolution displayed on a display device, determine whether or not an evaluation score determined based on the accepted enlargement ratio is higher than a certain value, transmit the image with the second resolution to an external device when the evaluation score is determined to be higher than the certain value, and not transmit the image with the second resolution to the external device when the evaluation score is determined not to be higher than the certain value, wherein the image with the first resolution is a first image with the first resolution, wherein the one or more instructions cause the at least one processor to acquire a second image with the first resolution, being an image of the subject obtained based on imaging by the digital microscope, wherein the image with the second resolution is generated based on the first image with the first resolution and the second image with the first resolution, wherein the digital microscope emits a first illuminating light at a first angle to the subject and emits a second illuminating light at a second angle to the subject, the second illuminating light being emitted after the emission of the first illuminating light, wherein the digital microscope generates the first image with the first resolution based on a first plurality of pixel values, and generates the second image with the first resolution determined based on a second plurality of pixel values, wherein a number of pixel values in the image with the second resolution is greater than a number of the first plurality of pixel values, and the number of pixel values in the image with the second resolution is also greater than a number of the second plurality of pixel values, wherein the subject includes a first portion and a second portion adjacent to the first portion, wherein a plurality of photoelectric transducers outputs the first plurality of pixel values including a first pixel value, based on a first resulting light obtained by the first illuminating light passing through the subject, and outputs the second plurality of pixel values including a second pixel value, based on a second resulting light obtained by the second illuminating light passing through the subject, wherein the plurality of photoelectric transducers includes a first photoelectric transducer and a second photoelectric transducer adjacent to the first photoelectric transducer, wherein the first photoelectric transducer outputs the first pixel value determined based on a portion of the first resulting light obtained by a portion of the first illuminating light passing through the first portion, and wherein the second photoelectric transducer outputs the second pixel value determined based on a portion of the second resulting light obtained by a portion of the second illuminating light passing through the second portion.

2. The image output device according to claim 1, wherein the one or more instructions additionally cause the at least one processor to transmit the image with the first resolution to the external device when the evaluation score is determined not to be higher than the certain value.

3. The image output device according to claim 1, wherein the one or more instructions additionally cause the at least one processor to output and save the image with the second resolution to a recording medium when the evaluation score is determined to be higher than the certain value, and not output the image with the second resolution to the recording medium when the evaluation score is determined not to be higher than the certain value.

4. The image output device according to claim 1, wherein the one or more instructions additionally cause the at least one processor to derive, as the evaluation score, a maximum enlargement ratio from among one or a plurality of the accepted enlargement ratio.

5. The image output device according to claim 1, wherein the one or more instructions additionally cause the at least one processor to derive a high evaluation score to the extent that a number of times that a high enlargement ratio has been accepted is high, a high enlargement ratio being an enlargement ratio higher than a threshold value, or to the extent that a time of an image of the subject being displayed on the display device at the high enlargement ratio is long.

6. The image output device according to claim 1, wherein the one or more instructions additionally cause the at least one processor to derive a high evaluation score to the extent that a geometric area of the subject displayed on the display device at the high enlargement ratio higher than a threshold value is broad.

7. An image output device comprising:

an image transmission device; and an image reception device connected to the image transmission device over a communication link, wherein the image transmission device includes at least one transmission processor, and a non-transitory transmission recording medium that stores one or more transmission instructions, wherein the one or more transmission instructions cause the at least one transmission processor to acquire, and transmit to the image reception device, an image with a first resolution, being an image of a subject obtained based on imaging by a digital microscope, acquire an image with a second resolution, being an image of the subject obtained based on imaging by the digital microscope, the image with the second resolution being of a higher resolution than the image with the first resolution, determine whether or not an evaluation score indicated by evaluation score-related information reported from the image reception device is higher than a certain value, and transmit the image with the second resolution to the image reception device when the evaluation score is determined to be higher than the certain value, wherein the image reception device includes at least one reception processor, and a non-transitory reception recording medium that stores one or more reception instructions, wherein the one or more reception instructions cause the at least one reception processor to acquire, and display on a display device, the image with the first resolution from the image transmission device, accept an enlargement ratio for the image with the first resolution displayed on the display device, enlarge the image with the first resolution displayed on the display device, based on the accepted enlargement ratio, and transmit the evaluation score-related information determined based on the accepted enlargement ratio to the image transmission device, wherein the image with the first resolution is a first image with the first resolution, wherein the one or more transmission instructions cause the at least one transmission processor to acquire a second image with the first resolution, being an image of the subject obtained based on imaging by the digital microscope, wherein the image with the second resolution is generated based on the first image with the first resolution and the second image with the first resolution, wherein the digital microscope emits a first illuminating light at a first angle to the subject and emits a second illuminating light at a second angle to the subject, the second illuminating light being emitted after the emission of the first illuminating light, wherein the digital microscope generates the first image with the first resolution based on a first plurality of pixel values, and generates the second image with the first resolution determined based on a second plurality of pixel values, wherein a number of pixel values in the image with the second resolution is greater than a number of the first plurality of pixel values, and the number of pixel values in the image with the second resolution is also greater than a number of the second plurality of pixel values, wherein the subject includes a first portion and a second portion adjacent to the first portion, wherein a plurality of photoelectric transducers outputs the first plurality of pixel values including a first pixel value, based on a first resulting light obtained by the first illuminating light passing through the subject, and outputs the second plurality of pixel values including a second pixel value, based on a second resulting light obtained by the second illuminating light passing through the subject, wherein the plurality of photoelectric transducers includes a first photoelectric transducer and a second photoelectric transducer adjacent to the first photoelectric transducer, wherein the first photoelectric transducer outputs the first pixel value determined based on a portion of the first resulting light obtained by a portion of the first illuminating light passing through the first portion, and wherein the second photoelectric transducer outputs the second pixel value determined based on a portion of the second resulting light obtained by a portion of the second illuminating light passing through the second portion.

8. The image output device according to claim 7, wherein the one or more transmission instructions additionally cause the at least one transmission processor to output and save the image with the second resolution to a recording medium when, in the determination of the evaluation score, the evaluation score is determined not to be higher than the certain value.

9. An image output device comprising:
an image transmission device; and
an image reception device connected to the image transmission device over a communication link,
wherein the image transmission device includes
at least one transmission processor, and
a non-transitory transmission recording medium that stores one or more transmission instructions,
wherein the one or more transmission instructions cause the at least one transmission processor to
acquire, and transmit to the image reception device, an image with a first resolution, being an image of a subject obtained based on imaging by a digital microscope, and
acquire an image with a second resolution, being an image of the subject obtained based on imaging by the digital microscope, the image with the second resolution being of a higher resolution than the image with the first resolution,
wherein the image reception device includes
at least one reception processor, and
a non-transitory reception recording medium that stores one or more reception instructions,
wherein the one or more reception instructions cause the at least one reception processor to
acquire, and display on a display device, the image with the first resolution from the image transmission device,
accept an enlargement ratio for the image with the first resolution displayed on a display device,
enlarge the image with the first resolution displayed on the display device, based on the accepted enlargement ratio, and
determine whether or not an evaluation score determined based on the accepted enlargement ratio is higher than a certain value, and report a determination result to the image transmission device,
wherein the one or more transmission instructions of the image transmission device additionally cause the at least one transmission processor to transmit the image with the second resolution to the image reception device when the determination result reported from the image reception device indicates that the evaluation score is higher than the certain value, wherein the image with the first resolution is a first image with the first resolution, wherein the one or more transmission instructions cause the at least one transmission processor to acquire a second image with the first resolution, being an image of the subject obtained based on imaging by the digital microscope, wherein the image with the second resolution is generated based on the first image with the first resolution and the second image with the first resolution, wherein the digital microscope emits a first illuminating light at a first angle to the subject and emits a second illuminating light at a second angle to the subject, the second illuminating light being emitted after the emission of the first illuminating light, wherein the digital microscope generates the first image with the first resolution based on a first plurality of pixel values, and generates the second image with the first resolution determined based on a second plurality of pixel values, wherein a number of pixel values in the image with the second resolution is greater than a number of the first plurality of pixel values, and the number of pixel values in the image with the second resolution is also greater than a number of the second plurality of pixel values, wherein the subject includes a first portion and a second portion adjacent to the first portion, wherein a plurality of photoelectric transducers outputs the first plurality of pixel values including a first pixel value, based on a first resulting light obtained by the first illuminating light passing through the subject, and outputs the second plurality of pixel values including a second pixel value, based on a second resulting light obtained by the second illuminating light passing through the subject, wherein the plurality of photoelectric transducers includes a first photoelectric transducer and a second photoelectric transducer adjacent to the first photoelectric transducer, wherein the first photoelectric transducer outputs the first pixel value determined based on a portion of the first resulting light obtained by a portion of the first illuminating light passing through the first portion, and wherein the second photoelectric transducer outputs the second pixel value determined based on a portion of the second resulting light obtained by a portion of the second illuminating light passing through the second portion.

10. An image output method performed by an image output device including (i) at least one processor and (ii) a non-transitory recording medium that stores one or more instructions, the one or more instructions causing the at least one processor to perform the image output method, the image output method comprising:

acquiring an image with a first resolution, being an image of a subject obtained based on imaging by a digital microscope;

acquiring an image with a second resolution, being an image of the subject obtained based on imaging by the digital microscope, the image with the second resolution being of a higher resolution than the image with the first resolution;

accepting an enlargement ratio for the image with the first resolution displayed on a display device;

determining whether or not an evaluation score determined based on the accepted enlargement ratio is higher than a certain value;

transmitting the image with the second resolution to an external device when the evaluation score is determined to be higher than the certain value; and not transmitting the image with the second resolution to the external device when the evaluation score is determined not to be higher than the certain value, wherein the image with the first resolution is a first image with the first resolution, wherein the image output method further comprising acquiring a second image with the first resolution, being an image of the subject obtained based on imaging by the digital microscope, wherein the image with the second resolution is generated based on the first image with the first resolution and the second image with the first resolution, wherein the digital microscope emits a first illuminating light at a first angle to the subject and emits a second illuminating light at a second angle to the subject, the second illuminating light being emitted after the emission of the first illuminating light, wherein the digital microscope generates the first image with the first resolution based on a first plurality of pixel values, and generates the second image with the first resolution determined based on a second plurality of pixel values, wherein a number of pixel values in the image with the second resolution is greater than a number of the first plurality of pixel values, and the number of pixel values in the image with the second resolution is also greater than a number of the second plurality of pixel values, wherein the subject includes a first portion and a second portion adjacent to the first portion, wherein a plurality of photoelectric transducers outputs the first plurality of pixel values including a first pixel value, based on a first resulting light obtained by the first illuminating light passing through the subject, and outputs the second plurality of pixel values including a second pixel value, based on a second resulting light obtained by the second illuminating light passing through the subject, wherein the plurality of photoelectric transducers includes a first photoelectric transducer and a second photoelectric transducer adjacent to the first photoelectric transducer, wherein the first photoelectric transducer outputs the first pixel value determined based on a portion of the first resulting light obtained by a portion of the first illuminating light passing through the first portion, and wherein the second photoelectric transducer outputs the second pixel value determined based on a portion of the second resulting light obtained by a portion of the second illuminating light passing through the second portion.

11. A non-transitory computer-readable recording medium storing thereon a program, the program including one or more instruction for causing an image output device including at least one processor to acquire an image with a first resolution, being an image of a subject obtained based on imaging by a digital microscope, acquire an image with a second resolution, being an image of the subject obtained based on imaging by the digital microscope, the image with the second resolution being of a higher resolution than the image with the first resolution, accept an enlargement ratio for the image with the first resolution displayed on a display device, determine whether or not an evaluation score determined based on the accepted enlargement ratio is higher than a certain value, transmit the image with the second resolution to an external device when the evaluation score is determined to be higher than the certain value, and not transmit the image with the second resolution to the external device when the evaluation score is determined not to be higher than the certain value, wherein the image with the first resolution is a first image with the first resolution, wherein the one or more instructions cause the at least one processor to acquire a second image with the first resolution, being an image of the subject obtained based on imaging by the digital microscope, wherein the image with the second resolution is generated based on the first image with the first resolution and the second image with the first resolution, wherein the digital microscope emits a first illuminating light at a first angle to the subject and emits a second illuminating light at a second angle to the subject, the second illuminating light being emitted after the emission of the first illuminating light, wherein the digital microscope generates the first image with the first resolution based on a first plurality of pixel values, and generates the second image with the first resolution determined based on a second plurality of pixel values, wherein a number of pixel values in the image with the second resolution is greater than a number of the first plurality of pixel values, and the number of pixel values in the image with the second resolution is also greater than a number of the second plurality of pixel values, wherein the subject includes a first portion and a second portion adjacent to the first portion, wherein a plurality of photoelectric transducers outputs the first plurality of pixel values including a first pixel value, based on a first resulting light obtained by the first illuminating light passing through the subject, and outputs the second plurality of pixel values including a second pixel value, based on a second resulting light obtained by the second illuminating light passing through the subject, wherein the plurality of photoelectric transducers includes a first photoelectric transducer and a second photoelectric transducer adjacent to the first photoelectric transducer, wherein the first photoelectric transducer outputs the first pixel value determined based on a portion of the first resulting light obtained by a portion of the first illuminating light passing through the first portion, and wherein the second photoelectric transducer outputs the second pixel value determined based on a portion of the second resulting light obtained by a portion of the second illuminating light passing through the second portion.

12. An image reception device connected to an image transmission device over a communication link, wherein the image transmission device includes
at least one transmission processor, and
a non-transitory transmission recording medium that stores one or more transmission instructions, wherein the one or more transmission instructions cause the at least one transmission processor to
acquire, and transmit to the image reception device, an image with a first resolution, being an image of a subject obtained based on imaging by a digital microscope,
acquire an image with a second resolution, being an image of the subject obtained based on imaging by the digital microscope, the image with the second resolution being of a higher resolution than the image with the first resolution,
determine whether or not an evaluation score indicated by evaluation score-related information reported from the image reception device is higher than a certain value, and
transmit the image with the second resolution to the image reception device when the evaluation score is determined to be higher than the certain value, wherein the image reception device includes
at least one reception processor, and
a non-transitory reception recording medium that stores one or more reception instructions, wherein the one or more reception instructions cause the at least one reception processor to
acquire, and display on a display device, the image with the first resolution from the image transmission device,
accept an enlargement ratio for the image with the first resolution displayed on the display device,
enlarge the image with the first resolution displayed on the display device, based on the accepted enlargement ratio, and
transmit the evaluation score-related information determined based on the accepted enlargement ratio to the image transmission device, wherein the image with the first resolution is a first image with the first resolution, wherein the one or more transmission instructions cause the at least one transmission processor to acquire a second image with the first resolution, being an image of the subject obtained based on imaging by the digital microscope, wherein the image with the second resolution is generated based on the first image with the first resolution and the second image with the first resolution, the digital microscope emits a first illuminating light at a first angle to the subject and emits a second illuminating light at a second angle to the subject, the second illuminating light being emitted after the emission of the first illuminating light, wherein the digital microscope generates the first image with the first resolution based on a first plurality of pixel values, and generates the second image with the first resolution determined based on a second plurality of pixel values, wherein a number of pixel values in the image with the second resolution is greater than a number of the first plurality of pixel values, and the number of pixel values in the image with the second resolution is also greater than a number of the second plurality of pixel values, wherein the subject includes a first portion and a second portion adjacent to the first portion, wherein a plurality of photoelectric transducers outputs the first plurality of pixel values including a first pixel value, based on a first resulting light obtained by the first illuminating light passing through the subject, and outputs the second plurality of pixel values including a second pixel value, based on a second resulting light obtained by the second illuminating light passing through the subject, wherein the plurality of photoelectric transducers includes a first photoelectric transducer and a second photoelectric transducer adjacent to the first photoelectric transducer, wherein the first photoelectric transducer outputs the first pixel value determined based on a portion of the first resulting light obtained by a portion of the first illuminating light passing through the first portion, and wherein the second photoelectric transducer outputs the second pixel value determined based on a portion of the second resulting light obtained by a portion of the second illuminating light passing through the second portion.

13. An image reception device connected to an image transmission device over a communication link, wherein the image transmission device includes
at least one transmission processor, and
a non-transitory transmission recording medium that stores one or more transmission instructions, wherein the one or more transmission instructions cause the at least one transmission processor to
acquire, and transmit to the image reception device, an image with a first resolution, being an image of a subject obtained based on imaging by a digital microscope, and
acquire an image with a second resolution, being an image of the subject obtained based on imaging by the digital microscope, the image with the second resolution being of a higher resolution than the image with the first resolution, wherein the image reception device includes
at least one reception processor, and a non-transitory reception recording medium that stores one or more reception instructions,
wherein the one or more reception instructions cause the at least one reception processor to
acquire, and display on a display device, the image with the first resolution from the image transmission device,
accept an enlargement ratio for the image with the first resolution displayed on a display device,
enlarge the image with the first resolution displayed on the display device, based on the accepted enlargement ratio, and
determine whether or not an evaluation score determined based on the accepted enlargement ratio is higher than a certain value, and report a determination result to the image transmission device,
wherein the one or more transmission instructions of the image transmission device additionally cause the at least one transmission processor to transmit the image with the second resolution to the image reception device when the determination result reported from the image reception device indicates that the evaluation score is higher than the certain value,
wherein the image with the first resolution is a first image with the first resolution,
wherein the one or more transmission instructions cause the at least one transmission processor to acquire a second image with the first resolution, being an image of the subject obtained based on imaging by the digital microscope,
wherein the image with the second resolution is generated based on the first image with the first resolution and the second image with the first resolution,
wherein the digital microscope emits a first illuminating light at a first angle to the subject and emits a second illuminating light at a second angle to the subject, the second illuminating light being emitted after the emission of the first illuminating light,
wherein the digital microscope generates the first image with the first resolution based on a first plurality of pixel values, and generates the second image with the first resolution determined based on a second plurality of pixel values,
wherein a number of pixel values in the image with the second resolution is greater than a number of the first plurality of pixel values, and the number of pixel values in the image with the second resolution is also greater than a number of the second plurality of pixel values,
wherein the subject includes a first portion and a second portion adjacent to the first portion,
wherein a plurality of photoelectric transducers outputs the first plurality of pixel values including a first pixel value, based on a first resulting light obtained by the first illuminating light passing through the subject, and outputs the second plurality of pixel values including a second pixel value, based on a second resulting light obtained by the second illuminating light passing through the subject,
wherein the plurality of photoelectric transducers includes a first photoelectric transducer and a second photoelectric transducer adjacent to the first photoelectric transducer,
wherein the first photoelectric transducer outputs the first pixel value determined based on a portion of the first resulting light obtained by a portion of the first illuminating light passing through the first portion, and wherein the second photoelectric transducer outputs the second pixel value determined based on a portion of the second resulting light obtained by a portion of the second illuminating light passing through the second portion.

14. An image transmission device connected to an image reception device over a communication link,
wherein the image reception device includes
at least one reception processor, and
a non-transitory reception recording medium that stores one or more reception instructions,
wherein the one or more reception instructions cause the at least one reception processor to
acquire from the image transmission device, and display on a display device, an image with a first resolution, being an image of a subject obtained based on imaging by a digital microscope,
accept an enlargement ratio for the image with the first resolution displayed on the display device,
enlarge the image with the first resolution displayed on the display device, based on the accepted enlargement ratio, and
transmit evaluation score-related information determined based on the accepted enlargement ratio to the image transmission device,
wherein the image transmission device includes
at least one transmission processor, and
a non-transitory transmission recording medium that stores one or more transmission instructions,
wherein the one or more transmission instructions cause the at least one transmission processor to
acquire and transmit the image with the first resolution to the image reception device,
acquire an image with a second resolution, being an image of the subject obtained based on imaging by the digital microscope, the image with the second resolution being of a higher resolution than the image with the first resolution,
determine whether or not an evaluation score indicated by the evaluation score-related information reported from the image reception device is higher than a certain value, and
transmit the image with the second resolution to the image reception device when the evaluation score is determined to be higher than the certain value,
wherein the image with the first resolution is a first image with the first resolution,
wherein the one or more transmission instructions cause the at least one transmission processor to acquire a second image with the first resolution, being an image of the subject obtained based on imaging by the digital microscope,
wherein the image with the second resolution is generated based on the first image with the first resolution and the second image with the first resolution,
wherein the digital microscope emits a first illuminating light at a first angle to the subject and emits a second illuminating light at a second angle to the subject, the second illuminating light being emitted after the emission of the first illuminating light,
wherein the digital microscope generates the first image with the first resolution based on a first plurality of pixel values, and generates the second image with the first resolution determined based on a second plurality of pixel values,
wherein a number of pixel values in the image with the second resolution is greater than a number of the first plurality of pixel values, and the number of pixel values in the image with the second resolution is also greater than a number of the second plurality of pixel values, wherein the subject includes a first portion and a second portion adjacent to the first portion, wherein a plurality of photoelectric transducers outputs the first plurality of pixel values including a first pixel value, based on a first resulting light obtained by the first illuminating light passing through the subject, and outputs the second plurality of pixel values including a second pixel value, based on a second resulting light obtained by the second illuminating light passing through the subject, wherein the plurality of photoelectric transducers includes a first photoelectric transducer and a second photoelectric transducer adjacent to the first photoelectric transducer, wherein the first photoelectric transducer outputs the first pixel value determined based on a portion of the first resulting light obtained by a portion of the first illuminating light passing through the first portion, and wherein the second photoelectric transducer outputs the second pixel value determined based on a portion of the second resulting light obtained by a portion of the second illuminating light passing through the second portion.

15. An image transmission device connected to an image reception device over a communication link, wherein the image reception device includes
  at least one reception processor, and
  a non-transitory reception recording medium that stores one or more reception instructions, wherein the one or more reception instructions cause the at least one reception processor to
  acquire from the image transmission device, and display on a display device, an image with a first resolution, being an image of a subject obtained based on imaging by a digital microscope,
  accept an enlargement ratio for the image with the first resolution displayed on the display device,
  enlarge the image with the first resolution displayed on the display device, based on the accepted enlargement ratio, and
  determine whether or not an evaluation score determined based on the accepted enlargement ratio is higher than a certain value, and report a determination result to the image transmission device, wherein the image transmission device includes
  at least one transmission processor, and
  a non-transitory transmission recording medium that stores one or more transmission instructions, wherein the one or more transmission instructions cause the at least one transmission processor to
  acquire and transmit the image with the first resolution to the image reception device,
  acquire an image with a second resolution, being an image of the subject obtained based on imaging by the digital microscope, the image with the second resolution being of a higher resolution than the image with the first resolution, and
  transmit the image with the second resolution to the image reception device when the determination result reported from the image reception device indicates that the evaluation score is higher than the certain value, wherein the image with the first resolution is a first image with the first resolution, wherein the one or more transmission instructions cause the at least one transmission processor to acquire a second image with the first resolution, being an image of the subject obtained based on imaging by the digital microscope, wherein the image with the second resolution is generated based on the first image with the first resolution and the second image with the first resolution, wherein the digital microscope emits a first illuminating light at a first angle to the subject and emits a second illuminating light at a second angle to the subject, the second illuminating light being emitted after the emission of the first illuminating light, wherein the digital microscope generates the first image with the first resolution based on a first plurality of pixel values, and generates the second image with the first resolution determined based on a second plurality of pixel values, wherein a number of pixel values in the image with the second resolution is greater than a number of the first plurality of pixel values, and the number of pixel values in the image with the second resolution is also greater than a number of the second plurality of pixel values, wherein the subject includes a first portion and a second portion adjacent to the first portion, wherein a plurality of photoelectric transducers outputs the first plurality of pixel values including a first pixel value, based on a first resulting light obtained by the first illuminating light passing through the subject, and outputs the second plurality of pixel values including a second pixel value, based on a second resulting light obtained by the second illuminating light passing through the subject, wherein the plurality of photoelectric transducers includes a first photoelectric transducer and a second photoelectric transducer adjacent to the first photoelectric transducer, wherein the first photoelectric transducer outputs the first pixel value determined based on a portion of the first resulting light obtained by a portion of the first illuminating light passing through the first portion, and wherein the second photoelectric transducer outputs the second pixel value determined based on a portion of the second resulting light obtained by a portion of the second illuminating light passing through the second portion.

* * * * *